(12) United States Patent
Mizuno

(10) Patent No.: US 10,298,928 B2
(45) Date of Patent: May 21, 2019

(54) IMAGE PROCESSING SYSTEM AND IMAGE PROCESSING METHOD

(71) Applicant: MegaChips Corporation, Osaka-shi (JP)

(72) Inventor: Yusuke Mizuno, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 56 days.

(21) Appl. No.: 15/712,976

(22) Filed: Sep. 22, 2017

(65) Prior Publication Data

US 2018/0014014 A1 Jan. 11, 2018

Related U.S. Application Data

(63) Continuation of application No. PCT/JP2016/057720, filed on Mar. 11, 2016.

(30) Foreign Application Priority Data

Mar. 31, 2015 (JP) .................. 2015-071408

(51) Int. Cl.
*H04N 19/14* (2014.01)
*H04N 19/17* (2014.01)
(Continued)

(52) U.S. Cl.
CPC ......... *H04N 19/122* (2014.11); *H04N 19/132* (2014.11); *H04N 19/14* (2014.11);
(Continued)

(58) Field of Classification Search
None
See application file for complete search history.

(56) References Cited

U.S. PATENT DOCUMENTS 6,141,452 A * 10/2000 Murao .................. G06T 9/007
382/233
6,766,044 B1 * 7/2004 Tsujii .................. G06T 9/007
378/62

(Continued)

FOREIGN PATENT DOCUMENTS

JP 2001-520466 10/2001
JP 2002-94991 3/2002
(Continued)

OTHER PUBLICATIONS

Zhou Wang and A. C. Bovik, "Bitplane-by-bitplane shift (BbBShift)—A suggestion for JPEG2000 region of interest image coding," in IEEE Signal Processing Letters, vol. 9, No. 5, pp. 160-162, May 2002. (Year: 2002).*

(Continued)

*Primary Examiner* — Andrae S Allison
(74) *Attorney, Agent, or Firm* — Xsensus, LLP

(57) ABSTRACT

An ROI coefficient and a non-ROI coefficient in first wavelet coefficient data corresponding to a first target image are determined on the basis of mask data which is developed for the first wavelet coefficient data. The ROI coefficient in the first wavelet coefficient data and a coefficient in second wavelet coefficient data corresponding to a second target image are synthesized. Synthesized coefficient data are thereby generated. Inverse wavelet transformation is performed on the synthesized coefficient data until a decomposition level becomes a predetermined end level. Synthetic image data are thereby generated.

52 Claims, 51 Drawing Sheets

(51) Int. Cl.
*H04N 19/18* (2014.01)
*H04N 19/48* (2014.01)
*H04N 19/63* (2014.01)
*H04N 19/122* (2014.01)
*H04N 19/132* (2014.01)
*H04N 19/167* (2014.01)
*H04N 19/169* (2014.01)

(52) U.S. Cl.
CPC ........... *H04N 19/167* (2014.11); *H04N 19/17* (2014.11); *H04N 19/18* (2014.11); *H04N 19/1883* (2014.11); *H04N 19/48* (2014.11); *H04N 19/63* (2014.11)

(56) References Cited

U.S. PATENT DOCUMENTS

| | | | |
|---|---|---|---|
| 6,775,412 | B1 | 8/2004 | Nister et al. |
| 7,184,604 | B2 | 2/2007 | Mizuno et al. |
| 8,223,207 | B2 | 7/2012 | Baba et al. |
| 2001/0016077 | A1* | 8/2001 | Oki .................. G06T 9/007 382/240 |
| 2001/0048770 | A1* | 12/2001 | Maeda ................ H04N 19/196 382/243 |
| 2002/0018598 | A1* | 2/2002 | Maeda .................. G06T 9/007 382/239 |
| 2004/0264794 | A1 | 12/2004 | Nister et al. |
| 2005/0175251 | A1* | 8/2005 | Taketa ................ H04N 19/647 382/248 |
| 2005/0271290 | A1 | 12/2005 | Nister et al. |
| 2005/0286741 | A1* | 12/2005 | Watanabe ............. H04N 19/63 382/107 |
| 2006/0045381 | A1* | 3/2006 | Matsuo ............... H04N 19/139 382/276 |
| 2006/0159357 | A1 | 7/2006 | Mizuno |
| 2007/0053598 | A1 | 3/2007 | Mizuno |
| 2007/0053599 | A1 | 3/2007 | Mizuno |
| 2007/0053620 | A1 | 3/2007 | Mizuno |
| 2007/0147693 | A1* | 6/2007 | Saito .................... H04N 19/647 382/243 |
| 2007/0217698 | A1* | 9/2007 | Son ........................ H04N 19/63 382/232 |
| 2010/0098162 | A1* | 4/2010 | Lu ......................... H04N 19/139 375/240.13 |
| 2012/0177121 | A1* | 7/2012 | Tripathi .................... G06T 7/20 375/240.16 |

FOREIGN PATENT DOCUMENTS

| | | |
|---|---|---|
| JP | 2003-324613 | 11/2003 |
| JP | 2005-165688 | 6/2005 |
| JP | 2006-93784 | 4/2006 |
| JP | 2006-203409 | 8/2006 |
| JP | 2007-88897 | 4/2007 |
| JP | 2007-104645 | 4/2007 |
| JP | 2007-180801 | 7/2007 |
| JP | 2007-251476 | 9/2007 |
| JP | 2009-199363 | 9/2009 |
| JP | 2013-254291 | 12/2013 |
| WO | WO 99/19839 A1 | 4/1999 |

OTHER PUBLICATIONS

C. Christopoulos, J. Askelöf and M. Larsson, "Efficient encoding and reconstruction of regions of interest in JPEG2000," 2000 10th European Signal Processing Conference, Tampere, 2000, pp. 1-4. (Year: 2000).*

International Search Report dated May 24, 2016 in PCT/JP2016/057720, filed on Mar. 11, 2016.

"Information technology—JPEG 2000 image coding system: Core coding system", International Standard ISO/IEC 15444-1, ITU-T Recommendation, T.800, 2002, pp. 209.

* cited by examiner

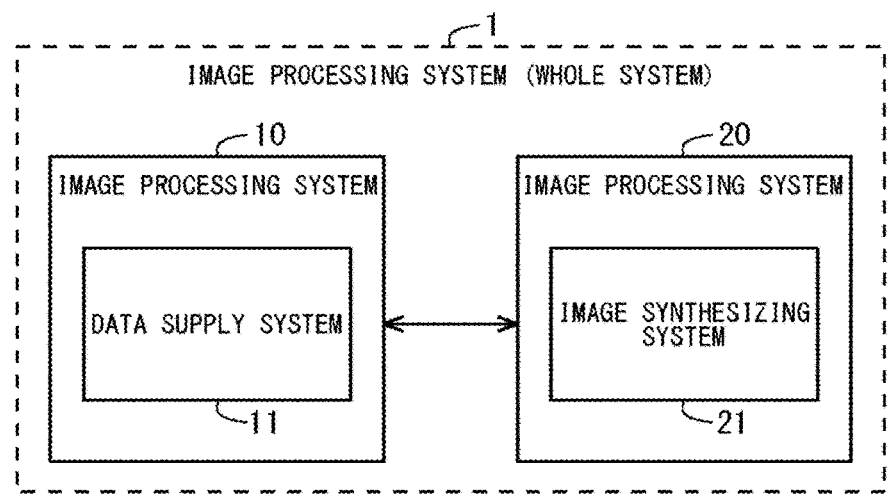
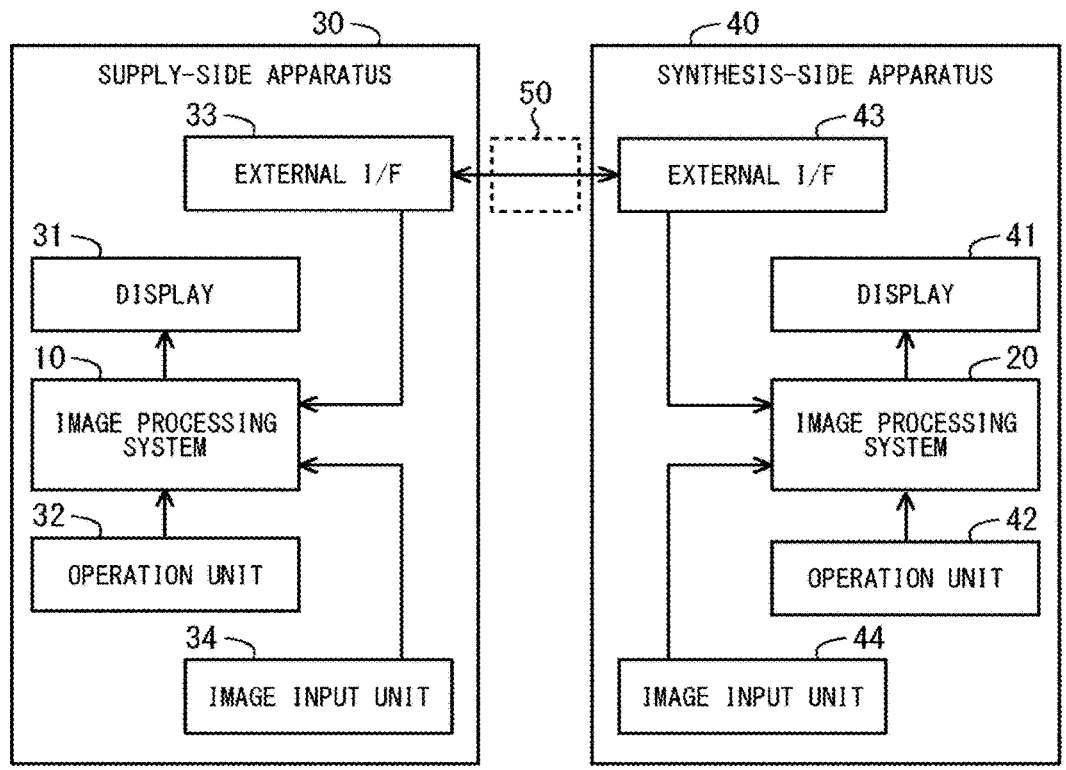

F I G . 7
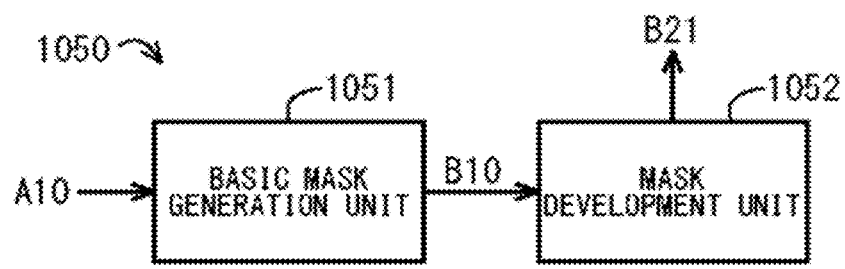
F I G . 8
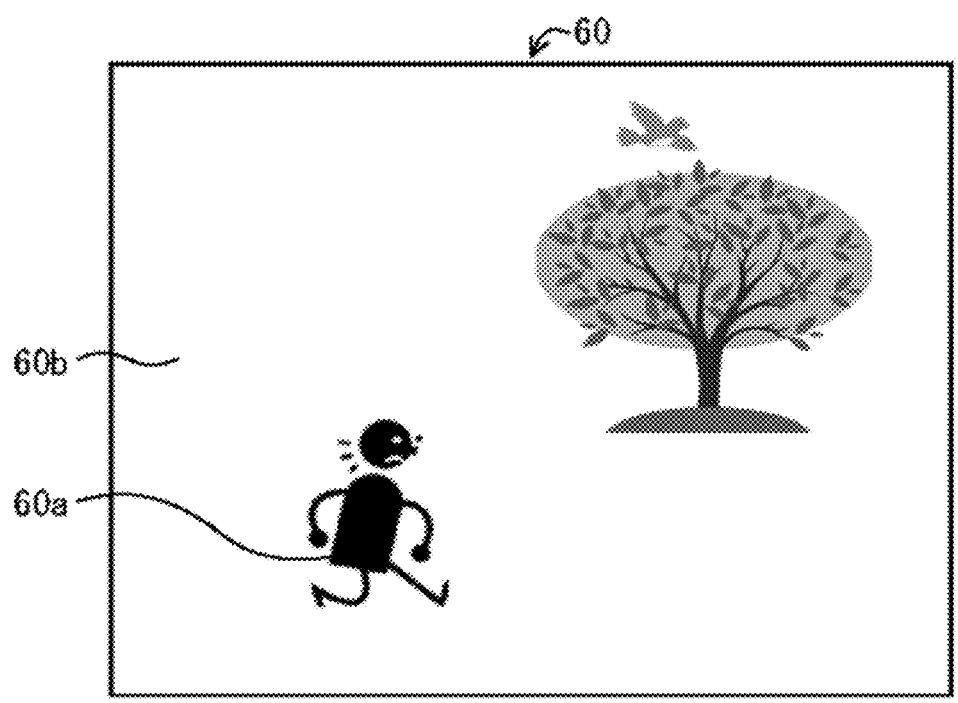

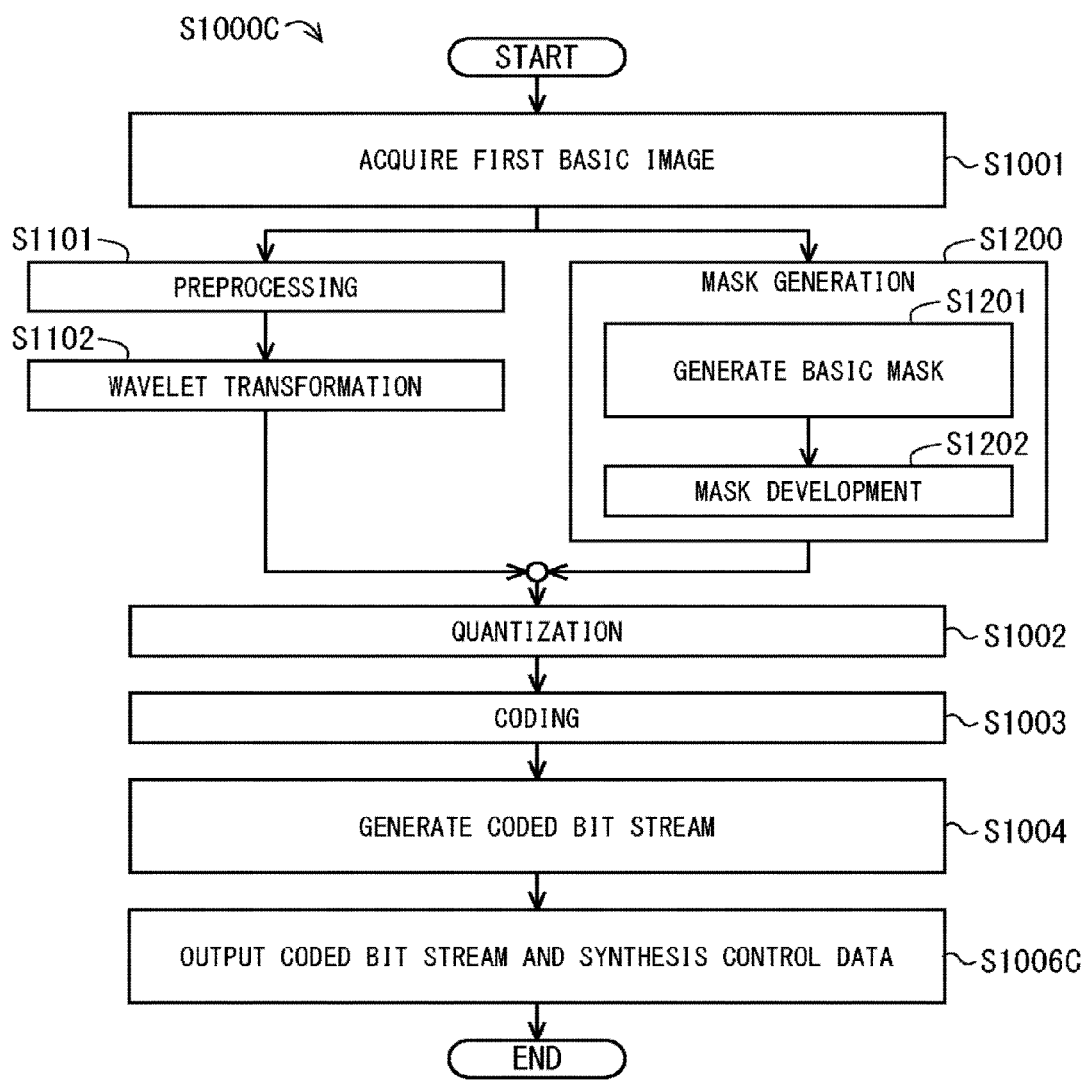
F I G . 3 1

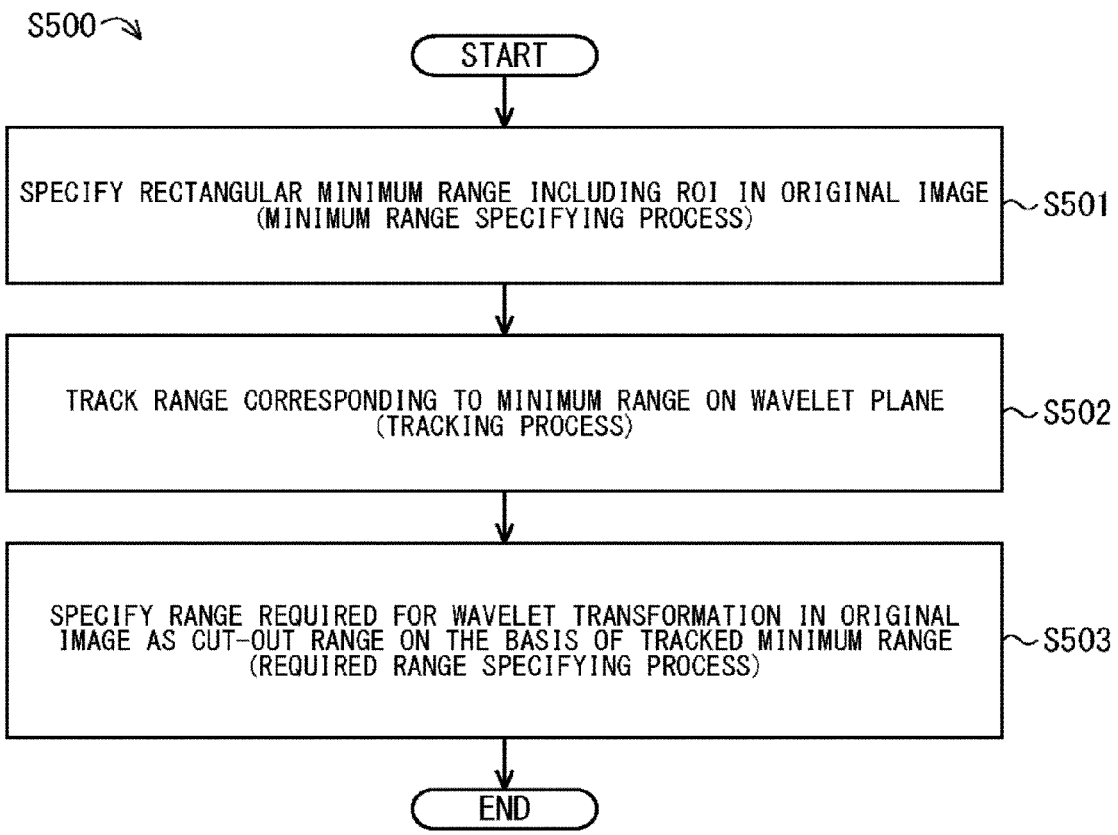
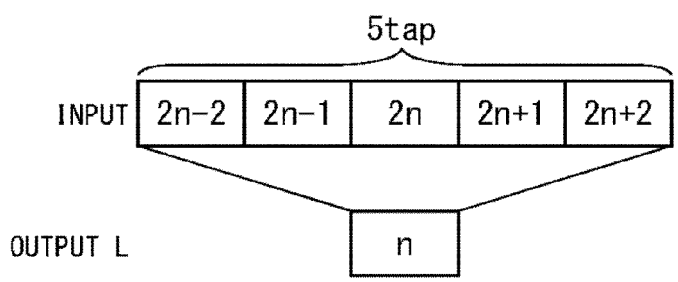

F I G . 4 2
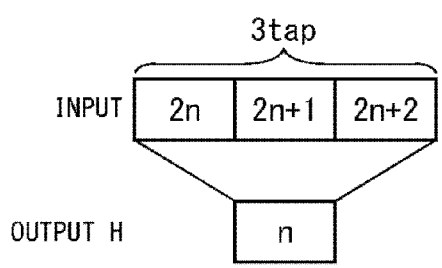
F I G . 4 3
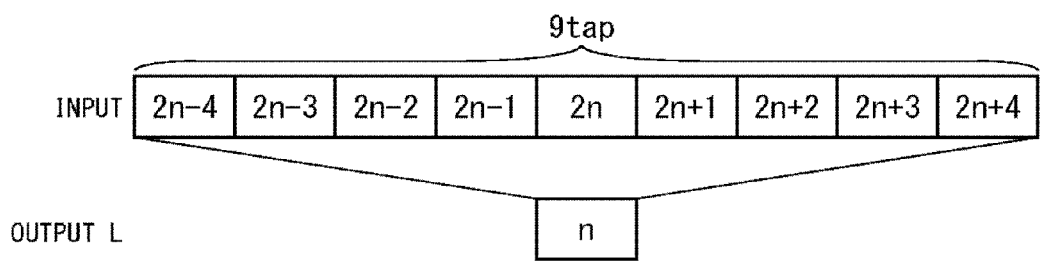
F I G . 4 4
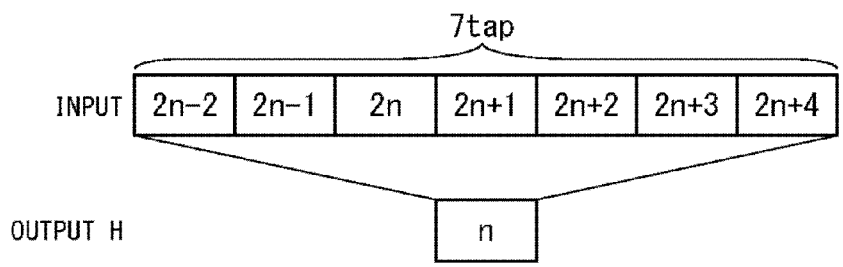

F I G . 5 1
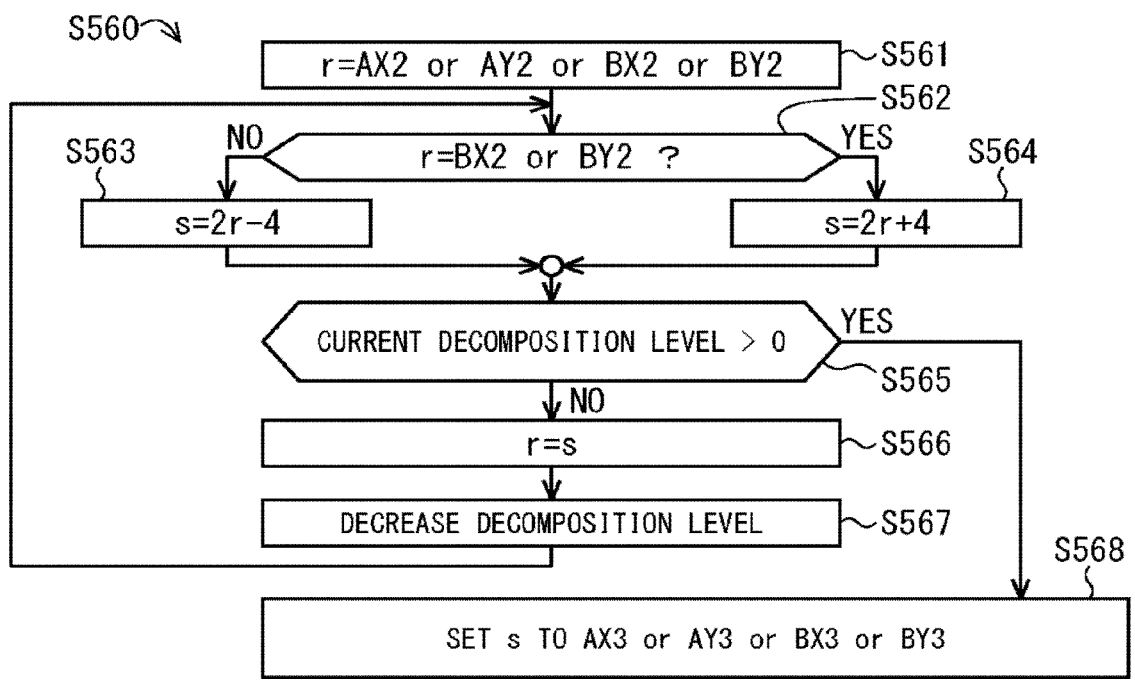

F I G . 5 6
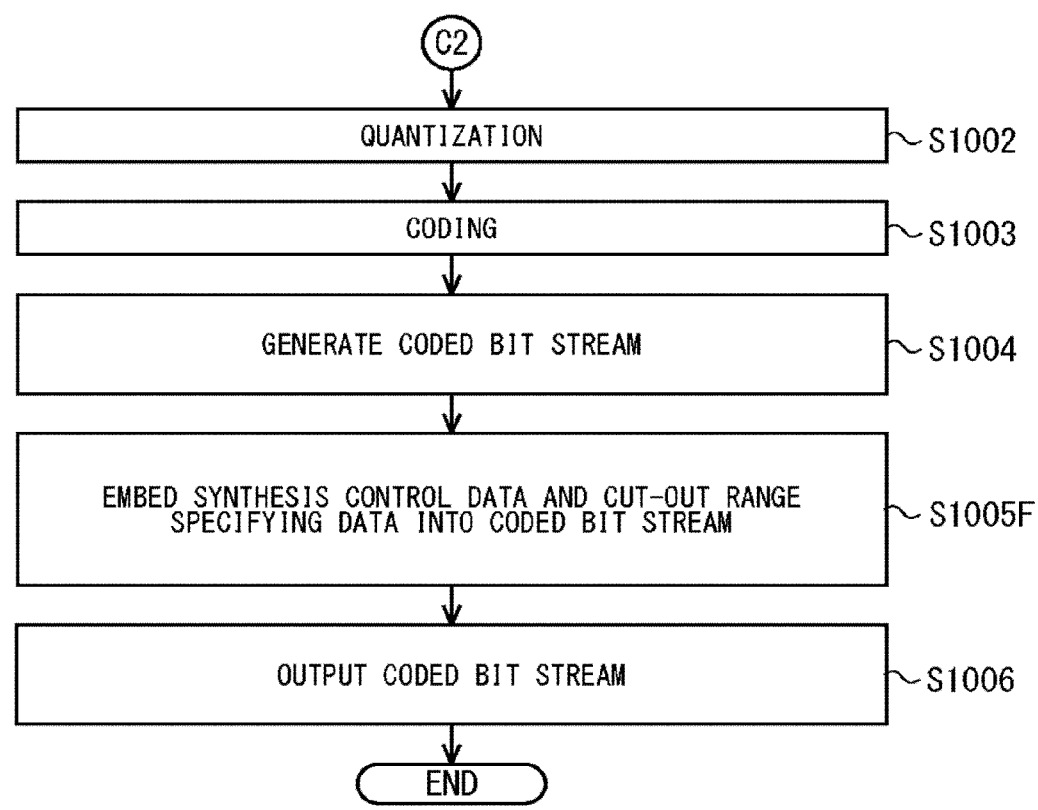

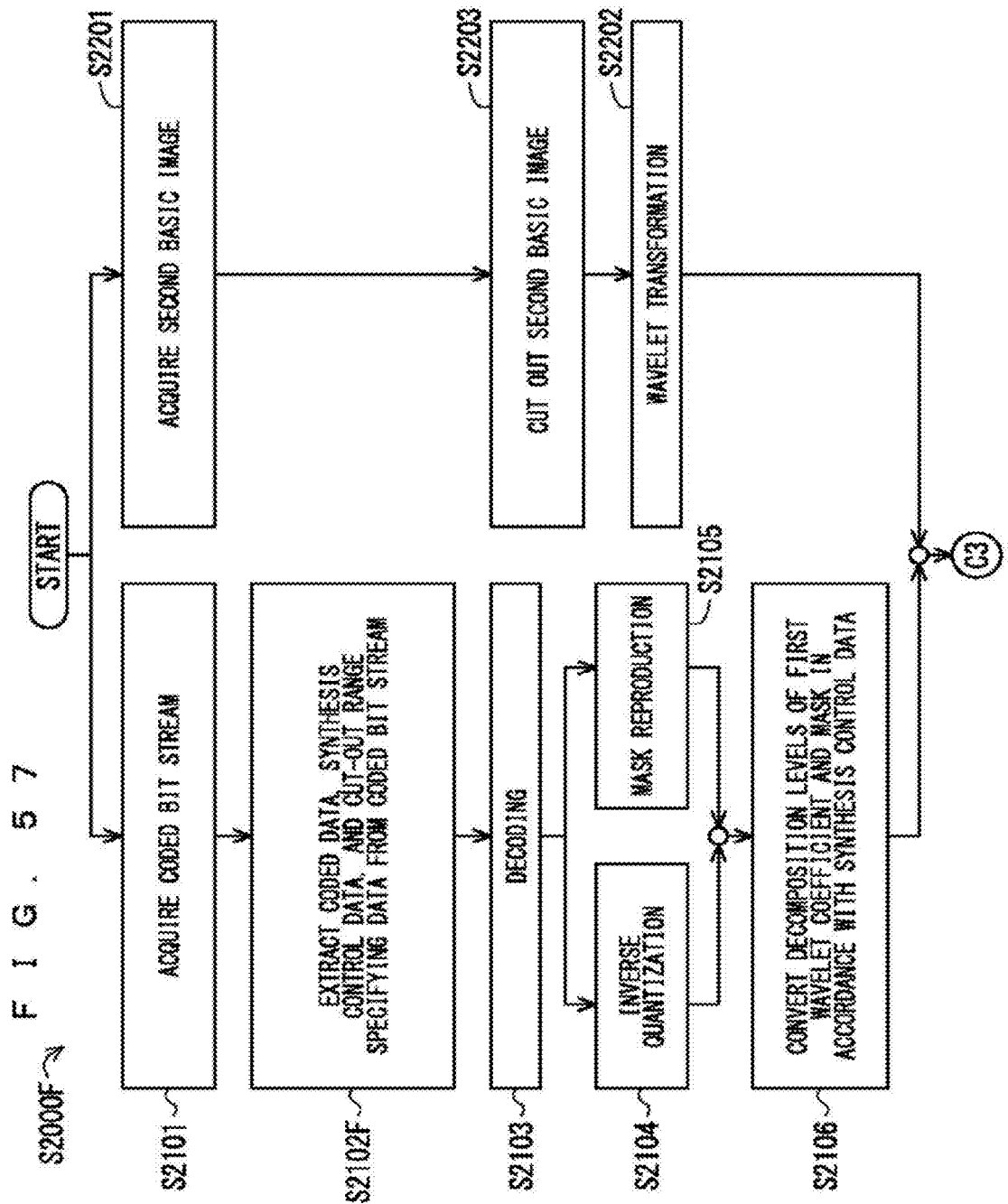

F I G . 6 0
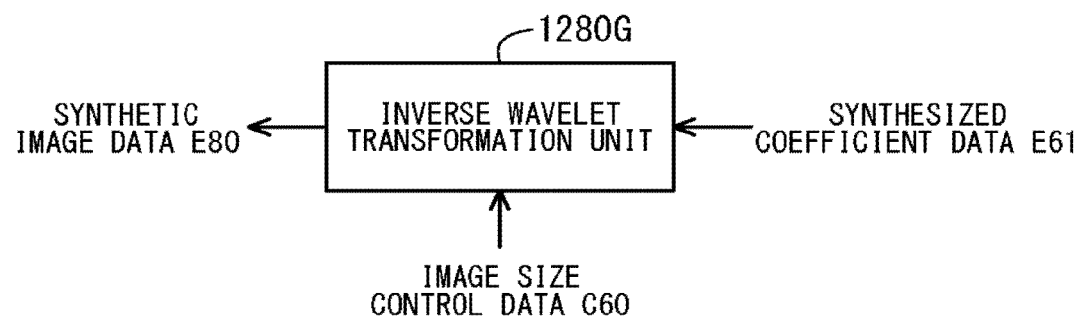

F I G. 6 1
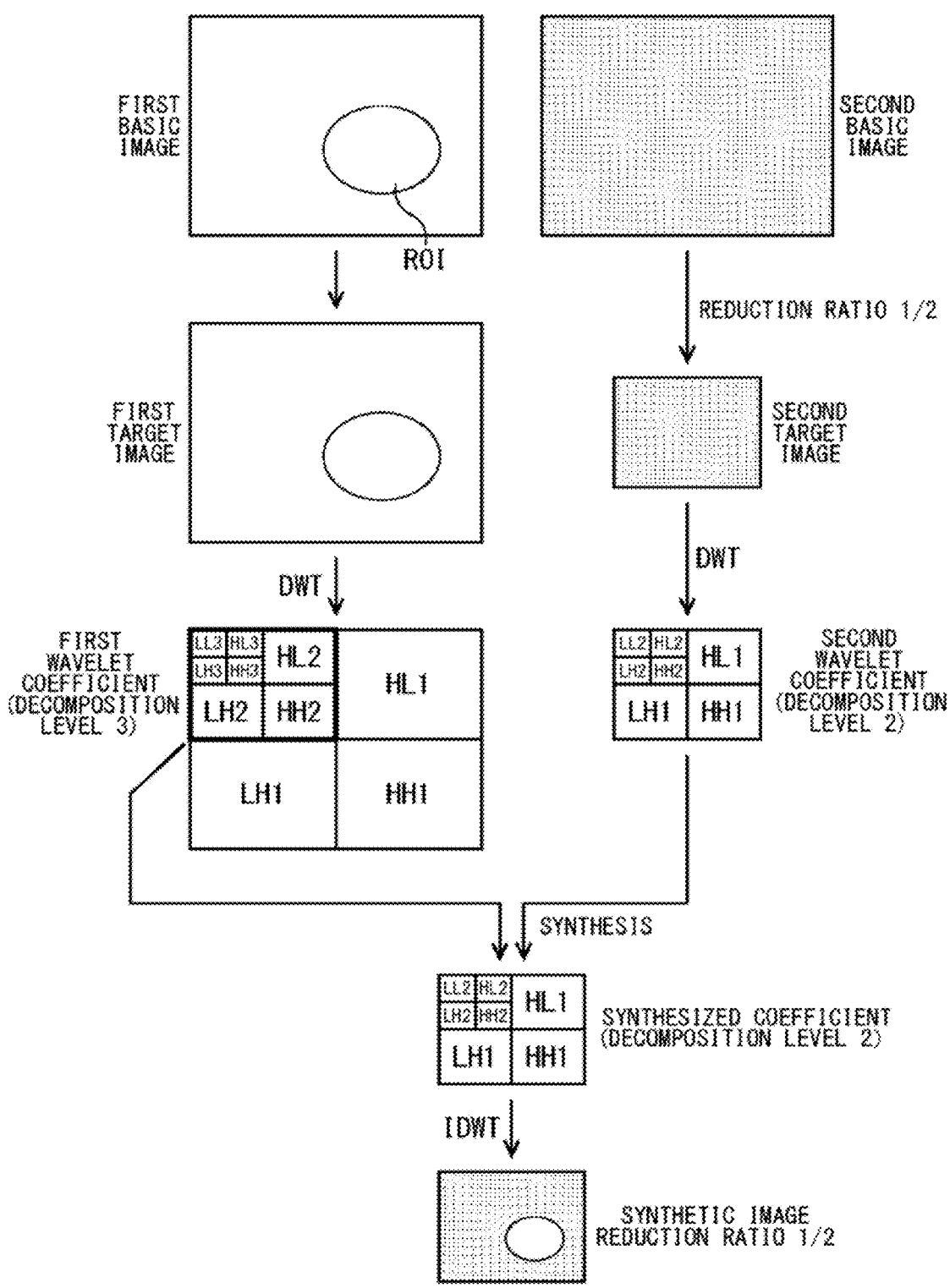

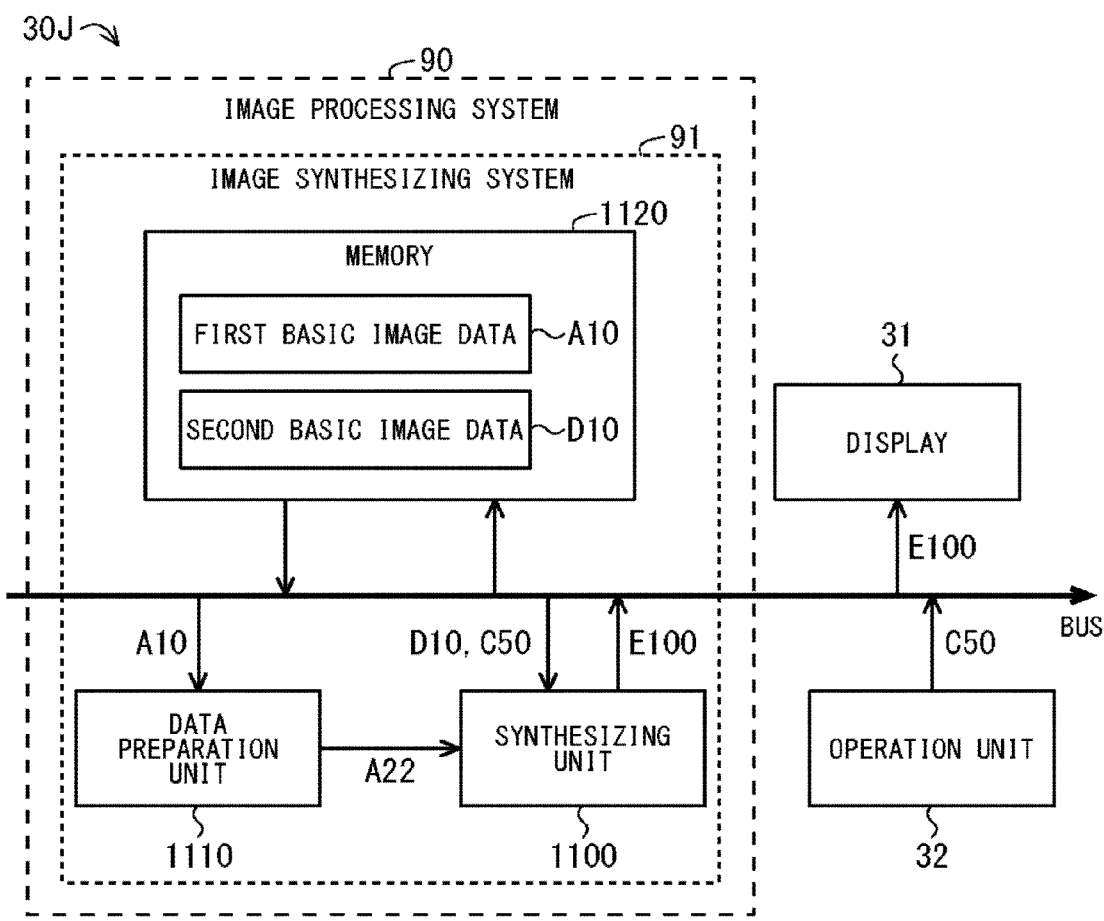

IMAGE PROCESSING SYSTEM AND IMAGE PROCESSING METHOD

BACKGROUND OF THE INVENTION

Field of the Invention

The present invention relates to an image processing system and an image processing method.

Description of the Background Art

In Japanese Patent Application Laid Open Gazette Nos. 2013-254291, 2007-088897, and 2006-093784, disclosed is a technique for detecting a moving body in a moving image. Further, in Japanese Patent Application Laid Open Gazette Nos. 2009-199363 and 2005-165688, disclosed is a technique using a particle filter to track a moving body. By using such a moving body detection technique, the moving body in the image can be cut out as an ROI (Region Of Interest).

Further, another technique is well known where with a still image captured by a digital camera as an object, a foreground image and a background image are separated from the whole image by a graph cut method. By using such an image separation technique, the foreground image can be cut out as an ROI.

SUMMARY

As described above, various techniques for automatically setting an ROI have been developed. It is thought to be still technically difficult, however, to detect a desired region to be set as an ROI with high accuracy.

For example, it is difficult to correctly determine a contour of an ROI, in other words, a border between an ROI and a non-ROI. For this reason, an ROI is sometimes set to have a portion which locally protrudes from the desired region, or conversely, to have a portion in which the desired region is locally eroded. Further, an ROI is sometimes set to have a defect in the desired region. In other words, though the entire desired region should be originally set as an ROI, it is determined that there is a non-ROI in the desired region, and then the non-ROI forms the defect of the ROI. Even when an insufficient ROI having such a defective portion on the contour thereof and/or in the inside thereof is synthesized with another image, it may be felt that the synthetic image is unnatural.

It is an object of the present invention to provide a technique that makes it possible to generate a synthetic image having a repaired ROI even when an insufficient ROI is used and further to adjust the state of synthesis. It is another object of the present invention to provide its relevant techniques.

According to the present invention, for example, provided are first to thirty-sixth aspects described later.

The present invention is intended for an image processing system. According to a first aspect of the present invention, the image processing system includes image synthesizing circuitry configured to synthesize an ROI (Region Of Interest) in a first target image and a second target image, and in the image processing system, the second target image is a similar figure to the first target image and the similarity ratio of the second target image to the first target image is not larger than 1, the image synthesizing circuitry is further configured to acquire a coded bit stream for first target image data which are data of the first target image, second basic image data which are data of a second basic image that is a source of the second target image, and synthesis control data to be used to control the state of synthesis, a process of generating the coded bit stream includes a wavelet transformation process for generating first wavelet coefficient data by performing wavelet transformation on the first target image data until a decomposition level becomes a predetermined initial decomposition level, a mask generation process for generating mask data which are data of a mask to be used to deter mine an ROI coefficient related to the ROI and a non-ROI coefficient related to a non-ROI in the first wavelet coefficient data, a quantization process for determining the ROI coefficient and the non-ROI coefficient in the first wavelet coefficient data on the basis of the mask data and performing quantization on the first wavelet coefficient data so that the non-ROI coefficient may become 0, to thereby generate quantized wavelet coefficient data, a coding process for generating coded data by coding the quantized wavelet coefficient data, and a bit stream generation process for generating the coded bit stream from the coded data, and the image synthesizing circuitry is further configured to extract the coded data from the coded bit stream, generate the quantized wavelet coefficient data by decoding the coded data, reproduce the mask data of the initial decomposition level on the basis of a result of determining the ROI coefficient and the non-ROI coefficient in the quantized wavelet coefficient data by determining whether or not respective values of pieces of data constituting the quantized wavelet coefficient data are each 0, generate the first wavelet coefficient data of the initial decomposition level by performing inverse quantization on the quantized wavelet coefficient data, perform a decomposition level conversion process for converting the first wavelet coefficient data and the mask data from the initial decomposition level to a first decomposition level which is specified by the synthesis control data, and generate second wavelet coefficient data by performing the wavelet transformation on second target image data which are data of the second target image until the decomposition level becomes a second decomposition level which depends on the first decomposition level and the similarity ratio. In the image processing system, when it is assumed that the first decomposition level of the first wavelet coefficient data is P1 the second decomposition level of the second wavelet coefficient data is P2, and the similarity ratio is $1/2^{P3}$, $P2=P1-P3$, and the image synthesizing circuitry is further configured to generate synthesized coefficient data having the same image size and decomposition level as those of the second wavelet coefficient data by performing a coefficient synthesis process for determining the ROI coefficient and the non-ROI coefficient in the first wavelet coefficient data of the first decomposition level on the basis of the mask data of the first decomposition level and synthesizing the ROI coefficient in the first wavelet coefficient data of the first decomposition level and a coefficient in he second wavelet coefficient data and generate synthetic image data by performing inverse wavelet transformation on the synthesized coefficient data until the decomposition level becomes a predetermined end level.

According to a second aspect of the present invention, in the image processing system of the first aspect, the image synthesizing circuitry is configured to convert the mask data from the initial decomposition level to a decomposition level of 0, and from the decomposition level of 0 to the first decomposition level.

According to a third aspect of the present invention, in the image processing system of the first or second aspect, the image synthesizing circuitry is configured to acquire the synthesis control data through the same medium as that used to supply the coded bit stream.

According to a fourth aspect of the present invention, in the image processing system of the third aspect, the synthesis control data are supplied to the image synthesizing circuitry, being embedded in a region in the coded bit stream, which has no effect on the coded data, and the image synthesizing circuitry is configured to extract the coded data and the synthesis control data from the coded bit stream.

According to a fifth aspect of the present invention, in the image processing system of the first or second aspect, the image synthesizing circuitry is configured to acquire the synthesis control data through a medium different from that used to supply the coded bit stream.

According to a sixth aspect of the present invention, in the image processing system of the fifth aspect, the image synthesizing circuitry is configured to acquire the coded bit stream through a wireless or wired communication medium or an external memory medium and acquire the synthesis control data from a user through an operating medium provided on the side of the image synthesizing circuitry.

According to a seventh aspect of the present invention, in the image processing system of any one of the first to sixth aspects, the image synthesizing circuitry is configured to selectively use one of a plurality of pieces of synthesis control data.

According to an eighth aspect of the present invention, in the image processing system of the seventh aspect, the plurality of pieces of synthesis control data include first synthesis control data supplied by user input to an operating medium provided on the side of the image synthesizing circuitry and second synthesis control data supplied through a medium different from the operating medium, and the image synthesizing circuitry is configured to preferentially select the first synthesis control data.

According to a ninth aspect of the present invention, in the image processing system of any one of the first to eighth aspects, the image synthesizing circuitry is configured to set a similar figure range in the second basic image, which is a similar figure to the first target image with the similarity ratio, and cut out data within the similar figure range in the second basic image data as the second target image data.

According to a tenth aspect of the present invention, in the image processing system of the ninth aspect, the image synthesizing circuitry is configured to embed the synthetic image data obtained by performing the inverse wavelet transformation until the decomposition level becomes 0, into the similar figure range in the second basic image data.

According to an eleventh aspect of the present invention, in the image processing system of any one of the first to eighth aspects, the image synthesizing circuitry is configured to generate the second target image by reducing at least part of the second basic image.

According to a twelfth aspect of the present invention, the image processing system of any one of the first to eleventh aspects further includes data supply circuitry configured to perform the process of generating the coded bit stream and supply the coded bit stream to the image synthesizing circuitry.

According to a thirteenth aspect of the present invention, the image processing system includes data supply circuitry configured to output data to be used for an image synthesis process for synthesizing an ROI (Region Of Interest) in a first target image and a second target image, and in the image processing system, the second target image is a similar figure to the first target image and the similarity ratio of the second target age to the first target image is not larger than 1, data supply circuitry is further configured to generate first wavelet coefficient data by performing wavelet transformation on first target image data which are data of the first target image until a decomposition level becomes a predetermined initial decomposition level, perform a mask generation process for generating mask data which are data of a mask to be used to determine an ROI coefficient related to the ROI and a non-ROI coefficient related to a non-ROI in the first wavelet coefficient data, generate quantized wavelet coefficient data by determining the ROI coefficient and the non-ROI coefficient in the first wavelet coefficient data on the basis of the mask data and performing quantization on the first wavelet coefficient data so that the non-ROI coefficient may become 0, generate coded data by coding the quantized wavelet coefficient data, and generate a coded bit stream from the coded data, the image synthesis process includes a bit stream analysis process for extracting the coded data from the coded bit stream, a decoding process for generating the quantized wavelet coefficient data by decoding the coded data, a mask reproduction process for reproducing the mask data of the initial decomposition level on the basis of a result of determining the ROI coefficient and the non-ROI coefficient in the quantized wavelet coefficient data by determining whether or not respective values of pieces of data constituting the quantized wavelet coefficient data are each 0, an inverse quantization process for generating the first wavelet coefficient data of the initial decomposition level by performing inverse quantization on the quantized wavelet coefficient data, a decomposition level conversion process for converting the first wavelet coefficient data and the mask data from the initial decomposition level to a first decomposition level, and a wavelet transformation process for generating second wavelet coefficient data by performing the wavelet transformation on second target image data which are data of the second target image until the decomposition level becomes a second decomposition level which depends on the first decomposition level and the similarity ratio. In the image processing system, when it is assumed that the first decomposition level of the first wavelet coefficient data is P1, the second decomposition level of the second wavelet coefficient data is P2, and the similarity ratio is $1/2^{P3}$, P2=P1−P3, the image synthesis process further includes a synthesis execution process for generating synthesized coefficient data having the same image size and decomposition level as those of the second wavelet coefficient data by performing a coefficient synthesis process for determining the ROI coefficient and the non-ROI coefficient in the first wavelet coefficient data of the first decomposition level on the basis of the mask data of the first decomposition level and synthesizing the ROI coefficient in the first wavelet coefficient data of the first decomposition level and a coefficient in the second wavelet coefficient data and an inverse wavelet transformation process for generating synthetic image data by performing inverse wavelet transformation on the synthesized coefficient data until the decomposition level becomes a predetermined end level, and the data supply circuitry is further configured to output the coded bit stream and synthesis control data to be used to specify the first decomposition level in the decomposition level conversion process of the image synthesis process.

According to a fourteenth aspect of the present invention, in the image processing system of the thirteenth aspect, the data supply circuitry is configured to embed the synthesis control data into a region in the coded bit stream, which has no effect on the coded data, and output the coded bit stream with the synthesis control data embedded therein.

According to a fifteenth aspect of the present invention, in the image processing system of the thirteenth aspect, the data supply circuitry is configured to output the synthesis control data separately from the coded bit stream.

According to a sixteenth aspect of the present invention, in the image processing system of any one of the thirteenth to fifteenth aspects, the data supply circuitry is configured to generate basic mask data which are data of a basic mask to be used to determine the ROI and the non-ROI in a range of a first basic image including the ROI, on the basis of first basic image data which are data of the first basic image, perform a cut-out range determination process for determining a cut-out range which is a range of the first target image in the first basic image, on the basis of the basic mask data, the initial decomposition level, and the first decomposition level, to thereby generate cut-out range specifying data to be used to specify the cut-out range, cut out data within the cut-out range in the basic mask data on the basis of the cut-out range specifying data, and generate the mask which is a developed mask for the first wavelet coefficient data by developing the data cut out from the basic mask data, for each band component included in the first wavelet coefficient data, and the data supply circuitry is further configured to cut out data within the cut-out range in the first basic image data as the first target image data on the basis of the cut-out range specifying data.

According to a seventeenth aspect of the present invention, in the image processing system of the sixteenth aspect, the cut-out range determination process includes a minimum range specifying process for specifying a rectangular minimum range including the ROI, on the basis of the basic mask, a tracking process for specifying a range corresponding to the minimum range as a tracked minimum range in a highest-order band component which is decomposed most in a wavelet plane of a highest decomposition level which is a higher decomposition level among the initial decomposition level and the first decomposition level, and a required range specifying process for specifying which range of the first basic image before the cut-out, in which data required to calculate a wavelet coefficient within the tracked minimum range exist, and the range specified in the required range specifying process is set to the cut-out range.

According to an eighteenth aspect of the present invention, in the image processing system of the seventeenth aspect, the wavelet transformation is a method of recursively decomposing a lowest-frequency band component included in a wavelet plane of each decomposition level, and the highest-order band component is a lowest-frequency band component in a wavelet plane of the highest decomposition level.

According to a nineteenth aspect of the present invention, in the image processing system of the seventeenth or eighteenth aspect, assuming that upper-left end coordinates of the minimum range are (AX1, AY1), lower-right end coordinates of the minimum range are (BX1, BY1), upper-left end coordinates of the tracked minimum range are (AX2, AY2), lower-right end coordinates of the tracked minimum range are (BX2, BY2), upper-left end coordinates of the cut-out range are (AX3, AY3), and lower-right end coordinates of the cut-out range are (BX3, BY3), a 5×3 filter is used in the wavelet transformation, in the minimum range specifying process, the AX1, the AY1, the BX1, and the BY1 are obtained, in the tracking process, a first recursive process in which when the AX1 is an even number, AX1/2 is set to new AX1, and when the AX1 is an odd number, $\{AX1-1\}/2$ is set to new AX1 is performed a specified number of times which is specified by a value of the highest decomposition level, and the AX1 that is finally obtained is set to the AX2, a second recursive process in which when the AY1 is an even number, AY1/2 is set to new AY1, and when the AY1 is an odd number, $\{AY1-1\}/2$ is set to new AY1 is performed the specified number of times, and the AY1 that is finally obtained is set to the AY2, a third recursive process in which when the BX1 is an even number, BX1/2 is set to new BX1, and when the BX1 is an odd number, $\{BX1+1\}/2$ is set to new BX1 is performed the specified number of times, and the BX1 that is finally obtained is set to the BX2, and a fourth recursive process in which when the BY1 is an even number, BY1/2 is set to new BY1, and when the BY1 is an odd number, $\{BY1+1\}/2$ is set to new BY1 is performed the specified number of times, and the BY1 that is finally obtained is set to the BY2, and in the required range specifying process, a fifth recursive process in which $\{AX2\times2-2\}$ is set to new AX2 is performed the specified number of times, and the AX2 that is finally obtained is set to the AX3, a sixth recursive process in which $\{AY2\times2-2\}$ is set to new AY2 is performed the specified number of times, and the AY2 that is finally obtained is set to the AY3, a seventh recursive process in which $\{BX2\times2+2\}$ is set to new BX2 is performed the specified number of times, and the BX2 that is finally obtained is set to the BX3, and an eighth recursive process in which $\{BY2\times2+2\}$ is set to new BY2 is performed the specified number of times, and the BY2 that is finally obtained is set to the BY3.

According to a twentieth aspect of the present invention, in the image processing system of the seventeenth or eighteenth aspect, assuming that upper-left end coordinates of the minimum range are (AX1, AY1), lower-right end coordinates of the minimum range are (BX1, BY1), upper-left end coordinates of the tracked minimum range are (AX2, AY2), lower-right end coordinates of the tracked minimum range are (BX2, BY2), upper-left end coordinates of the cut-out range are (AX3, AY3), and lower-right end coordinates of the cut-out range are (BX3, BY3), a Daubechies 9×7 filter is used in the wavelet transformation, in the minimum range specifying process, the AX1, the AY1, the BX1, and the BY1 are obtained, in the tracking process, a ninth recursive process in which when the AX1 is an even number, $\{AX1/2-1\}$ is set to new AX1, and when the AX1 is an odd number, $\{AX1-3\}/2$ is set to new AX1 is performed a specified number of times which is specified by a value of the highest decomposition level, and the AX1 that is finally obtained is set to the AX2, a tenth recursive process in which when the AY1 is an even number, $\{AY1/2-1\}$ is set to new AY1, and when the AY1 is an odd number, $\{AY1-3\}/2$ is set to new AY1 is performed the specified number of times, and the AY1 that is finally obtained is set to the AY2, an eleventh recursive process in which when the BX1 is an even number, $\{BX1+2\}/2$ is set to new BX1, and when the BX1 is an odd number, $\{BX1+3\}/2$ is set to new BX1 is performed the specified number of times, and the BX1 that is finally obtained is set to the BX2, and a twelfth recursive process in which when the BY1 is an even number, $\{BY1+2\}/2$ is set to new BY1, and when the BY1 is an odd number, $\{BX1+3\}/2$ is set to new BY1 is performed the specified number of times, and the BY1 that is finally obtained is set to the BY2, and in the required range specifying process, a thirteenth recursive process in which $\{AX2\times2-4\}$ is set to new AX2 is performed the specified number of times, and the AX2 that is finally obtained is set to the AX3, a fourteenth recursive process in which $\{AY2\times2-4\}$ is set to new AY2 is performed the specified number of times, and the AY2 that is finally obtained is set to the AY3, a fifteenth recursive process in which $\{BX2\times2+4\}$ is set to new BX2 is performed the specified number of times, and the BX2 that is finally obtained is set to the BX3, and a sixteenth recursive process in which {BY2×2+4} is set to new BY2 is performed the specified number of times, and the BY2 that is finally obtained is set to the BY3.

According to a twenty-first aspect of the present invention, in the image processing system of any one of the thirteenth to twentieth aspects, the data supply circuitry is configured to perform the mask reproduction process and the inverse quantization process on the basis of the quantized wavelet coefficient data, perform the decomposition level conversion process on the basis of a result of performing the mask reproduction process and the inverse quantization process, perform the wavelet transformation process on the second target image data, and perform the synthesis execution process and the inverse wavelet transformation process on the basis of a result of performing the decomposition level conversion process and wavelet transformation process.

According to a twenty-second aspect of the present invention, in the image processing system of the twenty-first aspect, the data supply circuitry is configured to set a similar figure range which is a similar figure to the first target image with the similarity ratio in a second basic image that is a source of the second target image and cut out data within the similar figure range in second basic image data which are data of the second basic image, as the second target image data.

According to a twenty-third aspect of the present invention, in the image processing system of the twenty-second aspect, the data supply circuitry is configured to embed the synthetic image data obtained by performing the inverse wavelet transformation until the decomposition level becomes 0, into the similar figure range in the second basic image data.

According to a twenty-fourth aspect of the present invention, in the image processing system of the twenty-first aspect, the data supply circuitry is configured to generate the second target image by reducing at least part of second basic image that is a source of the second target image.

According to a twenty-fifth aspect of the present invention, in the image processing system of any one of the first to twenty-fourth aspects, the coefficient synthesis process is a first coefficient synthesis process for substituting the non-ROI coefficient in the first wavelet coefficient data with a corresponding wavelet coefficient in the second wavelet coefficient data or a second coefficient synthesis process for embedding the ROI coefficient in the first wavelet coefficient data into a corresponding position in the second wavelet coefficient data.

According to a twenty-sixth aspect of the present invention, in the image processing system of the first or thirteenth aspect, the mask generation process includes a basic mask generation process for generating basic mask data which are data of a basic mask to be used to determine the ROI and the non-ROI in a range of a first basic image that is a source of the first target image, on the basis of first basic image data which are data of the first basic image and a mask development process for generating the mask which is a developed mask for the first wavelet coefficient data by developing the basic mask for each band component included in the first wavelet coefficient data.

According to a twenty-seventh aspect of the present invention, in the image processing system of the first or thirteenth aspect, the decomposition level conversion process includes a decomposition level increase process for performing the wavelet transformation on the first wavelet coefficient data until the decomposition level becomes the first decomposition level and performing a mask development process for developing the mask data for each band component included in the first wavelet coefficient data of the first decomposition level.

According to a twenty-eighth aspect of the present invention, in the image processing system of any one of the sixteenth, twenty-sixth, and twenty-seventh aspects, in the mask development process, performed is a level increase basic process for converting a first mask for a first wavelet plane into a second mask for a second wavelet plane having a decomposition level which is one-level higher than that of the first wavelet plane, on the basis of a mask development condition, and when the level increase basic process is performed a plurality of times in order to bring the decomposition level of the second wavelet plane into the first decomposition level, the level increase basic process is performed recursively in accordance with a method of the wavelet transformation. In the image processing system, the mask development condition in the case of using a 5×3 filter in the wavelet transformation, where n is an integer, includes a first development condition that when the 2n-th data on the first wavelet plane are associated with the ROI by the first mask, the second mask is formed so that the n-th data of a low-frequency component and the {n−1}th data and the n-th data of a high-frequency component on the second wavelet plane may be associated with the ROI and a second development condition that when the {2n+1}th data on the first wavelet plane are associated with the ROI by the first mask, the second mask is formed so that the n-th data and the {n+1}th data of the low-frequency component and the {n−1}th data to the {n+1}th data of the high-frequency component on the second wavelet plane may be associated with the ROI.

According to a twenty-ninth aspect of the present invention, in the image processing system of any one of the sixteenth, twenty-sixth, and twenty-seventh aspects, in the mask development process, performed is a level increase basic process for converting a first mask for a first wavelet plane into a second mask for a second wavelet plane having a decomposition level which is one-level higher than that of the first wavelet plane, on the basis of a mask development condition, and when the level increase basic process is performed a plurality of times in order to bring the decomposition level of the second wavelet plane into the first decomposition level, the level increase basic process is performed recursively in accordance with a method of the wavelet transformation. In the image processing system, the mask development condition in the case of using a Daubechies 9×7 filter in the wavelet transformation, where n is an integer, includes a third development condition that when the 2n-th data on the first wavelet plane are associated with the ROI by the first mask, the second mask is formed so that the {n−1}th data to the {n+1}th data of a low-frequency component and the {n−2}th data to the {n+1}th data of a high-frequency component on the second wavelet plane may be associated with the ROI and a fourth development condition that when the {2n+1}th data on the first wavelet plane are associated with the ROI by the first mask, the second mask is formed so that the {n−1}th data to the {n+2}th data of the low-frequency component and the {n−2}th data to the {n+2}th data of the high-frequency component on the second wavelet plane may be associated with the ROI.

According to a thirtieth aspect of the present invention, in the image processing system of the first or thirteenth aspect, the decomposition level conversion process includes a decomposition level decrease process for performing the inverse wavelet transformation on the first wavelet coefficient data until the decomposition level becomes the first decomposition level and performing a mask restoration process for restoring the mask data for each band component included in the first wavelet coefficient data of the first decomposition level.

According to a thirty-first aspect of the present invention, in the image processing system of the thirtieth aspect, in the mask restoration process, performed is a level decrease basic process for converting a first mask for a first wavelet plane into a second mask for a second wavelet plane having a decomposition level which is one-level lower than that of the first wavelet plane, on the basis of a mask restoration condition, and when the level decrease basic process is performed a plurality of times in order to bring the decomposition level of the second wavelet plane into the first decomposition level, the level decrease basic process is performed recursively in accordance with a method of the wavelet transformation. In the image processing system, when data at a specified position of the first wavelet plane are associated with the ROI by the first mask, the mask restoration condition defines that the second mask is formed so that data at a position corresponding to the specified position in the second wavelet plane may be associated with the ROI, and the specified position is indicated by a mask adjustment instruction.

According to a thirty-second aspect of the present invention, in the image processing system of the thirty-first aspect, the mask restoration condition, where n is an integer, includes a first mask restoration condition for forming the second mask so that the 2n-th data on the second wavelet plane may be associated with the ROI and a second mask restoration condition for forming the second mask so that the {2n+1}th data on the second wavelet plane may be associated with the ROI, and when a 5×3 filter is used in the inverse wavelet transformation, under the mask adjustment instruction, the first mask restoration condition imposes that the n-th data of a low-frequency component on the first wavelet plane are associated with the ROI by the first mask and all the {n−1}th data and the n-th data of a high-frequency component on the first wavelet plane are associated with the ROI by the first mask, and the second mask restoration condition imposes that all the n-th data and the {n+1}th data of the low-frequency component on the first wavelet plane are associated with the ROI by the first mask and all the {n−1}th data to the {n+1}th data of the high-frequency component on the first wavelet plane are associated with the ROI by the first mask.

According to a thirty-third aspect of the present invention, in the image processing system of the thirty-first aspect, the mask restoration condition, where n is an integer, includes a first mask restoration condition for forming the second mask so that the 2n-th data on the second wavelet plane may be associated with the ROI and a second mask restoration condition for forming the second mask so that the {2n+1}th data on the second wavelet plane may be associated with the ROI, and when a Daubechies 9×7 filter is used in the inverse wavelet transformation, under the mask adjustment instruction, the first mask restoration condition imposes that all the {n−1}th data to the {n+1}th data of a low-frequency component on the first wavelet plane are associated with the ROI by the first mask and all the {n−2}th data to the {n+1}th data of a high-frequency component on the first wavelet plane are associated with the ROI by the first mask, and the second mask restoration condition imposes that all the {n−1}th data to the {n+2}th data of the low-frequency component on the first wavelet plane are associated with the ROI by the first mask and all the {n−2}th data to the {n+2}th data of the high-frequency component on the first wavelet plane are associated with the ROI by the first mask.

According to a thirty-fourth aspect of the present invention, in the image processing system of the first or thirteenth aspect, the coded bit stream conforms to JPEG (Joint Photographic Experts Group) 2000.

According to a thirty-fifth aspect of the present invention, the image processing system includes a memory and data preparation circuitry and synthesizing circuitry which are connected to the memory via a bus. In the image processing system, the memory is configured to store therein first basic image data which are data of a first basic image that is a source of a first target image having an ROI (Region Of Interest) and second basic image data which are data of a second basic image that is a source of a second target image to be synthesized with the ROI in the first target image, the second target image is a similar figure to the first target image and the similarity ratio of the second target image to the first target image is not larger than 1, the data preparation circuitry is configured to acquire the first basic image data from the memory, generate first wavelet coefficient data by performing wavelet transformation on first target image data which are data of the first target image until a decomposition level becomes a predetermined initial decomposition level, perform a mask generation process for generating mask data which are data of a mask to be used to determine an ROI coefficient related to the ROI and a non-ROI coefficient related to a non-ROI in the first wavelet coefficient data, and determine the ROI coefficient and the non-ROI coefficient in the first wavelet coefficient data on the basis of the mask data and perform quantization on the first wavelet coefficient data so that the non-ROI coefficient may become 0, to thereby generate quantized wavelet coefficient data, and the synthesizing circuitry is configured to acquire the quantized wavelet coefficient data from the data preparation circuitry, acquire the second basic image data from the memory, acquire synthesis control data to be used to control the state of synthesis, reproduce the mask data of the initial decomposition level on the basis of a result of determining the ROI coefficient and the non-ROI coefficient in the quantized wavelet coefficient data by determining whether or not respective values of pieces of data constituting the quantized wavelet coefficient data are each 0, generate the first wavelet coefficient data of the initial decomposition level by performing inverse quantization on the quantized wavelet coefficient data, perform a decomposition level conversion process for converting the first wavelet coefficient data and the mask data from the initial decomposition level to a first decomposition level which is specified by the synthesis control data, and generate second wavelet coefficient data by performing the wavelet transformation on second target image data which are data of the second target image until the decomposition level becomes a second decomposition level which depends on the first decomposition level and the similarity ratio. In the image processing system, when it is assumed that the first decomposition level of the first wavelet coefficient data is P1, the second decomposition level of the second wavelet coefficient data is P2, and the similarity ratio is $1/2^{P3}$, $P2=P1-P3$, and the synthesizing circuitry is further configured to generate synthesized coefficient data having the same image size and decomposition level as those of the second wavelet coefficient data by performing a coefficient synthesis process for determining the ROI coefficient and the non-ROI coefficient in the first wavelet coefficient data of the first decomposition level on the basis of the mask data of the first decomposition level and synthesizing the ROI coefficient in the first wavelet coefficient data of the first decomposition level and a coefficient in the second wavelet coefficient data and generate synthetic image data by performing inverse wavelet transformation on the synthesized coefficient data until the decomposition level becomes a predetermined end level.

The present invention is also intended for an image processing method. According to a thirty-sixth aspect of the present invention, the image processing method includes acquiring first basic image data which are data of a first basic image that is a source of a first target image having an ROI (Region Of Interest) and acquiring second basic image data which are data of a second basic image that is a source of a second target image to be synthesized with the ROI in the first target image, and in the image processing method, the second target image is a similar figure to the first target image and the similarity ratio of the second target image to the first target image is not larger than 1, and the image processing method further includes acquiring synthesis control data to be used to control the state of synthesis, generating first wavelet coefficient data by performing wavelet transformation on first target image data which are data of the first target image until a decomposition level becomes a predetermined initial decomposition level, performing a mask generation process for generating mask data which are data of a mask to be used to determine an ROI coefficient related to the ROI and a non-ROI coefficient related to a non-ROI in the first wavelet coefficient data, determining the ROI coefficient and the non-ROI coefficient in the first wavelet coefficient data on the basis of the mask data and performing quantization on the first wavelet coefficient data so that the non-ROI coefficient may become 0, to thereby generate quantized wavelet coefficient data, reproducing the mask data of the initial decomposition level on the basis of a result of determining the ROI coefficient and the non-ROI coefficient in the quantized wavelet coefficient data by determining whether or not respective values of pieces of data constituting the quantized wavelet coefficient data are each 0, generating the first wavelet coefficient data of the initial decomposition level by performing inverse wavelet transformation on the quantized wavelet coefficient data, performing a decomposition level conversion process for converting the first wavelet coefficient data and the mask data from the initial decomposition level to a first decomposition level which is specified by the synthesis control data, and generating second wavelet coefficient data by performing the wavelet transformation on second target image data which are data of the second target image until the decomposition level becomes a second decomposition level which depends on the first decomposition level and the similarity ratio. In the image processing method, when it is assumed that the first decomposition level of the first wavelet coefficient data is P1, the second decomposition level of the second wavelet coefficient data is P2, and the similarity ratio is $1/2^{P3}$, $P2=P1-P3$, and the image processing method further includes generating synthesized coefficient data having the same image size and decomposition level as those of the second wavelet coefficient data by performing a coefficient synthesis process for determining the ROI coefficient and the non-ROI coefficient in the first wavelet coefficient data of the first decomposition level on the basis of the mask data of the first decomposition level and synthesizing the ROI coefficient in the first wavelet coefficient data of the first decomposition level and a coefficient in the second wavelet coefficient data and generating synthetic image data by performing inverse wavelet transformation on the synthesized coefficient data until the decomposition level becomes a predetermined end level.

According to the above first aspect of the present invention, for example, the synthesis between the ROI in the first target image and the second target image is performed by using the first wavelet coefficient data and the second wavelet coefficient data into which the first target image data and the second target image data are converted, respectively. Further, the determination of the ROI in the first target image is performed by determining the ROI coefficient in the first wavelet coefficient data. Therefore, even when an insufficient ROI is used, a repaired ROI can be provided in the synthetic image. In other words, an excellent synthetic image can be achieved as compared with the case where the first target image data and the second target image data are synthesized without any processing performed. Further, by controlling the decomposition level of the wavelet transformation with the synthesis control data, it is possible to adjust the state of synthesis (repair of the ROI, extension of the ROI, and the like). Furthermore, it is also possible to adjust the image size of the synthetic image.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a conceptual diagram showing an image processing system in accordance with a first preferred embodiment;

FIG. 2 is a block diagram showing the image processing system in accordance with the first preferred embodiment;

FIG. 7 is a block diagram showing a mask generation unit in accordance with the first preferred embodiment;

FIG. 8 is a view showing an exemplary first basic image in accordance with the first preferred embodiment;

FIG. 31 is a flowchart showing an operation of the data supply system in accordance with the third preferred embodiment;

FIG. 40 is a flowchart showing a cut-out range determination process in accordance with the sixth preferred embodiment;

FIGS. 41 and 42 are views each showing a range of pixels required to obtain an output by one pixel in the wavelet transformation in accordance with the sixth preferred embodiment (5×3 filter);

FIGS. 43 and 44 are views each showing a range of pixels required to obtain an output by one pixel in the wavelet transformation in accordance with the sixth preferred embodiment (Daubechies 9×7 filter);

FIG. 51 is a flowchart showing how to obtain a required range (cut-out range) in accordance with the sixth preferred embodiment (Daubechies 9×7 filter);

FIGS. 55 and 56 are flowcharts showing an operation of the data supply system in accordance with the sixth preferred embodiment;

FIGS. 57 and 58 are flowcharts showing an operation of the image synthesizing system in accordance with the sixth preferred embodiment;

FIG. 60 is a block diagram showing an inverse wavelet transformation unit in accordance with the seventh preferred embodiment;

FIGS. 61 to 63 are conceptual diagrams each showing image synthesis in accordance with an eighth preferred embodiment;

FIG. 70 is a hardware configuration diagram showing an image processing apparatus in accordance with the tenth preferred embodiment.

DESCRIPTION OF THE PREFERRED EMBODIMENTS

The First Preferred Embodiment

<Overview of System>

Figure 3:
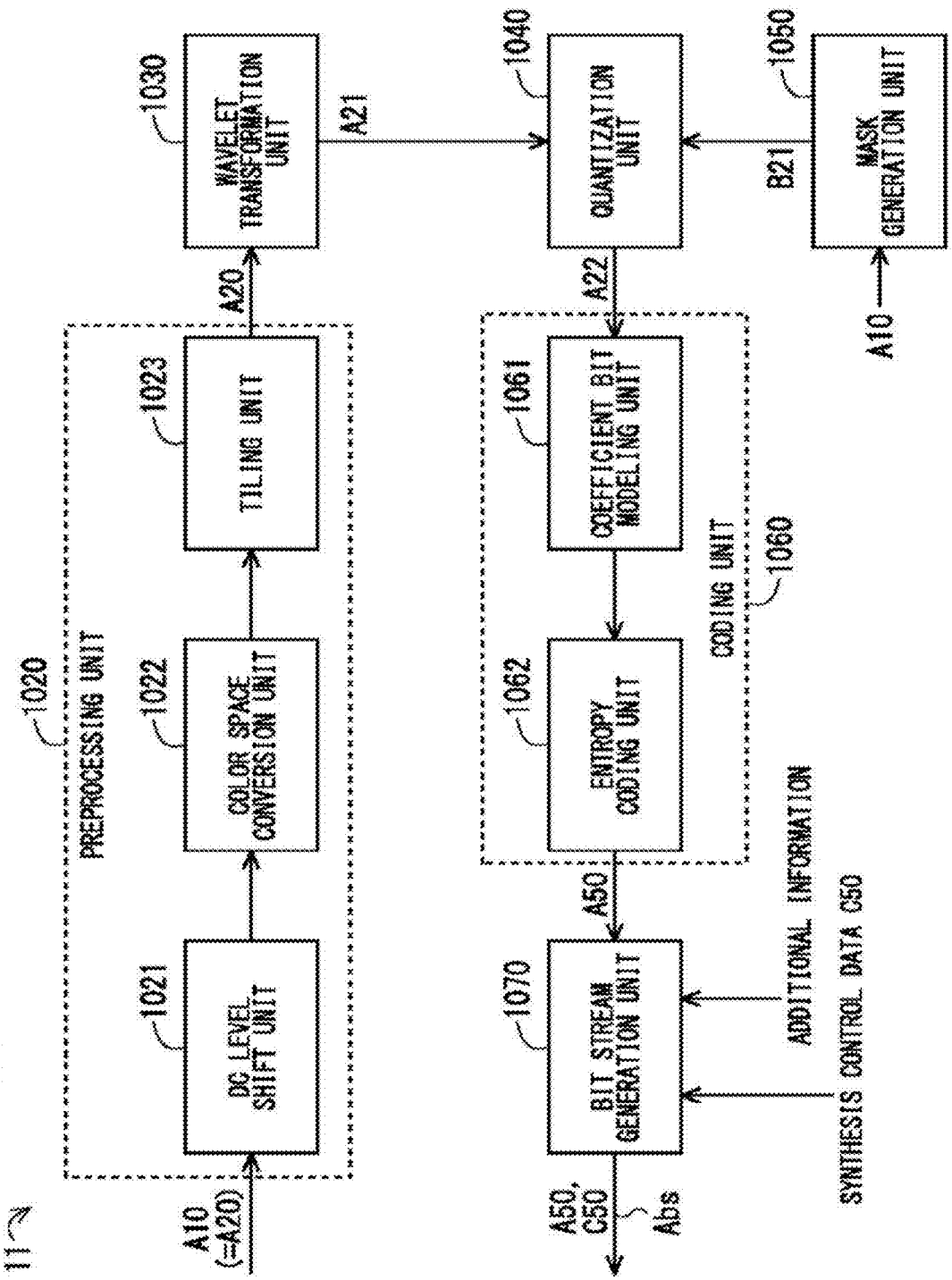
FIG. 3 is a block diagram showing a data supply system in accordance with the first preferred embodiment.

FIG. 1 is a conceptual diagram showing an image processing system 1 in accordance with the first preferred embodiment. As shown in FIG. 1, the image processing system 1 includes two image processing systems 10 and 20. One image processing system 10 includes a data supply system 11, and the other image processing system 20 includes an image synthesizing system 21. The image synthesizing system 21 performs an image synthesis process. The data supply system 11 outputs data to be used in the image synthesis process. Hereinafter, sometimes, the image processing system 1 is referred to as a whole system 1, the data supply system 11 is referred to as a supply system 11, and the image synthesizing system 21 is referred to as a synthesizing system 21.

The image processing system 10 may be constituted of only the supply system 11 or may further include other processing system(s). Similarly, the image processing system 20 may be constituted of only the synthesizing system 21 or may further include other processing system(s). Further, as can be seen from FIG. 1, the supply system 11 is included in the image processing system 10 and also included in the whole system 1. Similarly, the synthesizing system 21 is included in the image processing system 20 and also included in the whole system 1.

The image processing systems 10 and 20 are each provided as a semiconductor integrated circuit. Specifically, various functions and processings of the image processing systems 10 and 20 are implemented by the circuits, in other words, by hardware. Some of or all of the functions and processings, however, may be implemented by a program which causes a microprocessor to function, in other words, by software.

<Example of Whole System 1>

FIG. 2 shows an application example of the whole system 1. In the example of FIG. 2, the image processing system 10 is provided in a data supply-side apparatus 30, and the image processing system 20 is provided in an image synthesis-side apparatus 40. Hereinafter, the data supply-side apparatus 30 is sometimes referred to as a supply-side apparatus 30, and the image synthesis-side apparatus 40 is sometimes referred to as a synthesis-side apparatus 40. Though it is assumed that a user of the supply-side apparatus 30 is different from that of the synthesis-side apparatus 40, this is only one exemplary case.

The supply-side apparatus 30 includes a display 31, an operation unit 32, an external interface 33, and an image input unit 34, as well as the image processing system 10. The synthesis-side apparatus 40 includes a display 41, an operation unit 42, an external interface 43, and an image input unit 44, as well as the image processing system 20. Hereinafter, the external interfaces 33 and 43 are sometimes referred to as I/Fs 33 and 43.

Though the displays 31 and 41 are formed of, for example, liquid crystal displays, the displays 31 and 41 may be formed of different types of display devices. The operation units 32 and 42 are operating media by which a user inputs instructions, data, and the like to the apparatuses 30 and 40, in other words, to the image processing systems 10 and 20. The operation units 32 and 42 are each constituted of one or some of a keyboard, a mouse, a button, a switch, and the like.

The I/F 33 is a part for performing input/output of signals between the supply-side apparatus 30 and the outside of the apparatus. Similarly, the I/F 43 is a part for performing input/output of signals between the synthesis-side apparatus 40 and the outside of the apparatus. By using the I/Fs 33 and 43, transfer of information (data, instructions, and the like) can be achieved between the supply-side apparatus 30 and the synthesis-side apparatus 40.

Specifically, the I/Fs 33 and 43 include communication interfaces, and communication between the supply-side apparatus 30 and the synthesis-side apparatus 40 can be thereby achieved by using the I/Fs 33 and 43. As the communication method between the supply-side apparatus 30 and the synthesis-side apparatus 40, any one of wired communication, wireless communication, and combination thereof may be adopted. The information transfer between the supply-side apparatus 30 and the synthesis-side apparatus 40 is performed through a medium 50. When such a communication as described above is performed, the medium 50 is a wired or wireless communication medium (in other words, communication channel).

The I/Fs 33 and 43 may each include an interface for external memory medium, as well as or instead of the communication interface. In such a case, the information transfer between the supply-side apparatus 30 and the synthesis-side apparatus 40 can be performed through the external memory medium, and the external memory medium corresponds to the medium 50 which is interposed between the supply-side apparatus 30 and the synthesis-side apparatus 40.

The image input unit 34 is formed of a digital camera. Alternatively, the image input unit 34 may be a memory device which supplies image data. The image input unit 44 also has the same constitution as the image input unit 34. Further, the image input units 34 and 44 may be formed of different types of devices.

The respective constitutions of the supply-side apparatus 30 and the synthesis-side apparatus 40 are not limited to those shown in FIG. 2. Specifically, some of the above-described constituent elements may be omitted or additional constituent element(s) may be provided.

<Example of Supply System 11>

FIG. 3 shows an exemplary constitution of the supply system 11. The supply system 11 has a function of coding image data as described below. With this coding function, the supply system 11 codes first target image data A20 which are data of a first target image, which is to be supplied to the synthesizing system 21, to thereby generate coded image data A50. Further, the coded image data A50 are sometimes referred to simply as coded data A50.

Furthermore, in general, coding is adopted for compression of image data. Therefore, the words of "compression" and "coding" are sometimes used as synonymous words, and for example, image compression is sometimes referred to as image coding or image compression-coding. Similarly, the words of "expansion" and "decoding" arc sometimes used as synonymous words, and for example, image expansion is sometimes referred to as image decoding or image expansion-decoding.

The coded data A50 are outputted from the supply system 11 as a bit stream Abs for coded data A50 (hereinafter, referred to as coded bit stream Abs) and supplied to the synthesizing system 21.

On the other hand, an image inputted to the supply system 11 is an image serving as a source of the first target image, and therefore the inputted image is sometimes referred to as a first basic image. In the first preferred embodiment, description will be made on a case where the whole of the first basic image constitutes the first target image, in other words, a case where the first basic image is identical to the first target image. Further, for the description to be made later, reference sign "A10" different from reference sign "A20" of the first target image data is given to first basic image data which are data of the first basic image.

The first target image is an image including an ROI (Region Of Interest) and provides a main image in image synthesis performed in the synthesizing system 21. The ROI in the first target image is naturally present in the first basic image. The first basic image and the first target image may be each an image captured by the digital camera or the like, or computer graphics.

In the exemplary constitution of FIG. 3, the supply system 11 includes a preprocessing unit 1020, a wavelet transformation unit 1030, a quantization unit 1040, a mask generation unit 1050, a coding unit 1060, and a bit stream generation unit 1070.

<Preprocessing Unit 1020>

The preprocessing unit 1020 performs a predetermined preprocessing on first target image data A20. In the exemplary constitution of FIG. 3, the preprocessing unit 1020 includes a DC level shift unit 1021, a color space conversion unit 1022, and a tiling unit 1023.

The DC level shift unit 1021 converts a DC level of the first target image data A20 as necessary. The color space conversion unit 1022 converts a color space of the image data after being subjected to the DC-level conversion. For example, a RGB component is converted into a YCbCr component (consisting of a luminance component Y and color difference components Cb and Cr). The tiling unit 1023 divides the image data after being subjected to the color-space conversion into a plurality of region components each of which is called a "tile" and has a rectangular shape. Then, the tiling unit 1023 supplies the image data to the wavelet transformation unit 1030 in a unit of tile. Further, it is not always necessary to divide the image data into the tiles, and a frame of image data outputted from the color space conversion unit 1022 may be directly supplied to the wavelet transformation unit 1030.

<Wavelet Transformation Unit 1030>

The wavelet transformation unit 1030 performs a wavelet transformation process. Specifically, the wavelet transformation unit 1030 performs integer-type or real-number-type discrete wavelet transformation (DWT) on the first target image data A20 after being subjected to the preprocessing, and outputs a transformation coefficient obtained as the result of the DWT. Hereinafter, the transformation coefficient is sometimes referred to as, for example, a wavelet transformation coefficient or a wavelet coefficient. Further, the data (a group of wavelet coefficients) generated by performing the wavelet transformation on the first target image data A20 are referred to as first wavelet coefficient data A21.

In the wavelet transformation, two-dimensional image data are decomposed into a high-frequency component and a low-frequency component. The frequency decomposition is also termed, for example, band division or band decomposition. Each of the band components obtained by the frequency decomposition (i.e., each of the low-frequency component and the high-frequency component) is also referred to as a sub-band. Herein, following the basic scheme of JPEG (Joint Photographic Experts Group) 2000, adopted is an octave division scheme in which only the band components on the low-frequency side obtained by the frequency decomposition both in the vertical and horizontal directions are recursively band-divided. The number of executions of the recursive band division is termed a decomposition level.

The wavelet transformation unit 1030 decomposes the first target image data A20 to a predetermined decomposition level. When the decomposition level is in a range of about 3 to 5, in general, an excellent coding efficiency can be achieved. Further, in the wavelet transformation unit 1030, the predetermined decomposition level is sometimes referred to as an initial decomposition level.

Figure 4:
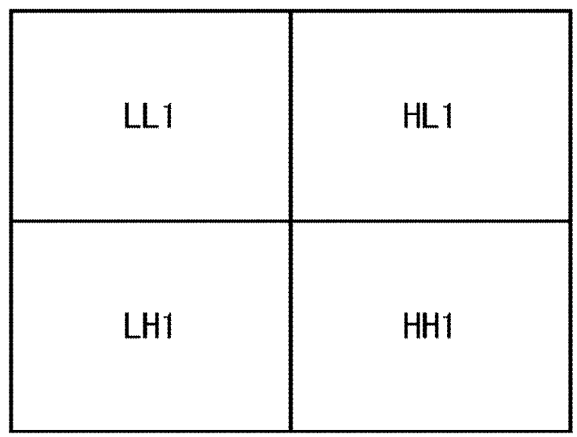
FIG. 4 is a view showing a Mallat-type wavelet plane (decomposition level 1) in accordance with the first preferred embodiment.
Figure 5:
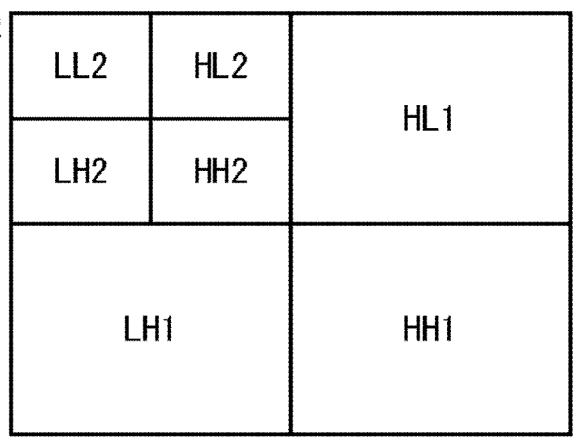
FIG. 5 is a view showing a Mallat-type wavelet plane (decomposition level 2) in accordance with the first preferred embodiment.
Figure 6:
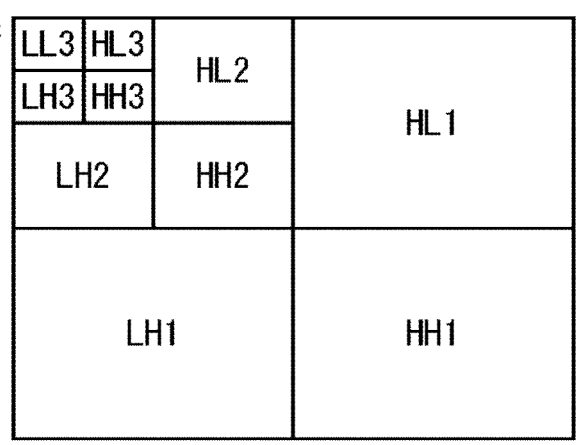
FIG. 6 is a view showing a Mallat-type wavelet plane (decomposition level 3) in accordance with the first preferred embodiment.

FIGS. 4 to 6 are views showing Mallat-type wavelet planes 61 to 63 in the two-dimensional wavelet transformation, respectively. In the exemplary cases of FIGS. 4 to 6, at the decomposition level 1 (see FIG. 4), the input image (two-dimensional image) is subjected to the frequency decomposition with respect to both the vertical and horizontal directions. The image is thereby decomposed into four band components HH1, HL1, LH1, and LL1, as shown in the wavelet plane 61 of FIG. 4. The band component LL1 obtained at the decomposition level 1 is further decomposed into four band components HH2, HL2, LH2, and LL2 at the decomposition level 2 (see the wavelet plane 62 of FIG. 5). The band component LL2 obtained at the decomposition level 2 is further decomposed into four band components HH3, HL3, LH3, and LL3 at the decomposition level 3 (see the wavelet plane 63 of FIG. 6).

As to the notation on the two-dimensional wavelet transformation, for example, HL1 is a band component consisting of a horizontal high-frequency component H and a vertical low-frequency component L at the decomposition level 1. The notation is generalized as "XYm" (Each of X and Y is either one of H and L. m is an integer not smaller than 1). Specifically, a band component consisting of a horizontal band component X and a vertical band component Y at a decomposition level m is represented as "XYm".

Herein, each of the wavelet planes (see FIGS. 4 to 6) is a data group in which calculation result data of the wavelet transformation is two-dimensionally arrayed, being associated with an arrangement of pixels in an original image (an image which is not subjected to the wavelet transformation yet). For example, in a region represented as the band component LL1 on the wavelet plane, the calculation result data (LL component data) obtained by using a pixel in the original image as a pixel of interest are arranged corresponding to the position of the pixel of interest in the original image. Further, the wavelet plane is sometimes termed a wavelet space, a wavelet region, or a wavelet image.

At the decomposition level 1, the band component LL1 corresponds to essential information of the image. Further, with the band component LL1, it is possible to provide an image having a size that is 1/4 the image obtained before the decomposition (in other words, an image obtained by reducing the image before the decomposition with a reduction ratio of 1/2). The band component HL1 corresponds to information of an edge extending in the vertical direction, and the band component LH1 corresponds to information of an edge extending in the horizontal direction. The band component HH1 corresponds to information of an edge extending in an oblique direction. The same applies to those at other decomposition levels. For example, the band components LL2, HL2, LH2, and HH2 at the decomposition level 2 have the same relationship as that of the band components LL1, HL1, LH1, and HH1 in a case where the band component LL1 obtained before the decomposition is regarded as the original image.

Hereinafter, when the original image which is not subjected to the wavelet transformation yet corresponds to the decomposition level 0, the original image is sometimes referred to as a wavelet plane of decomposition level 0.

Further, it is assumed that the band component which is decomposed most in the wavelet plane is referred to as a highest-order band component. Specifically, in the wavelet plane 63 of decomposition level 3 (see FIG. 6), the highest-order band components are LL3, HL3, LH3, and HH3. In generalized notation, in the wavelet plane of decomposition level k, the highest-order band components are LLk, HLk, LHk, and HHk. Furthermore, among the band components obtained by decomposition performed the same number of times, it is assumed that the band component LL is referred to as a lowest-frequency band component and the band component HH is referred to as a highest-frequency band component.

In the Mallat-type wavelet transformation, as described above, the LL component is recursively decomposed both in the horizontal and vertical directions the same number of times. Further, in the Mallat-type wavelet transformation, as described later, the band component is synthesized in a reverse procedure of the decomposition. It is not necessary, however, that the L component and the H component in each of the horizontal and vertical directions are decomposed and synthesized the same number of times. In other words, wavelet transformation which is different in type from the Mallat-type one may be used.

Further, description will be made on an exemplary case where the upper left end in the original image and the wavelet plane is adopted as a point of origin of a coordinate system and it is assumed that the point of origin is 0, an L-component output of the wavelet transformation is an even number, and an H-component output thereof is an odd number. It may be assumed, however, that the L-component output is an odd number and the H-component output is an even number. The wavelet planes (see FIGS. 4 to 6) are each a conceptual plane in which the even-numbered and odd-numbered outputs of the wavelet transformation are relocated for each band component.

<Quantization Unit 1040>

With reference back to FIG. 3, the quantization unit 1040 performs a quantization process. Specifically, the quantization unit 1040 performs scalar quantization on the first wavelet coefficient data A21 supplied from the wavelet transformation unit 1030 on the basis of a quantization step size, to thereby generate quantized wavelet coefficient data A22. The quantization step size is set in accordance with, for example, a target image quality.

Particularly, the quantization unit 1040 performs a coefficient determination process for determining a coefficient related to the ROI in the first target image (hereinafter, referred to also as an ROI coefficient) and another coefficient related to the non-ROI in the first target image (hereinafter, referred to also as a non-ROI coefficient) in the pieces of data (i.e., coefficient values) constituting the first wavelet coefficient data A21. Then, the quantization unit 1040 performs quantization of the first wavelet coefficient data A21 so that the non-ROI coefficient after the quantization may become 0. Such quantization can be achieved by, for example, the technique for determining a quantization value on the basis of a norm (see Japanese Patent Application Laid Open Gazette No. 2006-203 409).

The quantization unit 1040 performs the coefficient determination process on the basis of mask data B21 supplied from the mask generation unit 1050. The mask data B21 provides a mask to be used for determining the ROI coefficient and the non-ROI coefficient in the first wavelet coefficient data A21.

<Mask Generation Unit 1050>

The mask generation unit 1050 performs a mask generation process. Specifically, the mask generation unit 1050 generates the mask data B21 which are data of the mask to be used for determining the ROI coefficient and the non-ROI coefficient in the first wavelet coefficient data A21.

FIG. 7 shows an exemplary constitution of the mask generation unit 1050. In the exemplary constitution of FIG. 7, the mask generation unit 1050 includes a basic mask generation unit 1051 and a mask development unit 1052.

<Basic Mask Generation Unit 1051>

The basic mask generation unit 1051 performs a basic mask generation process. Specifically, the basic mask generation unit 1051 generates, on the basis of the first basic image data A10, basic mask data B10 which are data of the basic mask to be used for determining the ROI and the non-ROI in the range of the first basic image.

The basic mask generation unit 1051 can be implemented by various mask generation techniques. For example, a technique for detecting a moving body in a moving image is well known, and by using the moving body detection technique, a mask in which the moving body in the moving image is set as an ROI can be generated. As to the moving body detection technique, for example, see Japanese Patent Application Laid Open Gazette Nos. 2013-254291, 2007-088897, and 2006-093784. Further, in Japanese Patent Application Laid Open Gazette Nos. 2009-199363 and 2005-165688, for example, disclosed is a technique using a particle filter to track a moving body. By using such a moving body tracking technique, it is possible to increase the moving body detection accuracy and reduce the amount of computation.

Further, another technique is well known where with a still image captured by a digital camera as an object, a foreground image and a background image are separated from the whole image by a graph cut method. When the basic mask generation unit 1051 is implemented by using such an image separation technique, a mask in which the foreground image is set as the ROI can be generated.

Furthermore, the basic mask generation unit 1051 performs the preprocessing as appropriate in the mask generation. When the first basic image data A10 are captured image data (Bayer data) which is captured by a digital camera, for example, the Bayer data are converted into RGB color data. When the first basic image has a large size, a reduction process is performed to reduce the amount of computation. Further, in order to extract the feature value, color space conversion into black and white, YUV, HSV, or the like is performed.

FIG. 8 shows an exemplary first basic image 60. In the first basic image 60, it is assumed that the part of a moving person is set as an ROI 60a and the other part is set as a non-ROI 60b.

Figure 9:
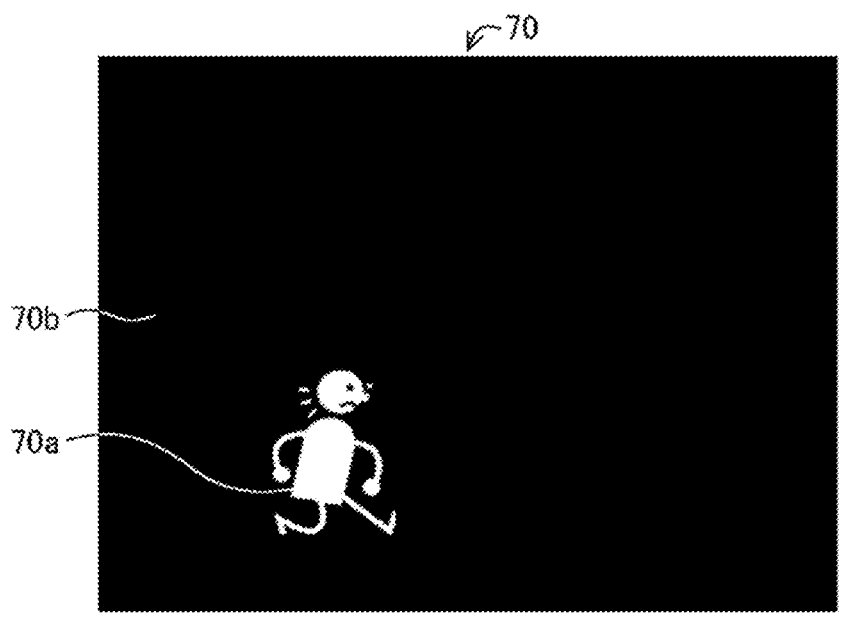
FIG. 9 is a view showing an exemplary basic mask in accordance with the first preferred embodiment.

FIG. 9 shows a basic mask 70 corresponding to the whole range of the first basic image 60. The basic mask 70 can be understood as an image indicating whether each pixel in the first basic image 60 belongs to the ROI 60a or the non-ROI 60b. The basic mask 70 has an ROI corresponding portion 70a and a non-ROI corresponding portion 70b corresponding to the ROI 60a and the non-ROI 60b in the first basic image 60, respectively. In FIG. 9, the white portion is the ROI corresponding portion 70a and the black portion is the non-ROI corresponding portion 70b.

Further, in the moving image, the basic mask 70 may be generated for all the frame images or may be generated, for example, for every certain number of frames or every certain times. The same applies to a case where still images are sequentially inputted.

<Mask Development Unit 1052>

The mask development unit 1052 performs a mask development process. Specifically, the mask development unit 1052 develops the ROI corresponding portion and the non-ROI corresponding portion in the basic mask for each band component included in the first wavelet coefficient data A21 (in other words, for each band component included in the wavelet plane corresponding to the first wavelet coefficient data A21). By performing such a mask development process, a developed mask which is a mask for the first wavelet coefficient data A21 is generated. As to the mask development, for example, see Japanese Patent Application Laid Open Gazette No. 2006-203409 and Japanese Unexamined Patent Application Publication (Translation of PCT Application) No. 2001-520466, and INTERNATIONAL STANDARD ISO/IEC 15444-1 ITU-T RECOMMENDATION T.800 Information technology—JPEG 2000 image coding system: Core coding system Annex H—Coding of images with regions of interest.

The developed mask generated by the mask development unit 1052 is the above-described mask to be used for determining the ROI coefficient and the non-ROI coefficient in the first wavelet coefficient data A21. Specifically, the mask generation unit 1050 generates and outputs the data of the developed mask as the above-described mask data B21.

Figure 10:
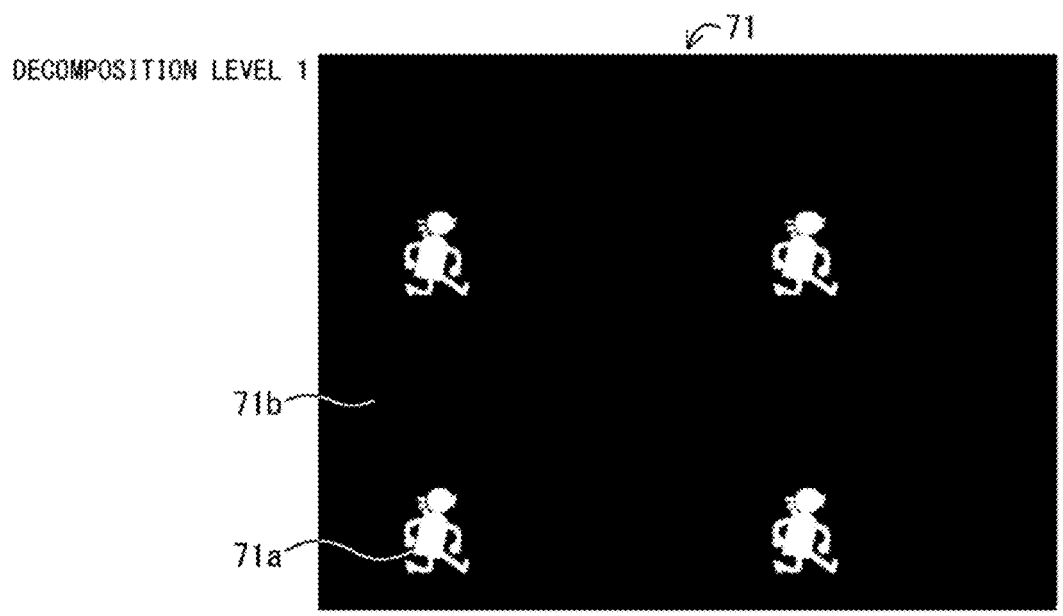
FIG. 10 is a view showing a developed mask (decomposition level 1) in accordance with the first preferred embodiment.
Figure 11:
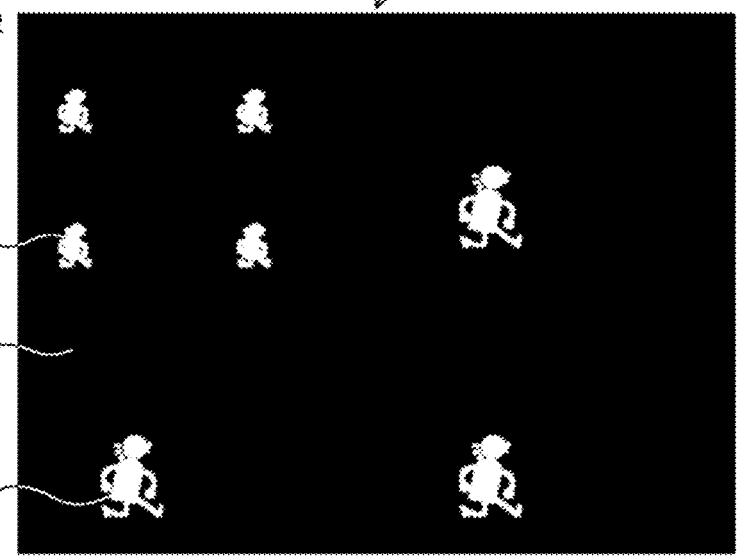
FIG. 11 is a view showing a developed mask (decomposition level 2) in accordance with the first preferred embodiment.
Figure 12:
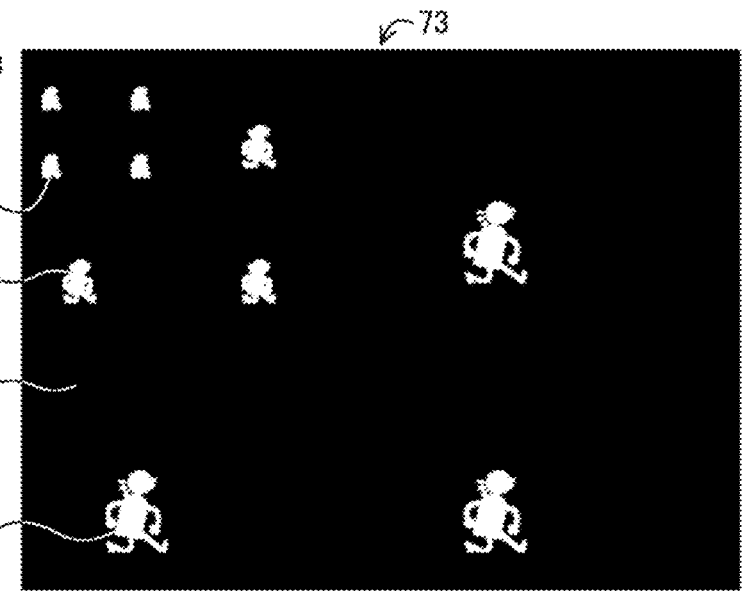
FIG. 12 is a view showing a developed mask (decomposition level 3) in accordance with the first preferred embodiment.

FIGS. 10 to 12 are views showing developed masks 71, 72, and 73 in which the basic mask 70 of FIG. 9 is developed on the wavelet planes 61 to 63 (see FIGS. 4 to 6) of decomposition levels 1, 2, and 3, respectively. In the developed masks 71, 72, and 73, the ROI corresponding portions 71*a*, 72*a*, and 73*a* are represented in white, and the non-ROI corresponding portions 71*b*, 72*b*, and 73*b* are represented in black.

Figure 13:
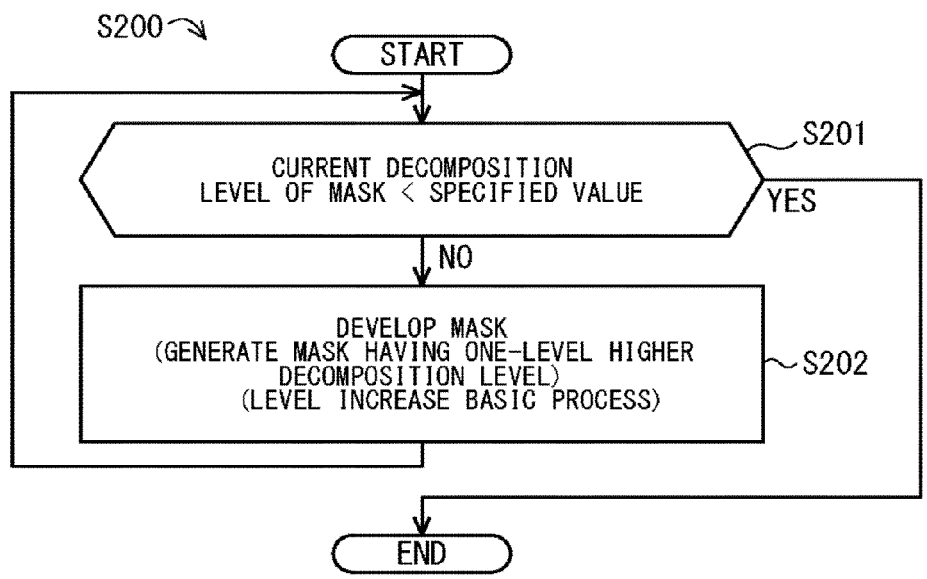
FIG. 13 is a flowchart showing a mask development process in accordance with the first preferred embodiment.

FIG. 13 is a flowchart showing the mask development process. In the mask development process S200 of FIG. 13, performed is a process S202 of increasing the decomposition level of the mask by one level (hereinafter, referred to also as a level increase basic process). When the decomposition level of the first wavelet coefficient data A21 is 2 or higher, the level increase basic process S202 is repeated until the mask having the same decomposition level as that of the first wavelet coefficient data A21 is obtained (see Step S201).

In the level increase basic process S202, a first mask for a first wavelet plane is converted into a second mask for a second wavelet plane having a decomposition level which is one-level higher than that of the first wavelet plane. Further, when the first mask to be developed is an original mask, the above-described first wavelet plane corresponds to the original age before the wavelet transformation. By representing the original image as the wavelet plane of decomposition level 0, as described above, it can be understood that the first wavelet plane also includes the original image.

The level increase basic process S202 is recursively repeated. Specifically, by setting the second mask to a next first mask, the level increase basic process S202 is performed again. Further, the level increase basic process S202 is repeated in accordance with the method (scheme) of the wavelet transformation. When the above-described Mallat-type method is adopted (see FIGS. 4 to 6), for example, in the wavelet plane, only the lowest-frequency band component LL is recursively decomposed. For this reason, the mask development is also recursively performed only on the part corresponding to the band component LL.

The level increase basic process S202 is performed on the basis of a predetermined mask development condition, and the mask development condition depends on the number of taps of a filter used for the wavelet transformation.

Figure 14:
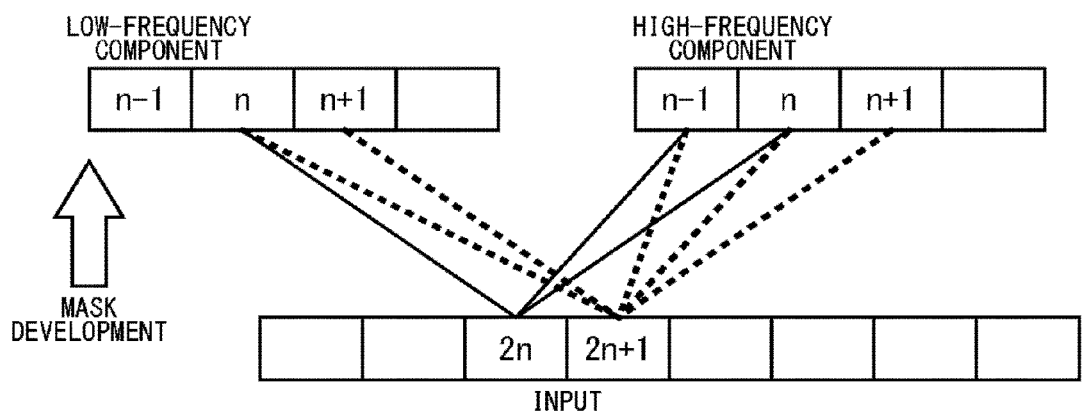
FIG. 14 is a diagram showing the mask development process in a case where a 5×3 filter is used for the wavelet transformation in accordance with the first preferred embodiment.

When a 5×3 filter is used in an arithmetic operation of the wavelet transformation, for example, the mask development condition includes two conditions (referred to as a first development condition and a second development condition) based on FIG. 14. In the 5×3 filter, a low-pass filter on the decomposition side has five taps and a high-pass filter on the decomposition side has three taps.

The first development condition: When the even-numbered (represented as the 2n-th where n is an integer) data on the first wavelet plane are associated with the ROI by the first mask, the second mask is formed so that the n-th data of the low-frequency component (corresponding to output data on the low-pass filter side) on the second wavelet plane may be associated with the ROI. Along with that, the second mask is formed so that the $\{n-1\}$th data and the n-th data of the high-frequency component (corresponding to output data on the high-pass filter side) on the second wavelet plane may be associated with the ROI.

The second development condition: When the $\{2n+1\}$th data on the first wavelet plane are associated with the ROI by the first mask, the second mask is formed so that the n-th data and the $\{n+1\}$th data of the low-frequency component and the $\{n-1\}$th data to the $\{n+1\}$th data of the high-frequency component on the second wavelet plane may be associated with the ROI.

Figure 15:
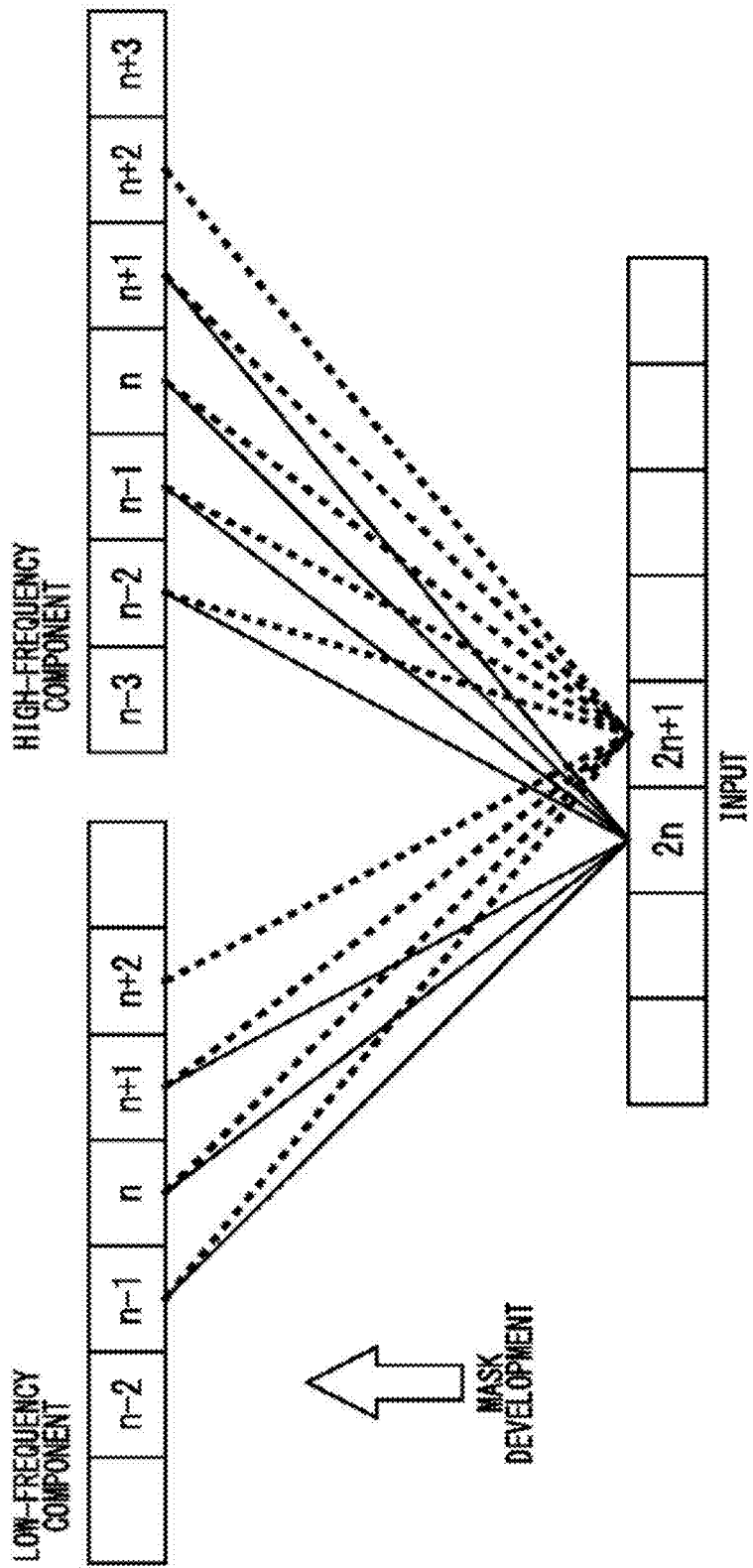
FIG. 15 is a diagram showing the mask development process in a case where a Daubechies 9×7 filter is used for the wavelet transformation in accordance with the first preferred embodiment.

Further, when a Daubechies 9×7 filter is used in an arithmetic operation of the wavelet transformation, the mask development condition includes two conditions (referred to as a third development condition and a fourth development condition) based on FIG. 15. In the Daubechies 9×7 filter, a low-pass filter on the decomposition side has nine taps and a high-pass filter on the decomposition side has seven taps.

The third development condition: When the 2n-th data on the first wavelet plane are associated with the ROI by the first mask, the second mask is formed so that the $\{n-1\}$th data to the $\{n+1\}$th data of the low-frequency component and the $\{n-2\}$th data to the $\{n+1\}$th data of the high-frequency component on the second wavelet plane may be associated with the ROI.

The fourth development condition: When the $\{2n+1\}$th data on the first wavelet plane are associated with the ROI by the first mask, the second mask is formed so that the $\{n-1\}$th data to the $\{n+2\}$th data of the low-frequency component and the $\{n-2\}$th data to the $\{n+2\}$th data of the high-frequency component on the second wavelet plane may be associated with the ROI.

When the decomposition level of the first wavelet coefficient data A21 is 3, the mask generation unit 1050 generates the developed mask 73 of decomposition level 3 (see FIG. 12), and supplies the developed mask 73 to the quantization unit 1040. The quantization unit 1040 performs the coefficient determination process on the first wavelet coefficient data A21 of decomposition level 3, i.e., the wavelet plane 63 of decomposition level 3 (see FIG. 6) on the basis of the distinction between the ROI corresponding portion 73*a* and the non-ROI corresponding portion 73*b* in the developed mask 73. Then, as described above, on the basis of the coefficient determination result, the quantization unit 1040 generates the quantized wavelet coefficient data A22 of decomposition level 3 so that the value of the non-ROI coefficient in the first wavelet coefficient data A21, after the quantization, may become 0.

<Coding Unit 1060>

With reference back to FIG. 3, the coding unit 1060 performs a coding process. Specifically, the coding unit 1060 performs a predetermined coding on the quantized wavelet coefficient data A22 generated by the quantization unit 1040, to thereby generate the coded data A50. In the predetermined coding, for example, entropy coding is performed in accordance with EBCOT (Embedded Block Coding with Optimized Truncation) for bit-plane coding. In the exemplary constitution of FIG. 3, the coding unit 1060 includes a coefficient bit modeling unit 1061 and an entropy coding unit 1062.

The coefficient bit modeling unit 1061 performs a bit modeling process on the quantized wavelet coefficient. Herein, the bit modeling process is performed by using the already-known technique, and detailed description will be omitted.

The coefficient bit modeling unit 1061 divides the inputted band component into regions each having about 32×32 or 64×64 size, the regions being termed "code blocks". Then, the coefficient bit modeling unit 1061 assigns bit values constituting a binary value of each quantized wavelet coefficient in the code block to different bit planes, respectively. The bit modeling process is performed in a unit of bit plane.

The entropy coding unit 1062 performs entropy coding on the data generated by the coefficient bit modeling unit 1061, to thereby generate coded image data. As the entropy coding, for example, the already-known arithmetic coding is used.

Further, the coding unit 1060 may control the amount of codes by performing rate control on the coded image data generated by the entropy coding unit 1062.

<Bit Stream Generation Unit 1070>

The bit stream generation unit 1070 performs a bit stream generation process. Specifically, the bit stream generation unit 1070 multiplexes the coded data A50 outputted from the coding unit 1060 with additional information, to thereby generate the coded bit stream Abs in conformity with JPEG 2000. As the additional information, for example, used is (are) header information, a layer structure, scalability information, a quantization table, or/and the like.

Particularly, as shown in FIG. 3, the bit stream generation unit 1070 acquires synthesis control data C50 and also embeds the synthesis control data C50 into the coded bit stream Abs. The synthesis control data C50 are data to be used to control the state of synthesis in the image synthesis process performed by the synthesizing system 21. Herein, the synthesis control data C50 are supplied to the supply system 11 by user input to the operation unit 32 provided on the side of the supply system 11.

The coded bit stream Abs has a region having no effect on the coded data, and the bit stream generation unit 1070 embeds the synthesis control data C50 into the region. As such a region in the coded bit stream Abs, for example, a header region, a comment region in a format of the coded stream, an application marker (APP marker) region, or the like can be used.

<Operation of Supply System 11>

Figure 16:
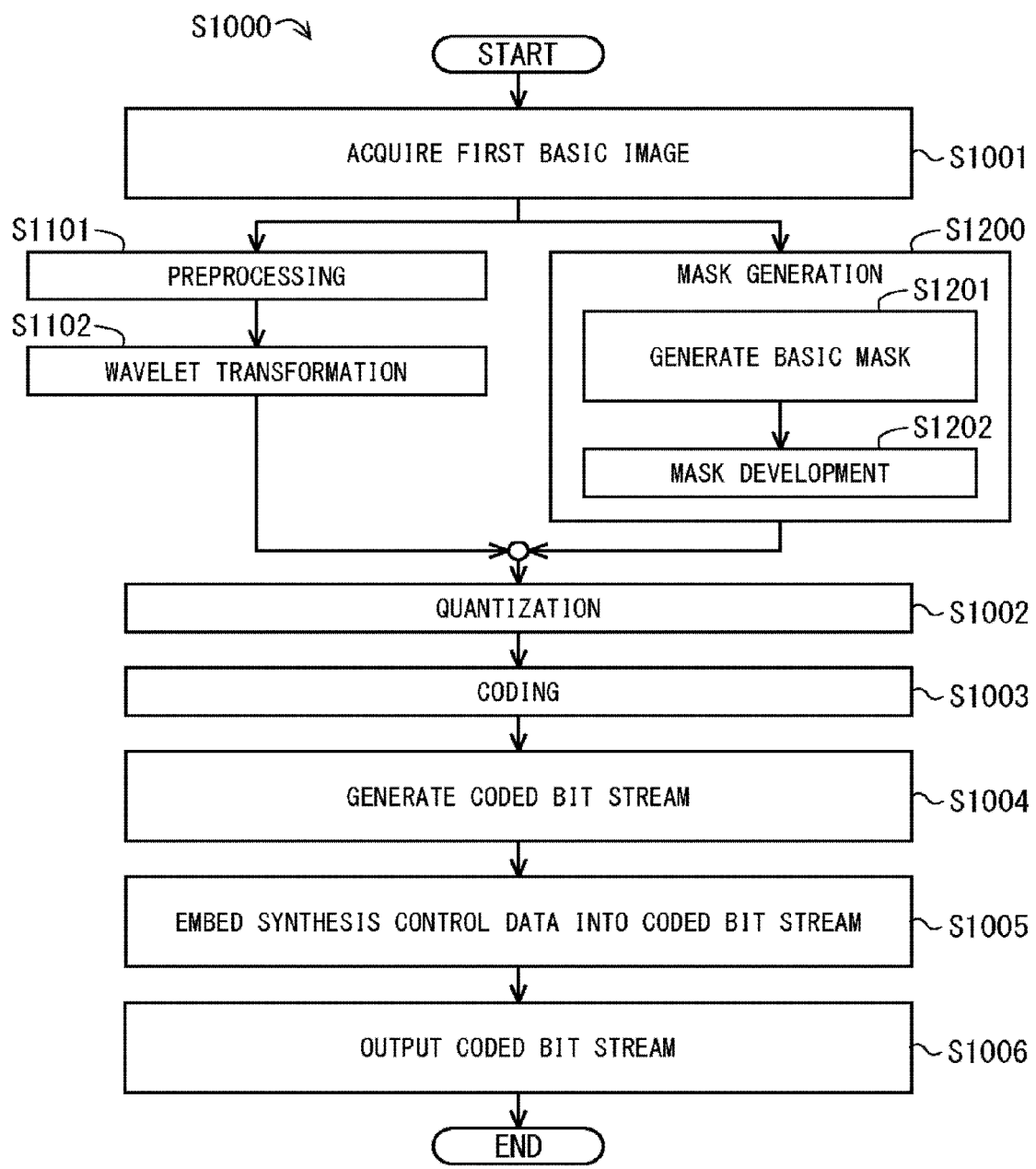
FIG. 16 is a flowchart showing an operation of the data supply system in accordance with the first preferred embodiment.

FIG. 16 is a flowchart showing an operation of the supply system 11. In an operation flow S1000 of FIG. 16, when the first basic image data A10 are inputted to the supply system 11, the preprocessing unit 1020 and the mask generation unit 1050 acquire the first basic image data A10 (Step S1001).

The preprocessing unit 1020 performs the predetermined preprocessing on the first basic image data A10, in other words, the first target image data A20 (Step S1101). Next, the wavelet transformation unit 1030 performs the wavelet transformation on the first target image data A20 after being subjected to the preprocessing, to a predetermined decomposition level, to thereby generate the first wavelet coefficient data A21 (Step S1102).

On the other hand, the mask generation unit 1050 generates the data B21 of the mask for the first wavelet coefficient data A21, i.e., the developed mask corresponding to the decomposition level of the first wavelet coefficient data A21, on the basis of the first basic image data A10 (Step S1200). Specifically, the basic mask generation unit 1051 performs the above-described basic mask generation process (Step S1201), and the mask development unit 1052 performs the above-described mask development process (Step S1202).

Further, though Step S1200 is performed concurrently with Steps S1101 and S1102 in the exemplary operation flow of FIG. 16, Step S1200 may be performed before or after Steps S1101 and S1102.

The first wavelet coefficient data A21 generated in Step S1102 and the mask data 1321 generated in Step S1200 are inputted to the quantization unit 1040. The quantization unit 1040 performs the quantization on the first wavelet coefficient data A21 so that the value of the non-ROI coefficient in the first wavelet coefficient data A21 after the quantization may become 0 as described above, on the basis of the mask data B21 (Step S1002). The quantized wavelet coefficient data A22 are thereby generated. The quantized wavelet coefficient data A22 are coded by the coding unit 1060, thereby the coded data A50 are generated (Step S1003). The coded data A50 are converted into the coded bit stream Abs for the first target image by the bit stream generation unit 1070 (Step S1004).

Further, the bit stream generation unit 1070 acquires the synthesis control data C50, and embeds the synthesis control data C50 into the coded bit stream Abs as described above (Step S1005). Furthermore, the synthesis control data C50 may be inputted in Step S1005, or the synthesis control data C50 which are inputted in advance and held may be used in Step S1005.

After that, the coded bit stream Abs is outputted from the bit stream generation unit 1070 (Step S1006).

<Medium 50>

The coded bit stream Abs is outputted, with the synthesis control data C50 embedded therein as described above, from the supply system 11, and in the exemplary case of FIG. 2, outputted from the I/F 33 to the outside of the supply-side apparatus 30. Then, the coded bit stream Abs with the synthesis control data C50 embedded therein is inputted to the synthesizing system 21 through the I/F 43. At that time, a medium 50 (see FIG. 2) is used. Since the synthesis control data C50 are embedded in the coded bit stream Abs for the coded data A50 herein, the coded data A50 and the synthesis control data C50 are supplied to the synthesizing system 21 through the same medium 50 (for example, a communication medium or an external memory medium).

<Example of Synthesizing System 21>

Figure 17:
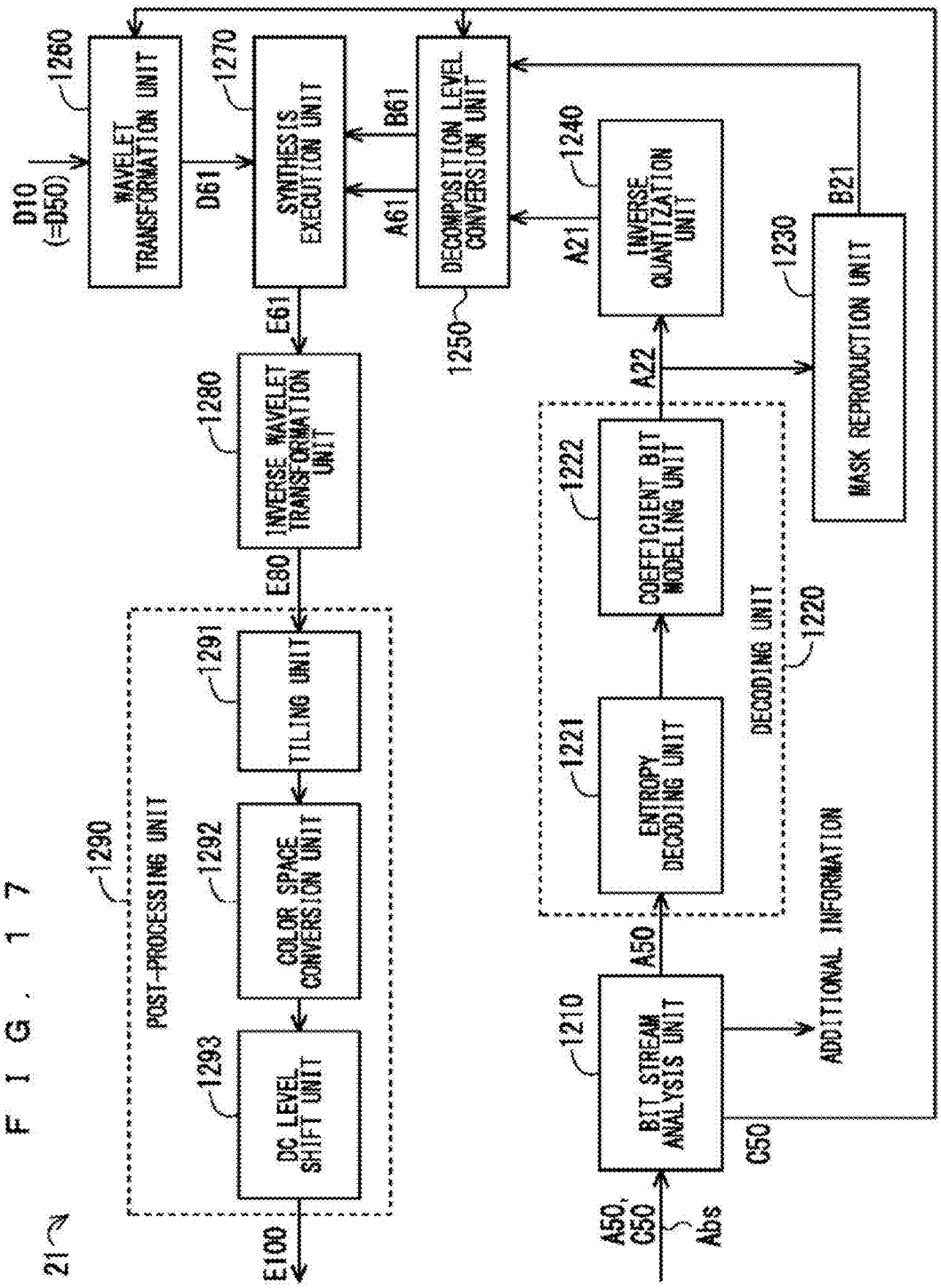
FIG. 17 is a block diagram showing an image synthesizing system in accordance with the first preferred embodiment.

FIG. 17 is an exemplary constitution of the synthesizing system 21. In the exemplary constitution of FIG. 17, the synthesizing system 21 includes a bit stream analysis unit 1210, a decoding unit 1220, a mask reproduction unit 1230, an inverse quantization unit 1240, a decomposition level conversion unit 1250, a wavelet transformation unit 1260, a synthesis execution unit 1270, an inverse wavelet transformation unit 1280, and a post-processing unit 1290.

<Bit Stream Analysis Unit 1210>

The bit stream analysis unit 1210 performs a bit stream analysis process. Specifically, the bit stream analysis unit 1210 analyzes the coded bit stream Abs in conformity with JPEG 2000 and extracts the coded data A50, the additional information, and the synthesis control data C50 from the coded bit stream Abs. The coded data A50 are supplied to the decoding unit 1220. The various additional information are supplied to predetermined processing units, respectively. The synthesis control data C50 are supplied to the decomposition level conversion unit 1250 and the wavelet transformation unit 1260.

<Decoding Unit 1220>

The decoding unit 1220 performs a decoding process. Specifically, the decoding unit 1220 performs predetermined decoding on the coded data A50. The predetermined decoding is basically an inverse processing of the coding performed by the coding unit 1060 shown in FIG. 3, except the code amount control. By performing the predetermined decoding, the quantized wavelet coefficient data A22 are generated from the coded data A50. In the exemplary constitution of FIG. 17, the decoding unit 1220 includes an entropy decoding unit 1221 and a coefficient bit modeling unit 1222.

The entropy decoding unit 1221 performs entropy decoding on the coded data A50, to thereby generate bit data. The entropy decoding is an inverse processing of the entropy coding performed by the entropy coding unit 1062 shown in FIG. 3.

The coefficient bit modeling unit 1222 performs a bit modeling process on the bit data generated by the entropy decoding unit 1221, to thereby restore the quantized wavelet coefficient data A22. The bit modeling process performed herein is an inverse processing of that performed by the coefficient bit modeling unit 1061 shown in FIG. 3. The quantized wavelet coefficient data A22 generated by the coefficient bit modeling unit 1222 are supplied to the mask reproduction unit 1230 and the inverse quantization unit 1240.

<Mask Reproduction Unit 1230>

The mask reproduction unit 1230 performs a mask reproduction process. Specifically, the mask reproduction unit 1230 reproduces the developed mask which is applied in the generation of the quantized wavelet coefficient data A22 performed by the supply system 11 by determining respective values of pieces of data constituting the quantized wavelet coefficient data A22.

Figure 18:
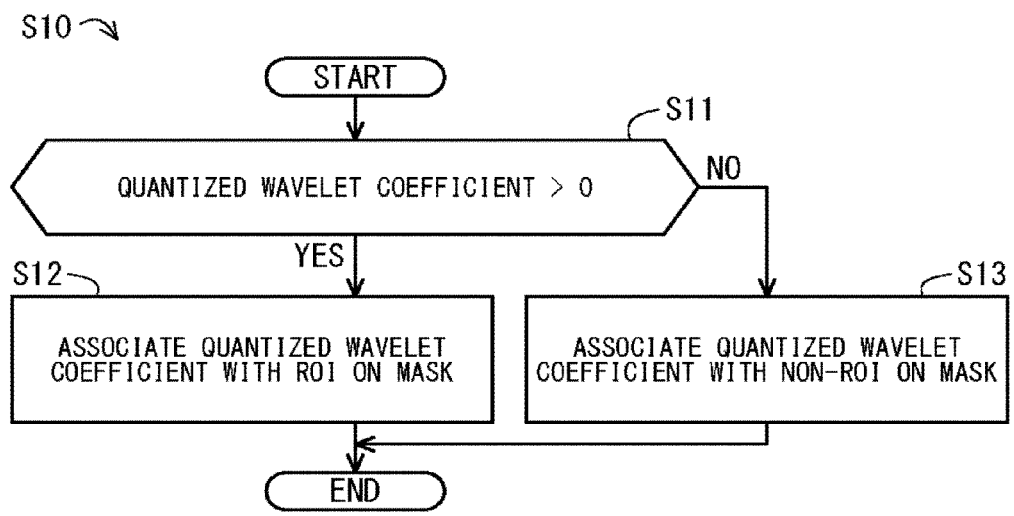
FIG. 18 is a flowchart showing a mask reproduction process in accordance with the first preferred embodiment.

In other words, as described above, the quantized wavelet coefficient data A22 are generated so that the value of the non-ROI coefficient in the first wavelet coefficient data A21 after the quantization may become 0. In consideration of this point, the mask reproduction unit 1230 determines the ROI coefficient and the non-ROI coefficient in the quantized wavelet coefficient data A22 by determining whether the respective values of pieces of data constituting the quantized wavelet coefficient data A22 are each 0 or not (see Step S11 in the mask reproduction process S10 shown in FIG. 18). Then, on the basis of the determination result, the mask reproduction unit 1230 reproduces the mask data B21 which are data of the above developed mask corresponding to the quantized wavelet coefficient data A22 (see Steps S12 and S13 in the mask reproduction process S10 shown in FIG. 18).

<Inverse Quantization Unit 1240>

With reference back to FIG. 17, the inverse quantization unit 1240 performs an inverse quantization process. Specifically, the inverse quantization unit 1240 performs the inverse quantization on the quantized wavelet coefficient data A22. The inverse quantization performed herein is an inverse processing of the quantization performed by the quantization unit 1040 shown in FIG. 3. By the inverse quantization, the quantized wavelet coefficient data A22 are converted into the first wavelet coefficient data A21.

<Decomposition Level Conversion Unit 1250>

The decomposition level conversion unit 1250 acquires the first wavelet coefficient data A21 from the inverse quantization unit 1240, acquires the mask data B21 from the mask reproduction unit 1230, and acquires the synthesis control data C50 from the bit stream analysis unit 1210. Then, the decomposition level conversion unit 1250 performs a decomposition level conversion process which is a process of converting the respective decomposition levels of the first wavelet coefficient data A21 and the mask data B21.

Particularly, the decomposition level after the conversion is specified by the synthesis control data C50. Further, the decomposition level specified by the synthesis control data C50 is sometimes referred to as a first decomposition level. Herein, the first decomposition level is an integer not smaller than 1.

The respective decomposition levels of the first wavelet coefficient data A21 and the mask data B21 are levels set in the supply system 11 at this point in time (in other words, at the point in time when the data are supplied to the synthesizing system 21). The decomposition level conversion unit 1250 converts this initial decomposition level into the first decomposition level specified by the synthesis control data C50. Specifically, the decomposition level conversion unit 1250 converts the first wavelet coefficient data A21 and the mask data B21 both of the decomposition level set in the supply system 11 into first wavelet coefficient data A61 and mask data B61 both of the first decomposition level.

Figure 19:
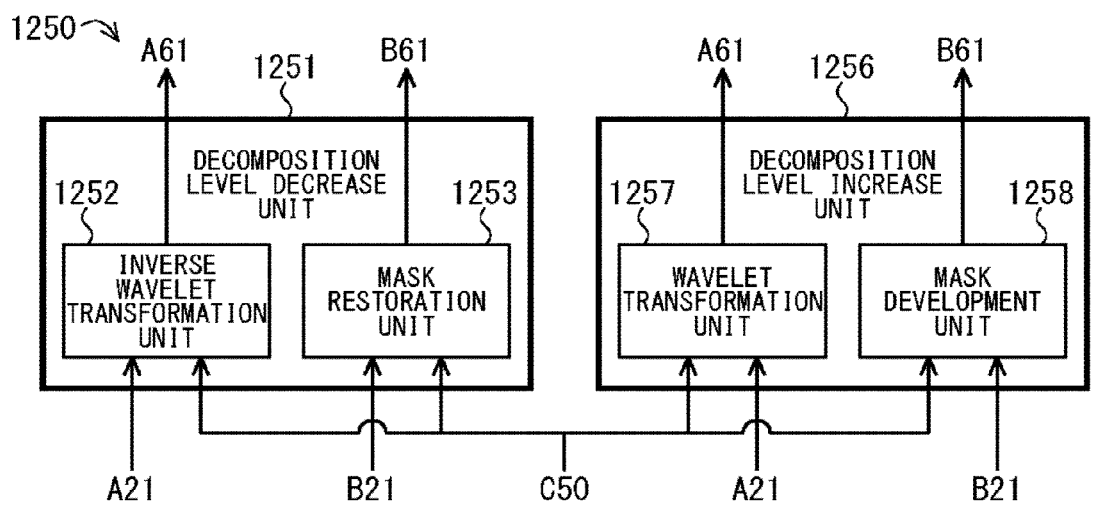
FIG. 19 is a block diagram showing a decomposition level conversion unit in accordance with the first preferred embodiment.

FIG. 19 shows an exemplary configuration of the decomposition level conversion unit 1250. In the exemplary configuration of FIG. 19, the decomposition level conversion unit 1250 includes a decomposition level decrease unit 1251 and a decomposition level increase unit 1256.

When the first decomposition level specified by the synthesis control data C50 is smaller than the initial decomposition level of the first wavelet coefficient data A21 and the mask data B21, the decomposition level decrease unit 1251 performs a decomposition level decrease process of decreasing the decomposition levels of the first wavelet coefficient data A21 and the mask data B21. Conversely, when the first decomposition level is larger than the initial decomposition level, the decomposition level increase unit 1256 performs a decomposition level increase process of increasing the decomposition levels of the first wavelet coefficient data A21 and the mask data B21.

Herein, when the first decomposition level is equal to the initial decomposition level, the decomposition level conversion unit 1250 outputs the first wavelet coefficient data A21 and the mask data B21, without any processing performed thereon, as the first wavelet coefficient data A61 and the mask data B61.

<Decomposition Level Decrease Unit 1251>

The decomposition level decrease unit 1251 includes an inverse wavelet transformation unit 1252 and a mask restoration unit 1253.

<Inverse Wavelet Transformation Unit 1252>

The inverse wavelet transformation unit 1252 acquires the first wavelet coefficient data A21 and the synthesis control data C50 and performs inverse wavelet transformation (IDWT) on the first wavelet coefficient data A21 until the decomposition level becomes the first decomposition level specified by the synthesis control data C50. The first wavelet coefficient data A61 of the first decomposition level are thereby generated.

The inverse wavelet transformation is an inverse processing of the wavelet transformation performed by the wavelet transformation unit 1030 in the supply system 11. In the inverse wavelet transformation, the band components are synthesized recursively. The number of executions of synthesis in the inverse wavelet transformation is termed a synthesis level. Further, it is assumed that the synthesis level in a state before the inverse wavelet transformation is represented as 0.

The inverse wavelet transformation unit 1252 and the inverse wavelet transformation unit 1280 described later may be implemented by the same circuit or may be implemented by different circuits.

<Mask Restoration Unit 1253>

The mask restoration unit 1253 acquires the mask data B21 and the synthesis control data C50 and performs a mask restoration process. The mask restoration process is a process of restoring a mask having a lower decomposition level from the supplied mask, and is an inverse processing of the above-described mask development process (see FIGS. 13 to 15). More specifically, the mask data B21 are converted for each of the band components included in the first wavelet coefficient data A61 to be generated by the decomposition level conversion unit 1250 (in other words, having the first decomposition level specified by the synthesis control data C50). The mask data B61 of the first decomposition level are thereby generated. As to the restoration of the mask, for example, see Japanese Patent Application Laid Open Gazette No. 2006-203409 and Japanese Unexamined Patent Application Publication (Translation of PCT Application) No. 2001-520466, and INTERNATIONAL STANDARD ISO/IEC 15444-1 ITU-T RECOMMENDATION T.800 Information technology—JPEG 2000 image coding system: Core coding system Annex H—Coding of images with regions of interest.

Figure 20:
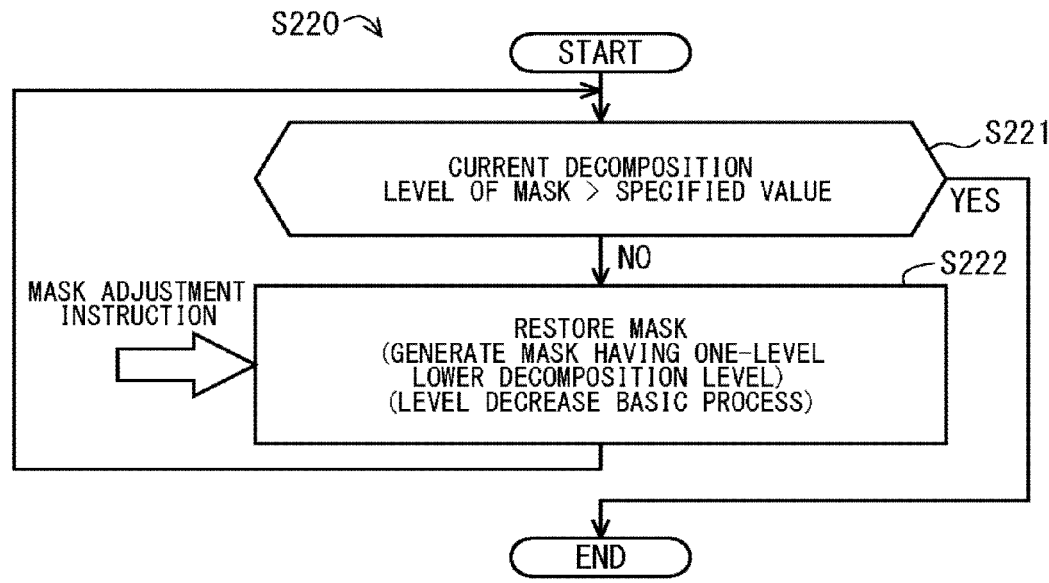
FIG. 20 is a flowchart showing a mask restoration process in accordance with the first preferred embodiment.

FIG. 20 is a flowchart showing the mask restoration process. In a mask restoration process S220 of FIG. 20, performed is a process S222 of decreasing the decomposition level of the mask by one level (hereinafter, referred to also as a level decrease basic process). When the difference between the initial decomposition level and the first decomposition level is not smaller than 2, the level decrease basic process S222 is repeated until the mask having the first decomposition level is obtained (see Step S221).

In the level decrease basic process S222, the first mask for the first wavelet plane is converted into a second mask for a second wavelet plane which has a decomposition level lower than that of the first wavelet plane by one level. Further, since the first decomposition level specified by the synthesis control data C50 is an integer not smaller than 1 as described above, the second mask after the restoration is not an original mask.

The level decrease basic process S222 is recursively repeated. Specifically, by setting the second mask to a new first mask, the level decrease basic process S222 is performed again. Further, the level decrease basic process S222 is repeated in accordance with the method (scheme) of the inverse wavelet transformation. When the above-described Mallat-type method is adopted (see FIGS. 4 to 6), for example, in the wavelet plane, only the highest-order band components (LLk, HLk, LHk, and HHk at the decomposition level k) are recursively decomposed. For this reason, the mask restoration is recursively performed only on the parts corresponding to the highest-order band components.

<Mask Restoration Condition>

The level decrease basic process S222 is performed on the basis of a predetermined mask restoration condition. The mask restoration condition defines that when the data at a specified position on the first wavelet plane are associated with the ROI by the first mask, the second mask is formed so that the data at a position on the second wavelet plane, which is corresponding to the above-described specified position, may be associated with the ROI.

The mask restoration condition depends on the number of taps of a filter used for the inverse wavelet transformation. When a 5×3 filter is used in an arithmetic operation of the verse wavelet transformation, for example, the mask restoration condition is based on FIG. 21. Further, when a Daubechies 9×7 filter is used in an arithmetic operation of the inverse wavelet transformation, the mask restoration condition is based on FIG. 22.

Figure 21:
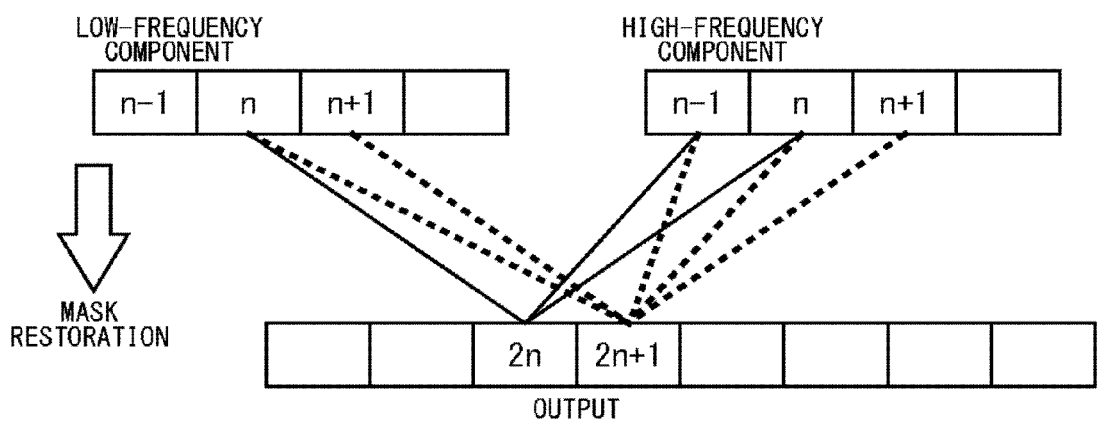
FIG. 21 is a diagram showing the mask restoration process in a case where the 5×3 filter is used for the wavelet transformation in accordance with the first preferred embodiment.
Figure 22:
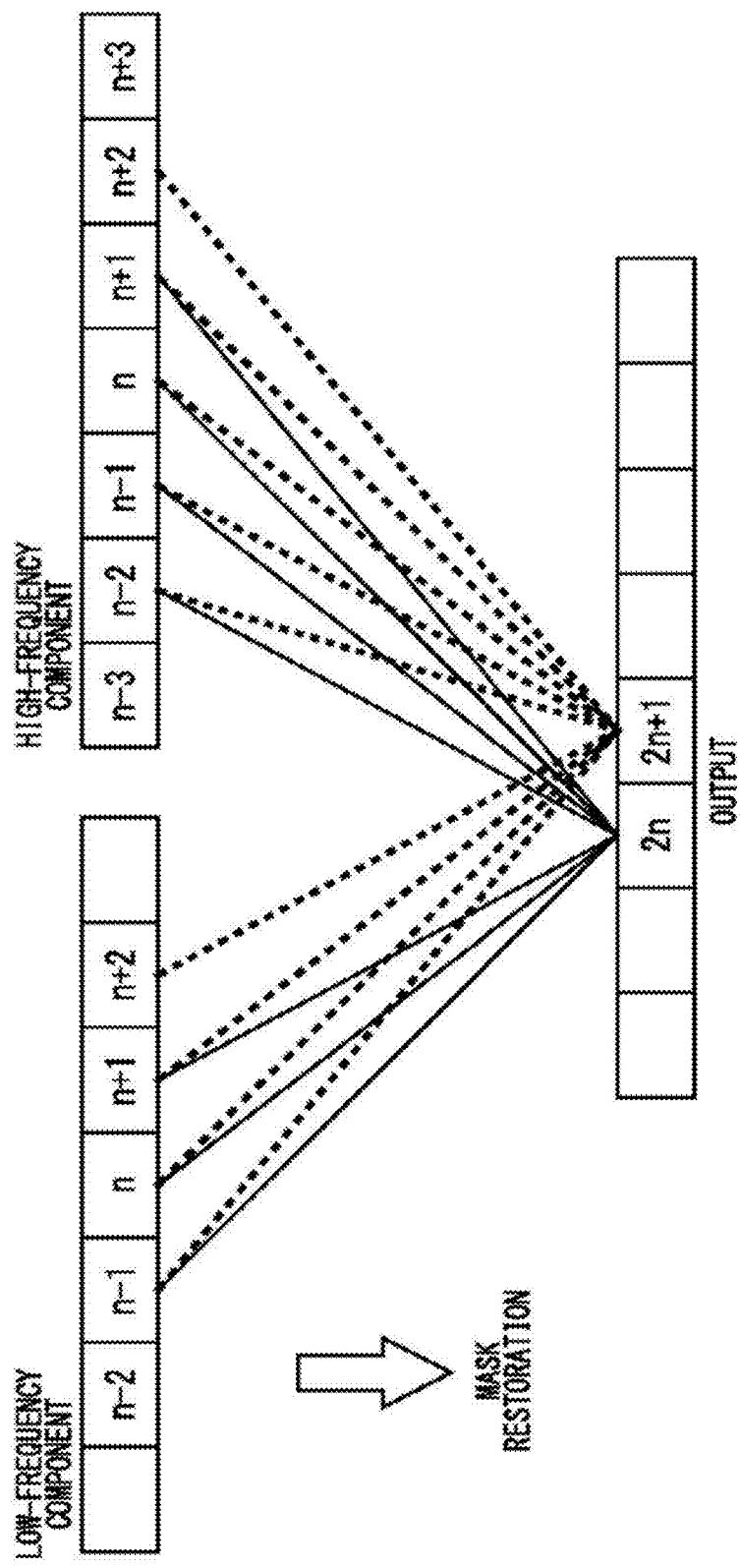
FIG. 22 is a diagram showing the mask restoration process in a case where the Daubechies 9×7 filter is used for the wavelet transformation in accordance with the first preferred embodiment.

In any one of the cases of FIGS. 21 and 22, the mask restoration condition is broadly divided into two conditions (referred to as a first restoration condition and a second restoration condition). Specifically, the first restoration condition is used to form the second mask so that the 2n-th (n is an integer) data on the second wavelet plane may be associated with the ROI. The second restoration condition is used to form the second mask so that the {2n+1}th data on the second wavelet plane may be associated with the ROI.

Herein, both the first restoration condition and the second restoration condition impose a condition (referred to as a restoration execution condition) that the data at the specified position on the first wavelet plane are associated with the ROI by the first mask.

In the first restoration condition, the above-described specified position is a position corresponding to the above-described 2n-th of the second wavelet plane. Hereinafter, the position is sometimes referred to as a first specified position. With reference to FIG. 21, in a case of using the 5×3 filter, candidates of the first specified position are the n-th of the low-frequency component (corresponding to input data on the low-pass filter side) and the {n−1}th and n-th of the high-frequency component (corresponding to input data on the high-pass filter side) on the first wavelet plane. With reference to FIG. 22, in a case of using the Daubechies 9×7 filter, the candidates of the first specified position are the {n−1}th to the {n+1}th of the low-frequency component and the {n−2}th to {n+1}th of the high-frequency component on the first wavelet plane.

Similarly, in the second restoration condition, the above-described specified position is a position corresponding to the above-described {2n+1}th of the second wavelet plane. Hereinafter, the position is sometimes referred to as a second specified position. With reference to FIG. 21, in a case of using the 5×3 filter, candidates of the second specified position are the n-th and the {n+1}th of the low-frequency component and the {n−1}th to {n+1}th of the high-frequency component on the first wavelet plane. With reference to FIG. 22, in a case of using the Daubechies 9×7 filter, the candidates of the second specified position are the {n−1}th to the {n+2}th of the low-frequency component and the {n−2}th to {n+2}th of the high-frequency component on the first wavelet plane.

In accordance with a use pattern of these candidates of the specified position, the first restoration condition and the second restoration condition can be defined in various manners. As a result, the second mask can be adjusted in various manners. Herein, it is assumed that the use pattern of the candidates of the specified position is set by an instruction of the user. Hereinafter, this user's instruction will be referred to as a mask adjustment instruction. Further, it is assumed that the synthesis control data C50 includes the mask adjustment instruction and the mask adjustment instruction is thereby supplied to the level decrease basic process S222 performed in the synthesizing system 21 (see FIG. 20). The mask adjustment instruction, however, may be supplied separately from the synthesis control data C50.

A large number of use patterns of the candidates of the specified position, in other words, a large number of contents of the mask adjustment instruction can be thought. Hereinafter, an exemplary case where the mask adjustment instruction consists of three instructions, i.e., a mode instruction, a low-frequency selection instruction, and a high-frequency selection instruction will be described.

The mode instruction (MODE) relates to which of the band components in the low-frequency component and the high-frequency component of the first wavelet plane is used. It is assumed that the instruction indicating that only the low-frequency component should be used is represented as MODE=L, and further the instruction indicating that both the low-frequency component and the high-frequency component should be used is represented as MODE=LH.

The low-frequency selection instruction (LSEL) relates to whether or not the restoration execution condition should be imposed on all the candidates included in the low-frequency component of the first wavelet plane. When it is required that all the candidates included in the low-frequency component should satisfy the restoration execution condition, it is assumed that this is represented as LSEL=AND. Conversely, when it is required that at least one of the candidates included in the low-frequency component should satisfy the restoration execution condition, it is assumed that this is represented as LSEL=OR.

The high-frequency selection instruction (HSEL) relates to whether or not the restoration execution condition should be imposed on all the candidates included in the high-frequency component of the first wavelet plane. When it is required that all the candidates included in the high-frequency component should satisfy the restoration execution condition, it is assumed that this is represented as HSEL=AND. Conversely, when it is required that at least one of the candidates included in the high-frequency component should satisfy the restoration execution condition, it is assumed that this is represented as HSEL=OR.

Further, the mode instruction MODE, the low-frequency selection instruction LSEL, and the high-frequency selection instruction HSEL can be supplied to the mask restoration unit 1253 (see FIG. 19) by three signals assigned to these instructions, respectively, in the circuit.

Some specific examples of the mask adjustment instruction are shown in Table 1. The contents of the mask adjustment instruction, however, are not limited to the examples shown in Table 1.

TABLE 1

|    | MODE | LSEL | HSEL | Remark   |               |
|----|------|------|------|----------|---------------|
| #1 | LH   | AND  | AND  | Lossless |               |
| #2 | LH   | AND  | AND  | Lossy    | Near Lossless |
| #3 | L    | AND  | —    |          | Select any one |
| #4 | L    | OR   | —    |          |               |
| #5 | LH   | AND  | AND  |          |               |
| #6 | LH   | AND  | OR   |          |               |
| #7 | LH   | OR   | OR   |          |               |

In Table 1, the mask adjustment instruction #1 is used for lossless compression. Specifically, the mask adjustment instruction #1 is suitable for a case where the image compression (more specifically, the quantization of the ROI coefficient) in the supply system 11 is lossless. Further, in the lossless compression, the ROI coefficient after being quantized does not become 0.

The mask adjustment instruction #2 is used for near lossless compression. In the near lossless compression, data loss is larger than that in the lossless compression but the image quality which is almost equal to that in the lossless compression can be achieved. In consideration of this point, the near lossless compression can be understood as irreversible compression in terms of data and reversible compression in terms of image quality. In the major classification into two groups of lossless and lossy, however, near lossless is classified into the lossy group in most cases.

The mask adjustment instructions #3 to #7 are used for lossy compression. In the lossy compression, the ROI coefficient after being quantized tends to become 0 in the high-frequency component. As this tendency increases (in other words, in a case where more ROI coefficients after being quantized become 0 in the high-frequency component with the large quantization value (i.e., the high compression ratio)), it is preferable that the instruction should be applied in the order of #4, #7, #3, #6, and #5.

Further, in the example of Table 1, the same mask adjustment instructions #1, #2, and #5 are redundantly described, for convenience of explanation.

<Case of Using 5'3 Filter>

Hereinafter, with reference to Table 1, as to the case where the 5×3 filter is used for the inverse wavelet transformation, for each mask adjustment instruction, the first restoration condition and the second restoration condition will be described.

<Mask Adjustment Instructions #1, #2, and #5 in Case of Using 5×3 Filter>

In accordance with the mask adjustment instructions #1, #2, and #5 (MODE=LH, LSEL=AND, and HSEL=AND), the first restoration condition and the second restoration condition are defined as follows.

The first restoration condition: When the n-th data of the low-frequency component on the first wavelet plane are associated with the ROI by the first mask and all the {n−1}th data and the n-th data of the high-frequency component on the first wavelet plane are associated with the ROI by the first mask, the second mask is formed so that the 2n-th data on the second wavelet plane may be associated with the ROI.

The second restoration condition: When all the n-th data and the {n+1}th data of the low-frequency component on the first wavelet plane are associated with the ROI by the first mask and all the {n−1}th data to the {n+1}th data of the high-frequency component on the first wavelet plane are associated with the ROI by the first mask, the second mask is formed so that the {2n+1}th data on the second wavelet plane may be associated with the ROI.

<Mask Adjustment Instruction #3 in Case of Using 5×3 Filter>

In accordance with the mask adjustment instruction #3 (MODE=L and LSEL=AND), the first restoration condition and the second restoration condition are defined as follows.

The first restoration condition: When the n-th data of the low-frequency component on the first wavelet plane are associated with the ROI by the first mask, the second mask is formed so that the 2n-th data on the second wavelet plane may be associated with the ROI.

The second restoration condition: When all the n-th data and the {n+1}th data of the low-frequency component on the first wavelet plane are associated with the ROI by the first mask, the second mask is formed so that the {2n+1}th data on the second wavelet plane may be associated with the ROI.

<Mask Adjustment Instruction #4 in Case of Using 5×3 Filter>

In accordance with the mask adjustment instruction #4 (MODE=L and LSEL=OR), the first restoration condition and the second restoration condition are defined as follows.

The first restoration condition: When the n-th data of the low-frequency component on the first wavelet plane are associated with the ROI by the first mask, the second mask is formed so that the 2n-th data on the second wavelet plane may be associated with the ROI.

Herein, since only the n-th of low-frequency component is a candidate, the first restoration condition in this case is the same as that of the mask adjustment instruction #3.

The second restoration condition: When at least one of the n-th data and the {n+1}th data of the low-frequency component on the first wavelet plane are associated with the ROI by the first mask, the second mask is formed so that the {2n+1}th data on the second wavelet plane may be associated with the ROI.

<Mask Adjustment Instruction #6 in Case of Using 5×3 Filter>

In accordance with the mask adjustment instruction #6 (MODE=LH, LSEL=AND, and HSEL=OR), the first restoration condition and the second restoration condition are defined as follows.

The first restoration condition: When the n-th data of the low-frequency component on the first wavelet plane are associated with the ROI by the first mask and at least one of the {n−1}th data and the n-th data of the high-frequency component on the first wavelet plane are associated with the ROI by the first mask, the second mask is formed so that the 2n-th data on the second wavelet plane may be associated with the ROI.

The second restoration condition: When all the n-th data and the {n+1}th data of the low-frequency component on the first wavelet plane are associated with the ROI by the first mask and at least one of the {n−1}th data to the {n+1}th data of the high-frequency component on the first wavelet plane are associated with the ROI by the first mask, the second mask is formed so that the {2n+1}th data on the second wavelet plane may be associated with the ROI.

<Mask Adjustment Instruction #7 in Case of Using 5×3 Filter>

In accordance with the mask adjustment instruction #7 (MODE=LH, LSEL=OR, and HSEL=OR), the first restoration condition and the second restoration condition are defined as follows.

The first restoration condition: When the n-th data of the low-frequency component on the first wavelet plane are associated with the ROI by the first mask and at least one of the {n−1}th data and the n-th data of the high-frequency component on the first wavelet plane are associated with the ROI by the first mask, the second mask is formed so that the 2n-th data on the second wavelet plane may be associated with the ROI.

Herein, since only the n-th of low-frequency component is a candidate, the first restoration condition in this case is the same as that of the mask adjustment instruction #6.

The second restoration condition: When at least one of the n-th data and the {n+1}th data of the low-frequency component on the first wavelet plane are associated with the ROI by the first mask and at least one of the {n−1}th data to the {n+1}th data of the high-frequency component on the first wavelet plane are associated with the ROI by the first mask, the second mask is formed so that the {2n+1}th data on the second wavelet plane may be associated with the ROI.

<Case of Using Daubechies 9×7 Filter>

Hereinafter, with reference to Table 1, as to the case where the Daubechies 9×7 filter is used for the inverse wavelet transformation, for each mask adjustment instruction, the first restoration condition and the second restoration condition will be described.

<Mask Adjustment Instructions #1, #2, and #5 in Case of Using Daubechies 9×7 Filter>

In accordance with the mask adjustment instructions #1, #2, and #5 (MODE=LH, LSEL=AND, and HSEL=AND), the first restoration condition and the second restoration condition are defined as follows.

The first restoration condition: When all the {n−1}th data to the {n+1}th data of the low-frequency component on the first wavelet plane are associated with the ROI by the first mask and all the {n−2}th data to the {n+1}th data of the high-frequency component on the first wavelet plane are associated with the ROI by the first mask, the second mask is formed so that the 2n-th data on the second wavelet plane may be associated with the ROI.

The second restoration condition: When all the {n−1}th data to the {n+2}th data of the low-frequency component on the first wavelet plane are associated with the ROI by the first mask and all the {n−2}th data to the {n+2}th data of the high-frequency component on the first wavelet plane are associated with the ROI by the first mask, the second mask is formed so that the {2n+1}th data on the second wavelet plane may be associated with the ROI.

<Mask Adjustment Instruction #3 in Case of Using Daubechies 9×7 Filter>

In accordance with the mask adjustment instruction #3 (MODE=L and LSEL=AND), the first restoration condition and the second restoration condition are defined as follows.

The first restoration condition: When all the {n−1}th data to the {n+1}th data of the low-frequency component on the first wavelet plane are associated with the ROI by the first mask, the second mask is formed so that the 2n-th data on the second wavelet plane may be associated with the ROI.

The second restoration condition: When all the {n−1}th data to the {n+2}th data of the low-frequency component on the first wavelet plane are associated with the ROI by the first mask, the second mask is formed so that the {2n+1}th data on the second wavelet plane may be associated with the ROI.

<Mask Adjustment Instruction #4 in Case of Using Daubechies 9×7 Filter>

In accordance with the mask adjustment instruction #4 (MODE=L and LSEL=OR), the first restoration condition and the second restoration condition are defined as follows.

The first restoration condition: When at least one of the {n−1}th data to the {n+1}th data of the low-frequency component on the first wavelet plane are associated with the ROI by the first mask, the second mask is formed so that the 2n-th data on the second wavelet plane may be associated with the ROI.

The second restoration condition: When at least one of the {n−1}th data to the {n+2}th data of the low-frequency component on the first wavelet plane are associated with the ROI by the first mask, the second mask is formed so that the {2n+1}th data on the second wavelet plane may be associated with the ROI.

<Mask Adjustment Instruction #6 in Case of Using Daubechies 9×7 Filter>

In accordance with the mask adjustment instruction #6 (MODE=LH, LSEL=AND, and HSEL=OR), the first restoration condition and the second restoration condition are defined as follows.

The first restoration condition: When all the {n−1}th data to the {n+1}th data of the low-frequency component on the first wavelet plane are associated with the ROI by the first mask and at least one of the {n−2}th data to the {n+1}th data of the high-frequency component on the first wavelet plane are associated with the ROI by the first mask, the second mask is formed so that the 2n-th data on the second wavelet plane may be associated with the ROI.

The second restoration condition: When all the {n−1}th data to the {n+2}th data of the low-frequency component on the first wavelet plane are associated with the ROI by the first mask and at least one of the {n−2}th data to the {n+2}th data of the high-frequency component on the first wavelet plane arc associated with the ROI by the first mask, the second mask is formed so that the {2n+1}th data on the second wavelet plane may be associated with the ROI.

<Mask Adjustment Instruction #7 in Case of Using Daubechies 9×7 Filter>

In accordance with the mask adjustment instruction #7 (MODE=LH, LSEL=OR, and HSEL=OR), the first restoration condition and the second restoration condition are defined as follows.

The first restoration condition: When at least one of the {n−1}th data to the {n+1}th data of the low-frequency component on the first wavelet plane are associated with the ROI by the first mask and at least one of the {n−2}th data to the {n+1}th data of the high-frequency component on the first wavelet plane are associated with the ROI by the first mask, the second mask is formed so that the 2n-th data on the second wavelet plane may be associated with the ROI.

The second restoration condition: When at least one of the {n−1}th data to the {n+2}th data of the low-frequency component on the first wavelet plane are associated with the ROI by the first mask and at least one of the {n−2}th data to the {n+2}th data of the high-frequency component on the first wavelet plane are associated with the ROI by the first mask, the second mask is formed so that the {2n+1}th data on the second wavelet plane may be associated with the ROI.

<Mask Adjustment Instruction>

Thus, the above-described specified positions in the first restoration condition and the second restoration condition can be indicated by the mask adjustment instruction. The user can input the mask adjustment instruction by inputting the mode instruction (MODE), the low-frequency selection instruction (LSEL), and the high-frequency selection instruction (HSEL). Alternatively, a plurality of mask adjustment instructions may be defined in advance by combining the mode instruction (MODE), the low-frequency selection instruction (LSEL), and the high-frequency selection instruction (HSEL), like in Table 1, and then the user may select one of the mask adjustment instructions.

Further, the mode instruction (MODE) may be incorporated in each of the low-frequency selection instruction (LSEL) and the high-frequency selection instruction (HSEL). For example, by adding LSEL=NO as the instruction indicating that the low-frequency component is not used and adding HSEL=NO as the instruction indicating that the high-frequency component is not used, it becomes not necessary to separately provide the mode instruction (MODE).

<Decomposition Level Increase Unit 1256>

With reference back to FIG. 19, the decomposition level increase unit 1256 includes a wavelet transformation unit 1257 and a mask development unit 1258.

<Wavelet Transformation Unit 1257>

The wavelet transformation unit 1257 acquires the first wavelet coefficient data A21 and the synthesis control data C50 and performs the wavelet transformation on the first wavelet coefficient data A21 until the decomposition level becomes the first decomposition level specified by the synthesis control data C50. The first wavelet coefficient data A61 of the first decomposition level are thereby generated.

The wavelet transformation unit 1257 and the wavelet transformation unit 1260 described later may be implemented by the same circuit or may be implemented by different circuits.

<Mask Development Unit 1258>

The mask development unit 1258 acquires the mask data B21 and the synthesis control data C50 and performs a mask development process. Specifically, the mask data B21 are converted for each of the band components included in the first wavelet coefficient data A61 to be generated by the decomposition level conversion unit 1250 (in other words, having the first decomposition level specified by the synthesis control data C50). The mask data B61 of the first decomposition level are thereby generated.

The mask development unit 1258 performs the same operation as that of the mask development unit 1052 in the supply system 11 (see FIG. 7 and FIGS. 13 to 15). For this reason, redundant description will be omitted herein.

<Variation of Decomposition Level Conversion Unit 1250>

Further, the decomposition level decrease unit 1251 or the decomposition level increase unit 1256 may be omitted. When only the decomposition level decrease unit 1251 is provided, the decomposition level conversion unit 1250 is used only under the condition that the first decomposition level specified by the synthesis control data C50 is not larger than the initial decomposition level of the first wavelet coefficient data A21 and the mask data B21. Conversely, when only the decomposition level increase unit 1256 is provided, the decomposition level conversion unit 1250 is used only under the condition that the first decomposition level is not smaller than the initial decomposition level.

<Wavelet Transformation Unit 1260>

With reference back to FIG. 17, the wavelet transformation unit 1260 acquires second target image data D50 which are data of a second target image and the synthesis control data C50. The second target image is an image to be synthesized with the ROI in the first target image and provides a background image for the image synthesis.

Herein, to the synthesizing system 21, inputted are second basic image data D10 which are data of a second basic image that is a source of the second target image. In the first preferred embodiment, however, description will be made on a case where the whole of the second basic image constitutes the second target image, in other words, a case where the second basic image is identical to the second target image.

The second basic image data D10 are supplied, for example, from the image input unit 44 provided on the side of the synthesizing system 21 or another system in the image processing system 20 (see FIG. 1). Further, the second basic image and the second target image may be images captured by a digital camera or the like or computer graphics.

The wavelet transformation unit 1260 performs the wavelet transformation on the second target image data D50 until the decomposition level becomes a predetermined decomposition level (referred to as a second decomposition level), to thereby generate second wavelet coefficient data D61. The wavelet transformation unit 1260 operates in accordance with the same specification as the wavelet transformation unit 1030 in the supply system 11 (see FIG. 3). In the first preferred embodiment, it is assumed that the decomposition level (second decomposition level) of the second wavelet coefficient data D61 is equal to the first decomposition level specified by the synthesis control data C50.

Further, when the wavelet transformation unit 1260 in the synthesizing system 21 and the wavelet transformation unit 1030 in the supply system 11 are distinguished from each other, for example, the wavelet transformation unit 1030 in the supply system 11 may be referred to as the first wavelet transformation unit 1030 and the wavelet transformation unit 1260 in the synthesizing system 21 may be referred to as the second wavelet transformation unit 1260. Not limited to this case, the units having the same name can be clearly distinguished from each other by giving "first", "second", ... to the name.

<Synthesis Execution Unit 1270>

The synthesis execution unit 1270 acquires the first wavelet coefficient data A61 of the first decomposition level and the mask data B61 of the first decomposition level from the decomposition level conversion unit 1250, and acquires the second wavelet coefficient data D61 of the second decomposition level (equal to the first decomposition level herein) from the wavelet transformation unit 1260. Then, on the basis of these data A61, B61, and D61, the synthesis execution unit 1270 performs image synthesis between the ROI in the first target image and the second target image (a synthesis execution process).

In the synthesis execution process, the synthesis execution unit 1270 determines the ROI coefficient and the non-ROI coefficient in the first wavelet coefficient data A61 of the first decomposition level on the basis of the mask data B61 of the first decomposition level (the coefficient determination process). Then, on the basis of the determination result, the synthesis execution unit 1270 synthesizes the ROI coefficient in the first wavelet coefficient data A61 and the coefficient in the second wavelet coefficient data D61 (a coefficient synthesis process). The synthesis execution unit 1270 thereby generates synthesized coefficient data E61.

Specifically, when data at a position on the wavelet plane in accordance with the first wavelet coefficient data A61 are not the ROI coefficient (in other words, the non-ROI coefficient), the non-ROI coefficient is substituted with data which are present at the same position on the wavelet plane in accordance with the second wavelet coefficient data D61. The first wavelet coefficient data A61 are thereby converted into the synthesized coefficient data E61.

Figure 23:
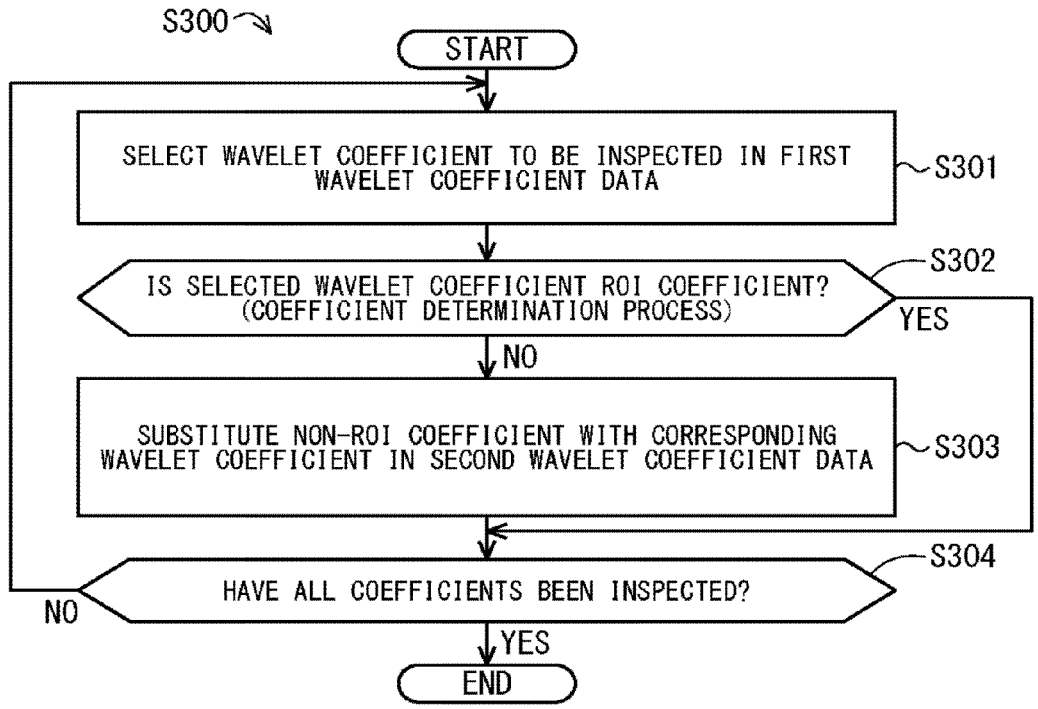
FIG. 23 is a flowchart showing a coefficient synthesis process (first coefficient synthesis process) in accordance with the first preferred embodiment.

FIG. 23 is a flowchart showing the coefficient synthesis process. In a coefficient synthesis process S300 of FIG. 23, first, one wavelet coefficient to be used as an inspection target is selected out of the first wavelet coefficient data A61 (Step S301). Then, it is determined whether the inspection target coefficient thereof is the ROI coefficient or the non-ROI coefficient (Step S302). In other words, in Step S302, the coefficient determination process is performed.

When the inspection target coefficient is the non-ROI coefficient, the inspection target coefficient is substituted with the corresponding wavelet coefficient in the second wavelet coefficient data D61 (Step S303). On the other hand, when the inspection target coefficient is the ROI coefficient, Step S303 is not performed. Steps S301 to S303 are repeated until the inspections of all the wavelet coefficients in the first wavelet coefficient data A61 are finished (Step S304).

Figure 24:
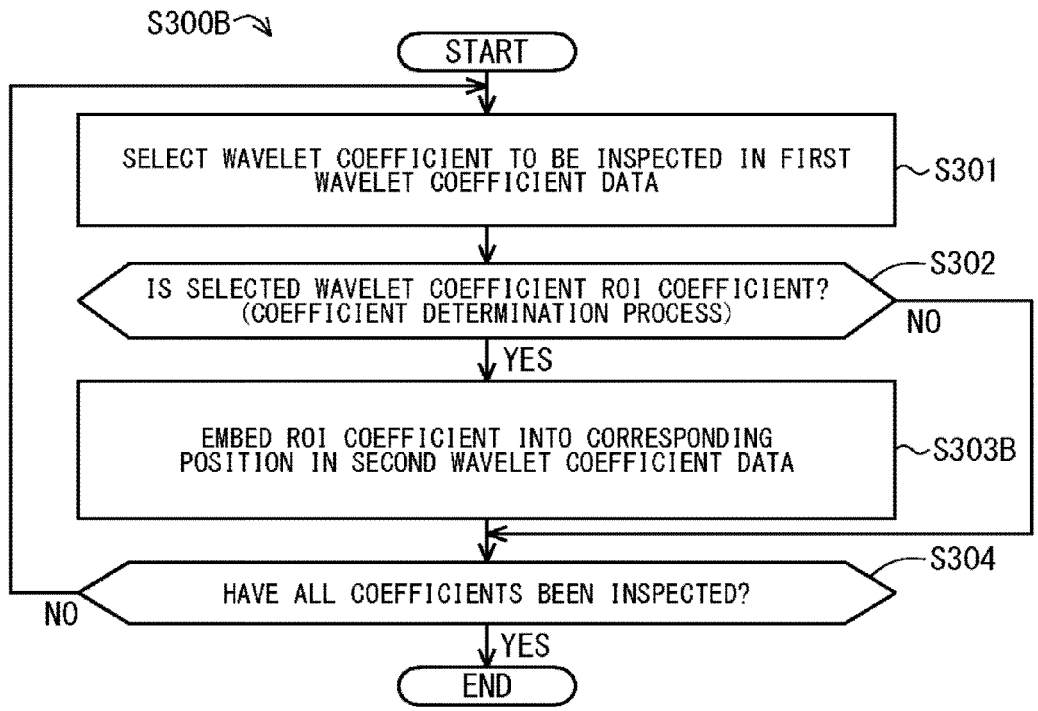
FIG. 24 is a flowchart showing another coefficient synthesis process (second coefficient synthesis process) in accordance with the first preferred embodiment.

FIG. 24 is a flowchart showing another coefficient synthesis process. In another coefficient synthesis process S300B of FIG. 24, Step S303B is provided, instead of the above Step S303. Specifically, when it is determined that the inspection target coefficient is the ROI coefficient in coefficient determination process S302, the ROI coefficient in the first wavelet coefficient data A61 is embedded into the corresponding position in the second wavelet coefficient data D61 in Step S303B. The second wavelet coefficient data D61 are thereby converted into the synthesized coefficient data E61.

Thus, for the synthesis between the ROI coefficient in the first wavelet coefficient data A61 and the wavelet coefficient in the second wavelet coefficient data D61, there are two kinds of specific methods (referred to as a first coefficient synthesis process and a second coefficient synthesis process).

The first coefficient synthesis process (see Step S300 of FIG. 23): the non-ROI coefficient in the first wavelet coefficient data A61 is substituted with the corresponding wavelet coefficient in the second wavelet coefficient data D61.

The second coefficient synthesis process (see Step S300B of FIG. 24): the ROI coefficient in the first wavelet coefficient data A61 is embedded into the corresponding position in the second wavelet coefficient data D61.

<Inverse Wavelet Transformation Unit 1280>

With reference back to FIG. 17, the inverse wavelet transformation unit 1280 performs the inverse wavelet transformation on the synthesized coefficient data E61 generated by the synthesis execution unit 1270 until the decomposition level becomes 0. From the synthesized coefficient data E61, synthetic image data E80 are thereby generated.

<Post-Processing Unit 1290>

The post-processing unit 1290 acquires the synthetic image data E80 from the inverse wavelet transformation unit 1280, and performs a predetermined post-processing on the synthetic image data E80. Herein, the predetermined post-processing is an inverse processing of the predetermined preprocessing performed by the preprocessing unit 1020 in the supply system 11 of FIG. 3. In the exemplary constitution of FIG. 17, the post-processing unit 1290 includes a tiling unit 1291, a color space conversion unit 1292, and a DC level shift unit 1293.

The tiling unit 1291 performs an inverse processing of the processing performed by the tiling unit 1023 in the supply system 11 of FIG. 3. Specifically, the tiling unit 1291 synthesizes the synthetic image data E80 in a unit of tile outputted from the inverse wavelet transformation unit 1280, to thereby generate a frame of image data. When the synthetic image data E80 are not supplied in a unit of tile, in other words, when the wavelet transformation is not performed in a unit of tile in the supply system 11, the processing by the tiling unit 1291 is omitted. Alternatively, the tiling unit 1291 itself may be omitted.

The color space conversion unit 1292 performs an inverse processing of the processing performed by the color space conversion unit 1022 in the supply system 11 of FIG. 3. For example, the image data outputted from the tiling unit 1291 are converted into the RGB component. The DC level shift unit 1293 converts the DC level of the image data outputted from the color space conversion unit 1292 as necessary. In the exemplary constitution of FIG. 17, synthetic image data E100 outputted from the DC level shift unit 1293 becomes output image data of the synthesizing system 21.

By causing the display 41 to perform a display operation on the basis of the synthetic age data E100, displayed is the synthetic image between the ROI in the first target image and the second target image.

<Operation of Synthesizing System 21>

Figure 25:
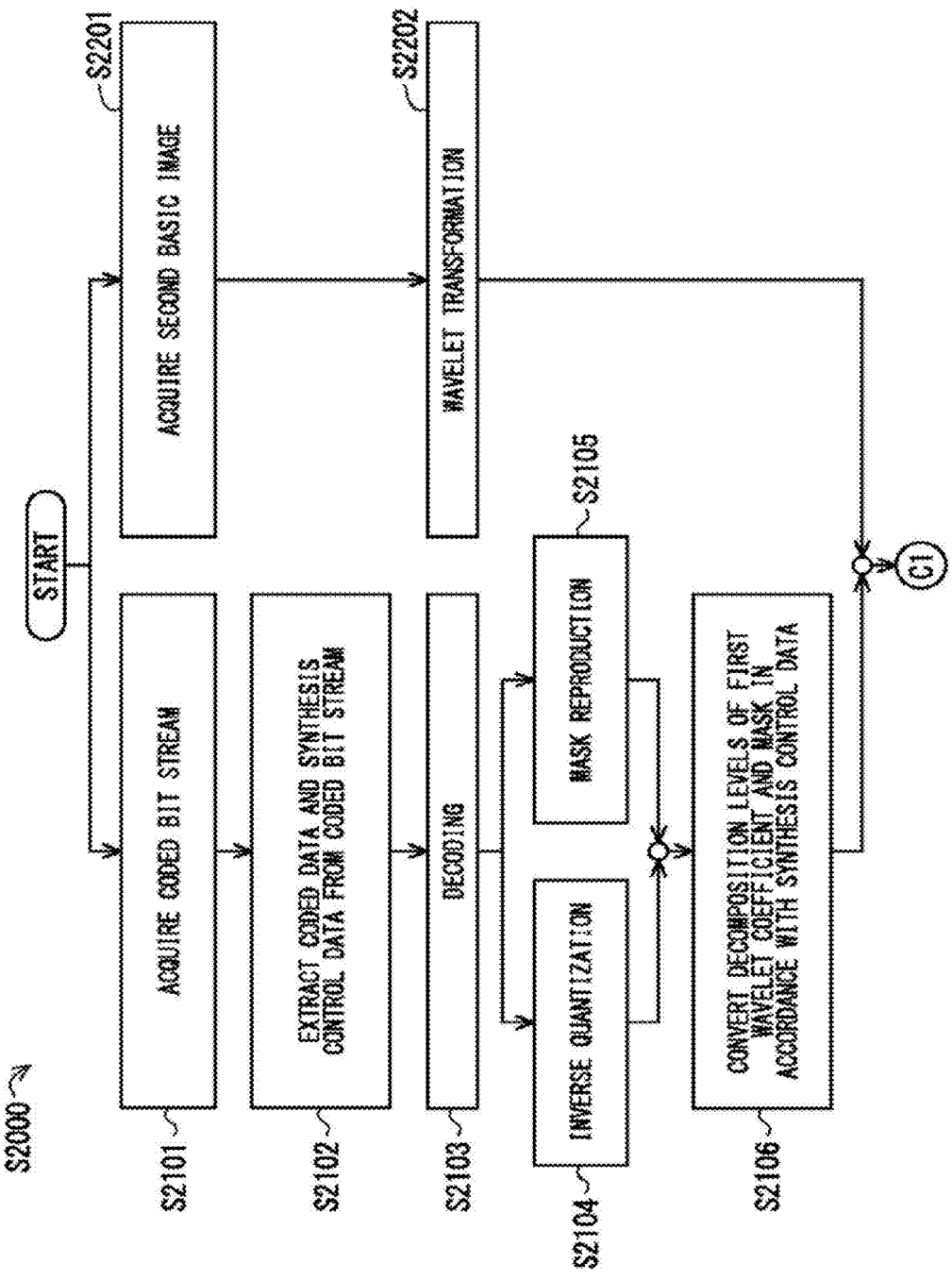
FIGS. 25 and 26 are flowcharts showing an operation of the image synthesizing system in accordance with the first preferred embodiment.
Figure 26:
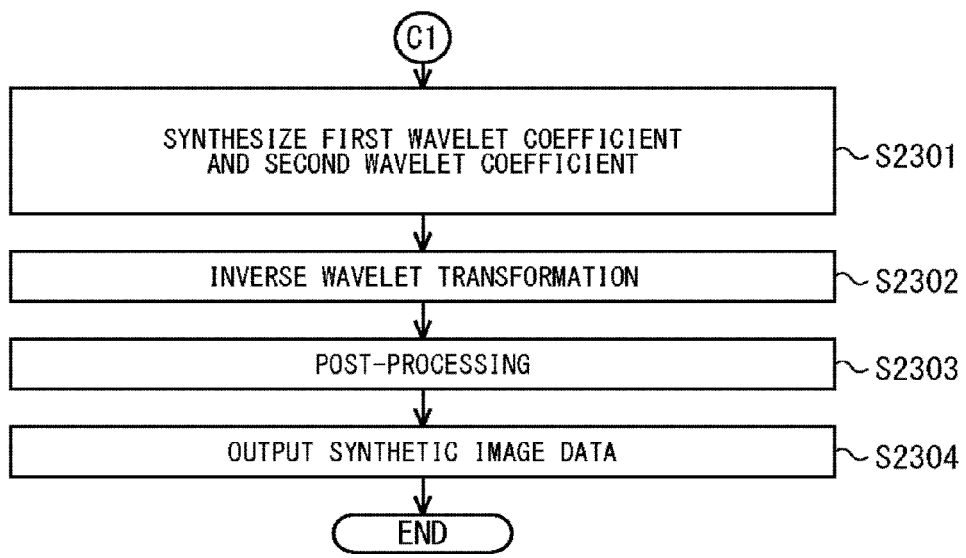

FIGS. 25 and 26 are flowcharts showing an operation of the synthesizing system 21. The flow of FIG. 25 is connected to that of FIG. 26 with a connector C1.

In an operation flow S2000 of FIGS. 25 and 26, when the coded bit stream Abs is inputted to the synthesizing system 21, the bit stream analysis unit 1210 acquires the coded bit stream Abs (Step S2101) and extracts the coded data A50 and the synthesis control data C50 from the coded bit stream Abs (Step S2102).

Then, the decoding unit 1220 decodes the coded data A50, to thereby generate the quantized wavelet coefficient data A22 (Step S2103). The quantized wavelet coefficient data A22 are inputted to the inverse quantization unit 1240 and the mask reproduction unit 1230 (see FIG. 17).

The inverse quantization unit 1240 performs the inverse quantization on the quantized wavelet coefficient data A22, to thereby generate the first wavelet coefficient data A21 (Step S2104). On the other hand, as described above, the mask reproduction unit 1230 reproduces the mask data B21 which are applied in the generation of the quantized wavelet coefficient data A22 performed by the supply system 11, on the basis of the quantized wavelet coefficient data A22 (Step S2105). Further, though Steps S2104 and S2105 are concurrently performed in the exemplary case of FIG. 25, Step S2104 may be performed before or after Step S2105.

Then, the decomposition level conversion unit 1250 converts the respective decomposition levels of the first wavelet coefficient data A21 and the mask data B21 into the first decomposition level specified by the synthesis control data C50 (Step S2106). The first wavelet coefficient data A61 and the mask data B21 both of the first decomposition level are thereby generated.

Herein, when the second basic image data D10 are inputted to the synthesizing system 21, the wavelet transformation unit 1260 acquires the second basic image data D10 (Step S2201) arid performs the wavelet transformation on the second basic image data D10 until the decomposition level becomes the second decomposition level (Step S2022). The second wavelet coefficient data D61 are thereby generated.

In the first preferred embodiment, as described above, the second decomposition level is equal to the first decomposition level specified by the synthesis control data C50. For this reason, Step S2202 for the wavelet transformation is performed after Step S2102 in which the synthesis control data C50 are acquired. Further, in the first preferred embodiment, as described above, the second basic image data D10 are handled as the second target image data D50 to be used for the image synthesis.

After Steps S2106 and S2202, the synthesis execution unit 1270 synthesizes the first wavelet coefficient data A61 and the second wavelet coefficient data D61, to thereby generate the synthesized coefficient data E61 (Step S2301). Then, the inverse wavelet transformation unit 1280 performs the inverse wavelet transformation on the synthesized coefficient data E61 until the decomposition level becomes 0 (Step S2302). The synthetic image data E80 are thereby generated.

After that, the post-processing unit 1290 performs the predetermined post-processing on the synthetic image data E80 (Step S2303), and the synthetic image data E100 after being subjected to the processing of Step S2303 arc outputted from the synthesizing system 21 (Step S2304).

<Effects>

In the first preferred embodiment, the synthesis between the ROI in the first target image and the second target image is performed by using the first wavelet coefficient data A61 and the second wavelet coefficient data D61. Further, the determination of the ROI in the first target image is performed by determining the ROI coefficient in the first wavelet coefficient data A61. The coefficient determination is performed on the basis of the data B61 of the developed mask for the first wavelet coefficient data A61.

In the wavelet transformation and the inverse wavelet transformation, not only the information of the pixel of interest to be processed but also the information of surrounding pixels are used. The same applies to the generation of the developed mask for the wavelet coefficient. In the first preferred embodiment, for this reason, a more excellent synthetic image can be achieved as compared with the case where the first target image data and the second target image data themselves are synthesized. In other words, even when an insufficient ROI having any defective portion on the contour thereof and/or in the inside thereof is used (that is to say, even when an original mask for such an insufficient ROI is used), it is possible to provide a repaired ROI on the synthetic image.

Further, by controlling the decomposition level of the wavelet transformation with the synthesis control data C50, it is possible to adjust the state of synthesis (repair of the ROI, extension of the ROI, and the like).

In consideration of these merits, in the first preferred embodiment, it is possible to eliminate the necessity to use any high-cost techniques for setting the ROI. In other words, an excellent synthetic image can be generated at low cost.

Furthermore, as described above, the quantization unit 1040 in the supply system 11 performs the quantization of the first wavelet coefficient data A21 so that the non-ROI coefficient after the quantization may become 0. Therefore, it is not necessary to output the mask data B61 itself from the supply system 11. For this reason, when the supply system 11 and the synthesizing system 21 perform wired communication or wireless communication with each other, reduction in the amount of communication is achieved and this contributes to the immediacy of transfer. As a result, it is possible to speed up the image synthesis, in other words, increase the immediacy of the image synthesis.

Herein, as the method of reflecting the mask data on the quantized wavelet coefficient, used is the Max-shift method which is an optional function of JPEG 2000. In accordance with the Max-shift method, scale-up and scale-down of the wavelet coefficient are performed in the quantization and the inverse quantization. On the other hand, in the quantization, the inverse quantization, and the mask reproduction in accordance with the first preferred embodiment, it is not necessary to perform such a scaling processing.

Further, the synthesis control data C50 are embedded in the region of the coded bit stream Abs for the first target image, which has no effect on the coded data A50 of the first target image. For this reason, it is possible to ensure the backward compatibility for the already-existing coded stream.

The Second Preferred Embodiment

In the first preferred embodiment, the mask data B21 are reflected on the quantized wavelet coefficient data A22. Specifically, the quantization unit 1040 in the supply system 11 performs the quantization of the first wavelet coefficient data A21 so that the non-ROI coefficient after the quantization may become 0. In such a method, in an attempt to perform efficient coding, there is a possible case where a value of the ROI coefficient after the quantization, among the first wavelet coefficients, becomes 0. Especially, a ROI coefficient having a small value has a high tendency to do so.

Figure 27:
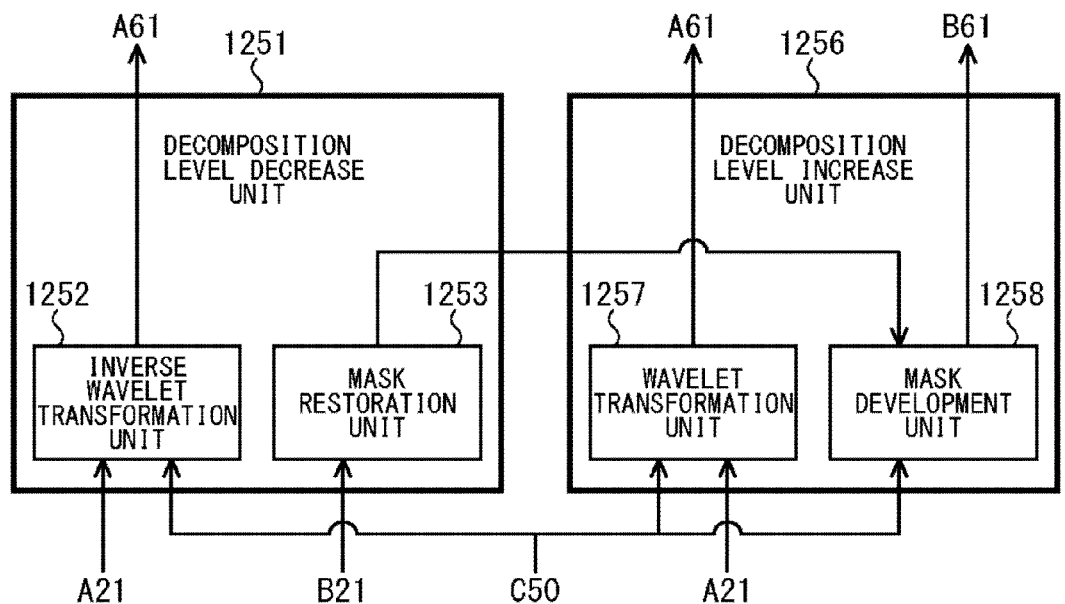
FIG. 27 is a block diagram showing a decomposition level conversion unit in accordance with a second preferred embodiment.

Such a problem as above can be solved by using a variation of the decomposition level conversion unit 1250 (see FIGS. 17 and 19). FIG. 27 is a block diagram and FIG. 28 is a flowchart both showing a decomposition level conversion unit 1250B in accordance with the second preferred embodiment.

In the decomposition level conversion unit 1250B of FIG. 27, as can be seen from the comparison with that of FIG. 19 described earlier, the mask data B21 are supplied to the mask restoration unit 1253 but not supplied to the mask development unit 1258. Further, the synthesis control data C50 are supplied to the mask development unit 1258 but not supplied to the mask restoration unit 1253.

Figure 28:
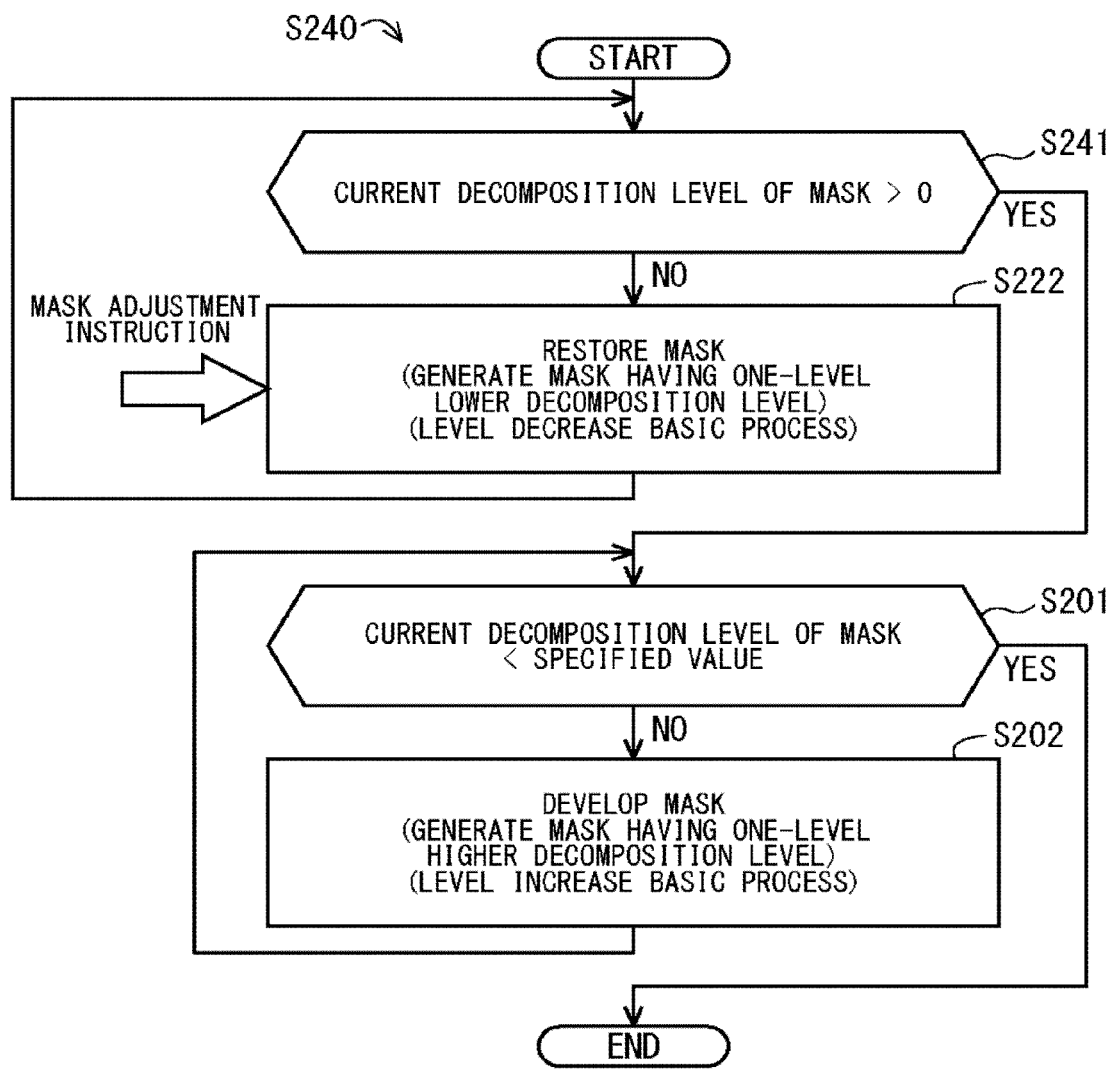
FIG. 28 is a flowchart showing an operation of the decomposition level conversion unit in accordance with the second preferred embodiment.

In such a constitution, as shown in Steps S241 and S222 of an operation flow S240 of FIG. 28, the mask restoration unit 1253 performs the mask restoration process on the mask data B21 until the decomposition level becomes 0. A mask of decomposition level 0, i.e., an original mask is thereby generated. The original mask data are inputted to the mask development unit 1258, and the mask development process is performed on the original mask data until the decomposition level becomes the first decomposition level specified by the synthesis control data C50 (see Steps S201 and S202 of FIG. 28).

The operation flow S240 is performed, regardless of which is higher the first decomposition level specified by the synthesis control data C50 or the initial decomposition level of the first wavelet coefficient data A21. Further, in order to solve the above problem, it is preferable that the operation flow S240 should be performed even when the first decomposition level is equal to the initial decomposition level.

Furthermore, the inverse wavelet transformation 1252 and the wavelet transformation unit 1257 operate in the same manner as in the first preferred embodiment in accordance with which is higher the first decomposition level specified by the synthesis control data C50 or the initial decomposition level of the first wavelet coefficient data A21. Then, output data from either the inverse wavelet transformation unit 1252 or the wavelet transformation unit 1257 are supplied to the synthesis execution unit 1270 as the first wavelet coefficient data A61.

In the second preferred embodiment, it is possible to produce the same effects as those of the first preferred embodiment and solve the above problem.

The Third Preferred Embodiment

Figure 29:
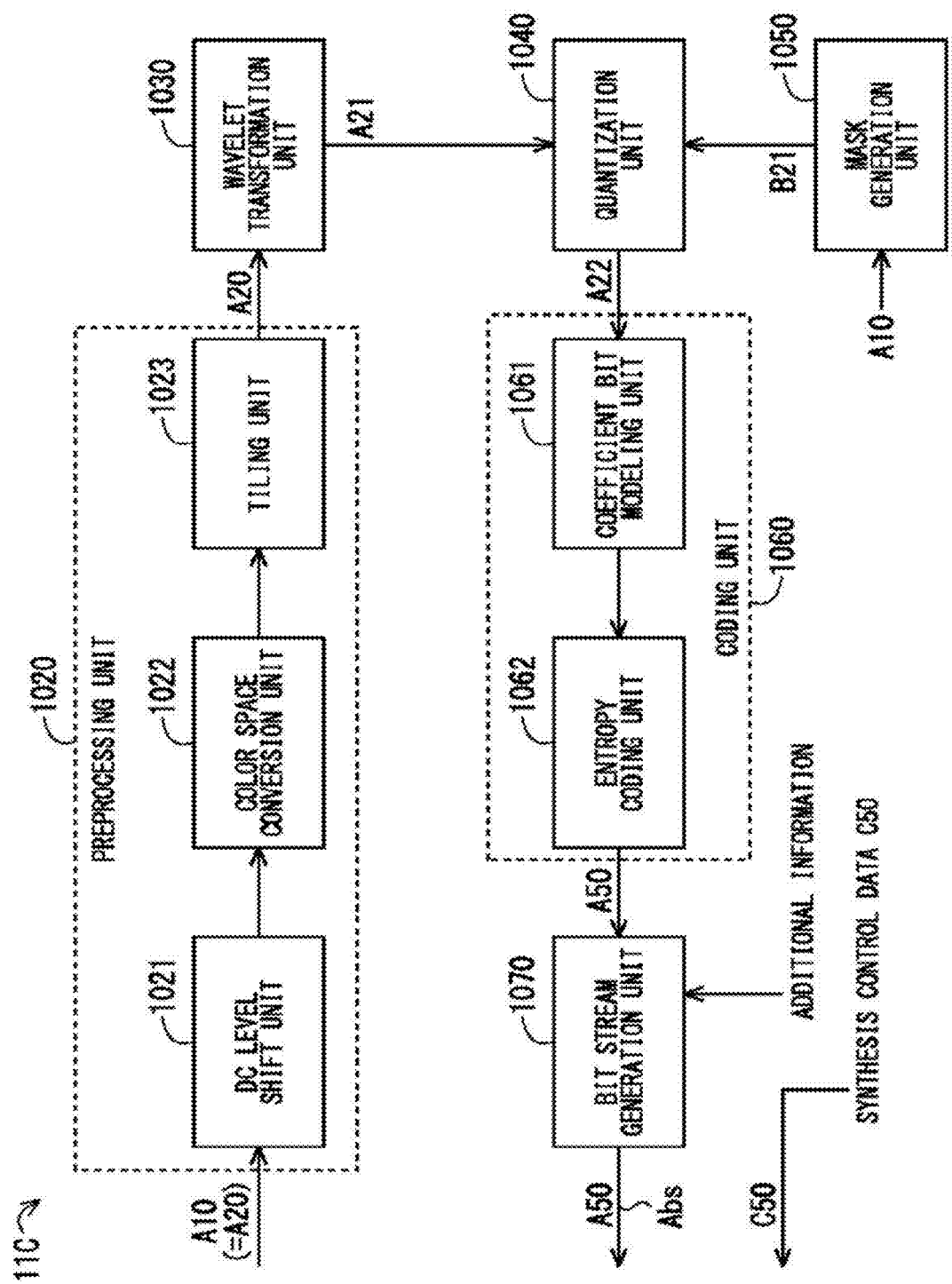
FIG. 29 is a block diagram showing a data supply system in accordance with a third preferred embodiment.
Figure 30:
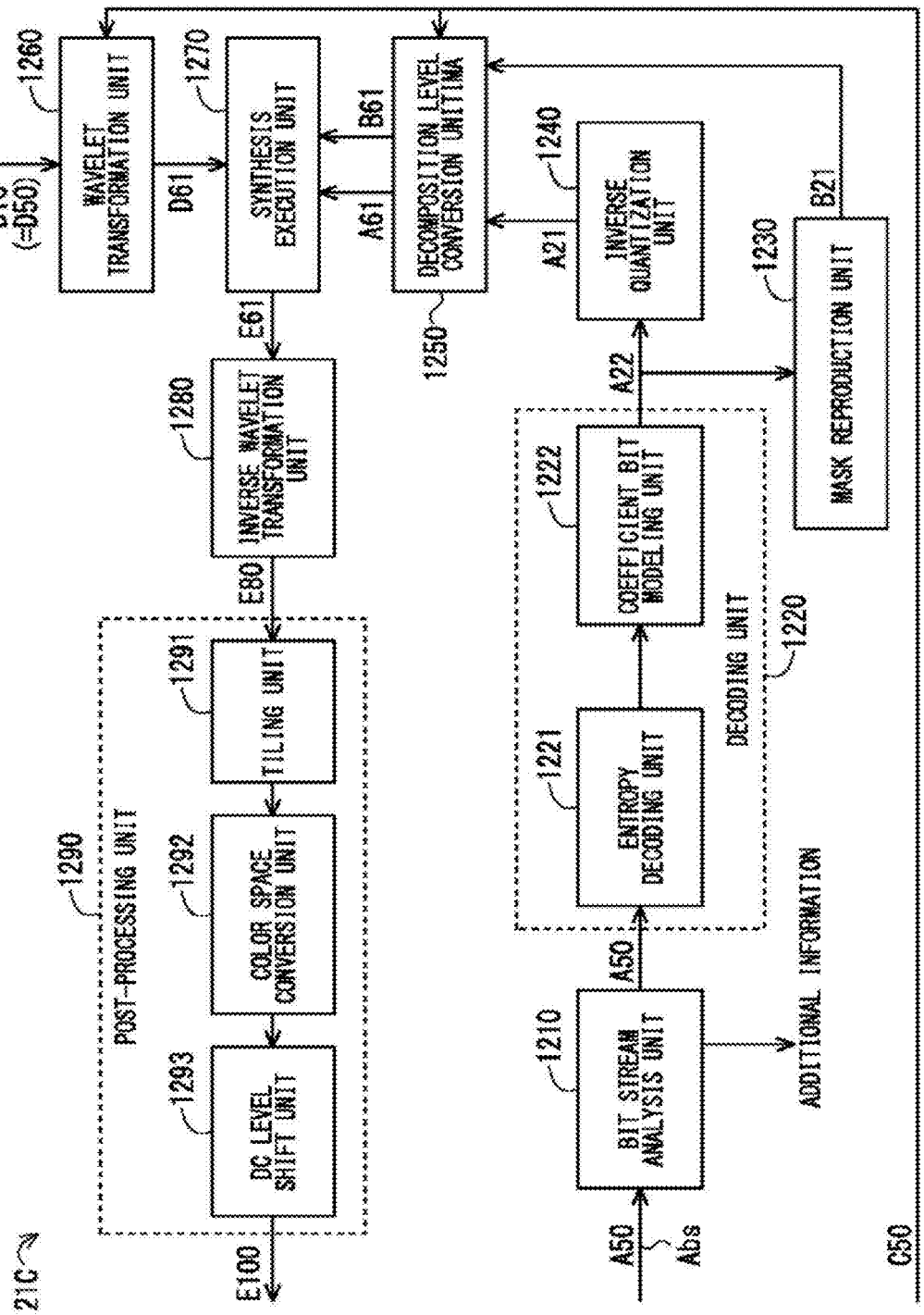
FIG. 30 is a block diagram showing an image synthesizing system in accordance with the third preferred embodiment.

FIG. 29 shows an exemplary constitution of a supply system 11C and FIG. 30 shows an exemplary constitution of a synthesizing system 21C in accordance with the third preferred embodiment. Instead of the supply system 11 and the synthesizing system 21 in accordance with the first preferred embodiment, the supply system 11C and the synthesizing system 21C can be applied to the image processing system 1, 10, 20, or the like.

As can be seen from FIGS. 29 and 30, the supply system 11C and the synthesizing system 21C basically have the same constitutions as those of the supply system 11 and the synthesizing system 21 of the first preferred embodiment (see FIGS. 3 and 17), respectively. The supply system 11C, however, outputs the synthesis control data C50 inputted by a user, not being embedded in the coded bit stream Abs. For this reason, the bit stream generation unit 1070 in the supply system 11C does not embed the synthesis control data C50 and the bit stream analysis unit 1210 in the synthesizing system 21C does not extract the synthesis control data C50.

FIG. 31 is a flowchart showing an operation of the supply system 11C. In an operation flow S1000C of FIG. 31, Step S1005 is deleted from the operation flow S1000 (see FIG. 16) of the first preferred embodiment. Further, in Step S1006C provided instead of Step S1006, the coded bit stream Abs and the synthesis control data C50 are outputted.

Figure 32:
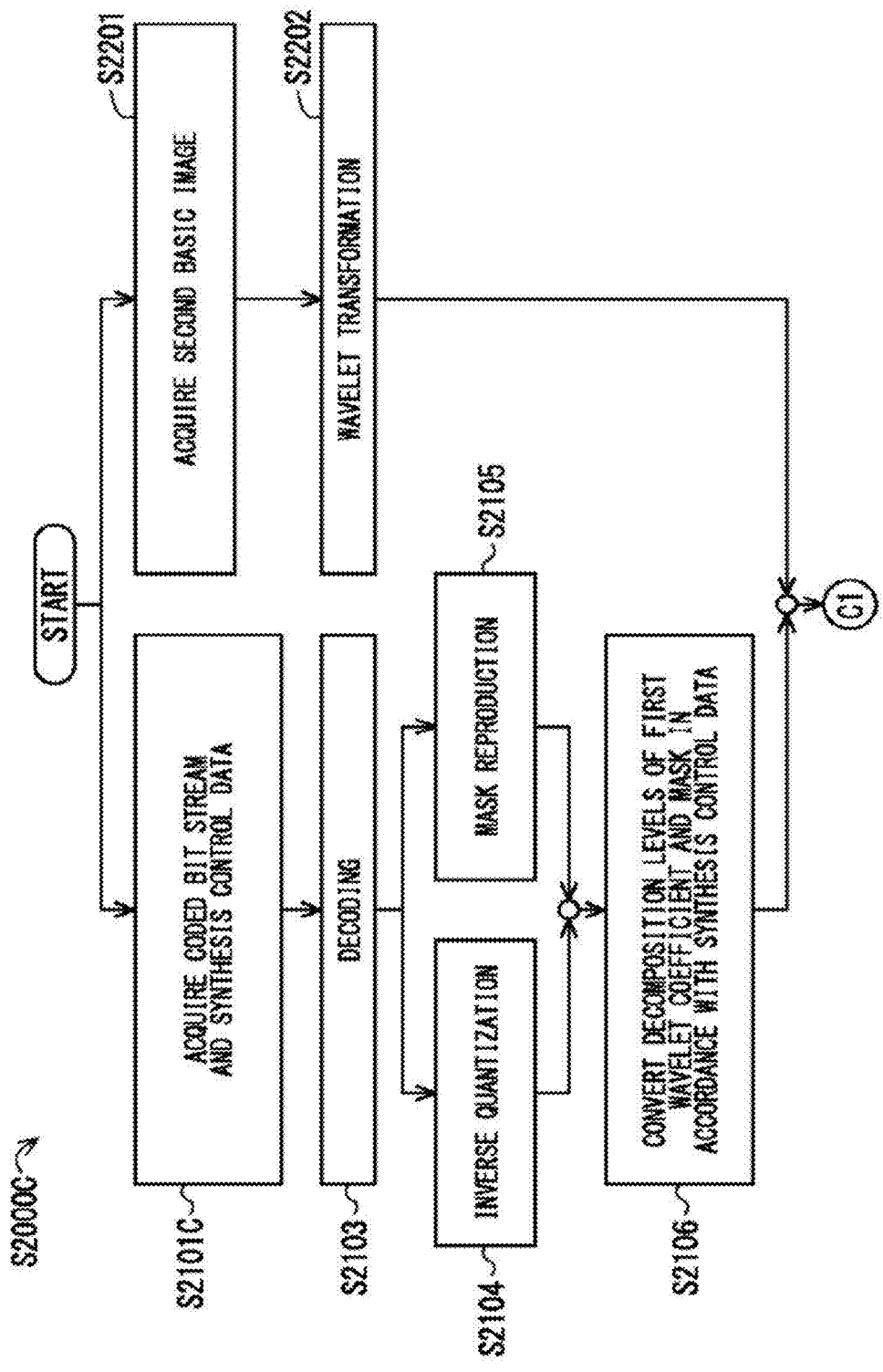
FIG. 32 is a flowchart showing an operation of the image synthesizing system in accordance with the third preferred embodiment.

FIG. 32 is a flowchart showing an operation of the synthesizing system 21C. In an operation flow S2000C of FIG. 32, Step S2102 is deleted from the operation flow S2000 (see FIG. 25) of the first preferred embodiment. Further, in Step S2101C provided instead of Step S2101, the coded bit stream Abs and the synthesis control data C50 are acquired. Unlike in FIG. 32, the coded bit stream Abs and the synthesis control data C50 may be acquired in different steps, in other words, at different timings.

Herein, it is assumed that the coded bit stream Abs (i.e., the coded data A50) and the synthesis control data C50 are supplied to the synthesizing system 21C through the same medium 50 (for example, the communication medium or the external memory medium). Different media 50, however, may be used. For example, the communication medium may be used to supply the coded data A50 and the external memory medium may be used to supply the synthesis control data C50.

In the third preferred embodiment, it is possible to produce the same effects as those of the first preferred embodiment. Further, the third preferred embodiment can be combined with the second preferred embodiment, and it is thereby possible to produce the same effect as that of the second preferred embodiment.

The Fourth Preferred Embodiment

Figure 33:
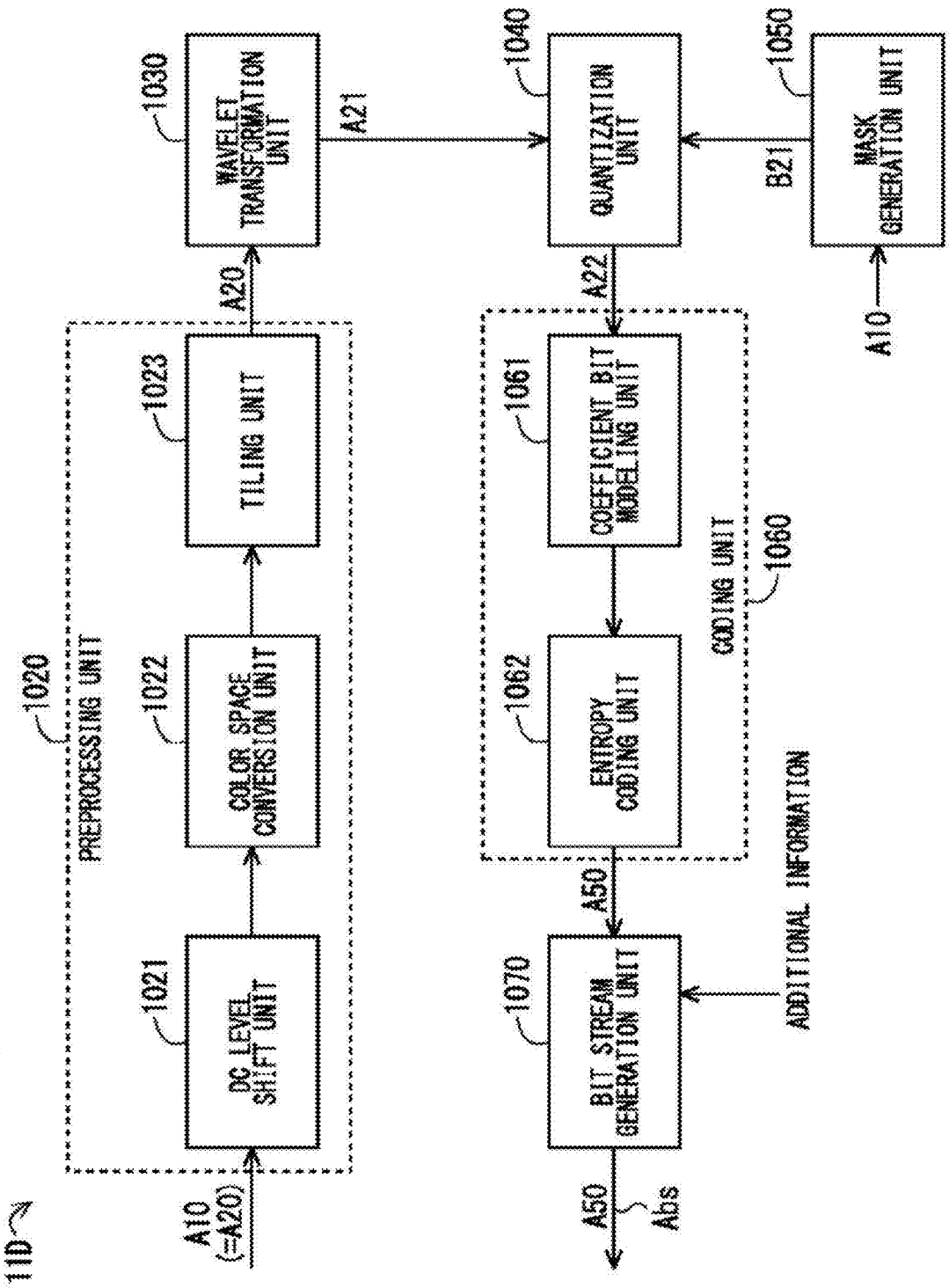
FIG. 33 is a block diagram showing a data supply system in accordance with a fourth preferred embodiment.
Figure 34:
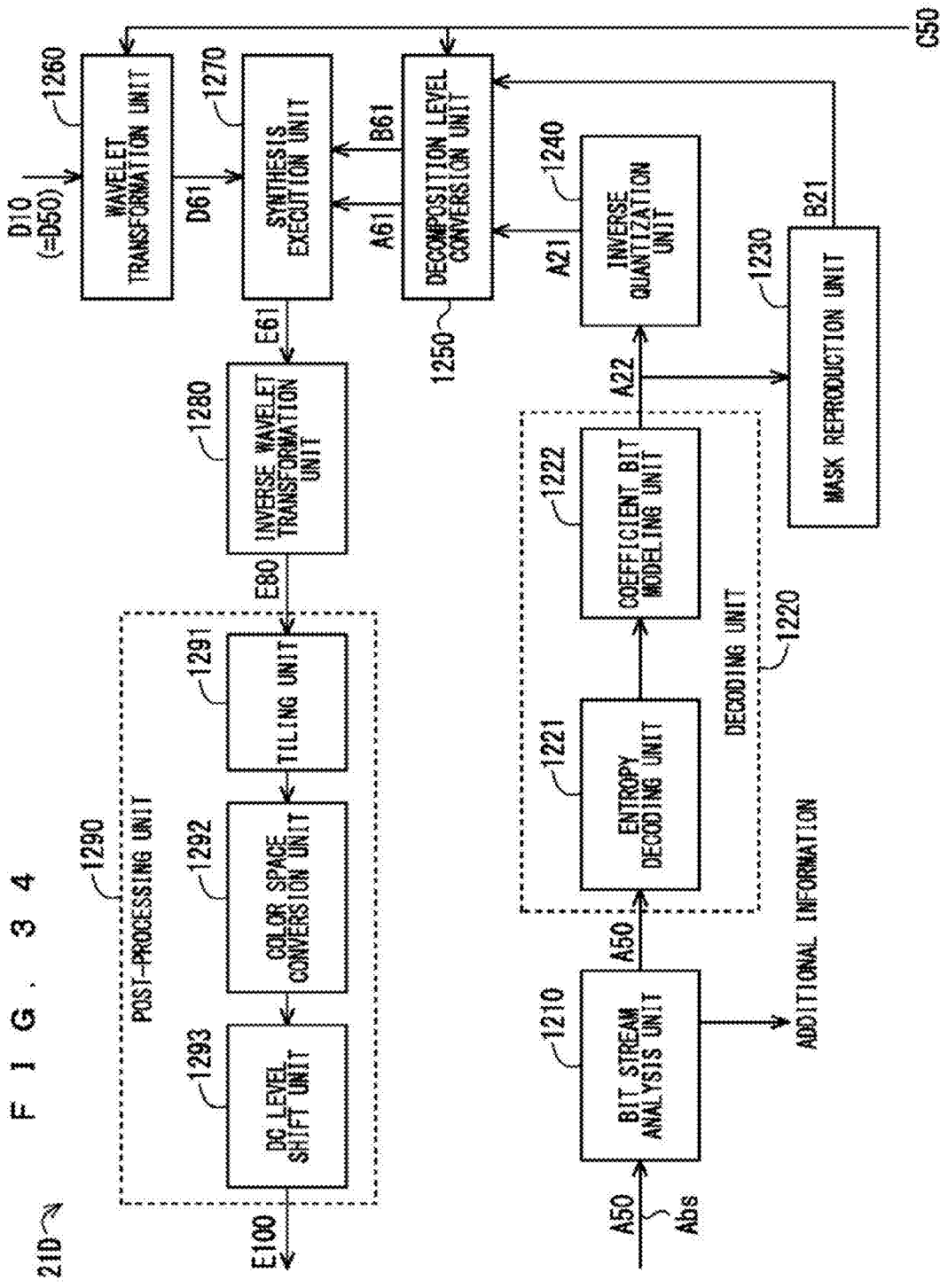
FIG. 34 is a block diagram showing an image synthesizing system in accordance with the fourth preferred embodiment.

FIG. 33 shows an exemplary constitution of a supply system 11D and FIG. 34 shows an exemplary constitution of a synthesizing system 21D in accordance with the fourth preferred embodiment. Instead of the supply system 11 and the synthesizing system 21 in accordance with the first preferred embodiment, the supply system 11D and the synthesizing system 21D can be applied to the image processing system 1, 10, 20, or the like.

As can be seen from FIGS. 33 and 34, the supply system 11D and the synthesizing system 21D basically have the same constitutions as those of the supply system 11 and the synthesizing system 21 of the first preferred embodiment (see FIGS. 3 and 17), respectively. The synthesis control data C50, however, are supplied to the synthesizing system 21D by user input to the operation unit 42 provided on the side of the synthesizing system 21D (see FIG. 2). For this reason, the supply system 11D does not receive the input of the synthesis control data C50 or output the data to the outside of the system.

On the other hand, like in the third preferred embodiment, the coded bit stream Abs (i.e., the coded data A50) is supplied to the synthesizing system 21D through the medium 50 (for example, the communication medium or the external memory medium). The synthesizing system 21D acquires the synthesis control data C50 through a medium different from the medium through which the coded data A50 are supplied.

In the fourth preferred embodiment, it is possible to produce the same effects as those of the first preferred embodiment. In the fourth preferred embodiment, particularly, since the synthesis control data C50 can be inputted on the side of the synthesizing system 21D, the state of synthesis can be adjusted on the side of the synthesizing system 21D. Further, the fourth preferred embodiment can be combined with the second preferred embodiment, and it is thereby possible to produce the same effect as that of the second preferred embodiment.

The Fifth Preferred Embodiment

Figure 35:
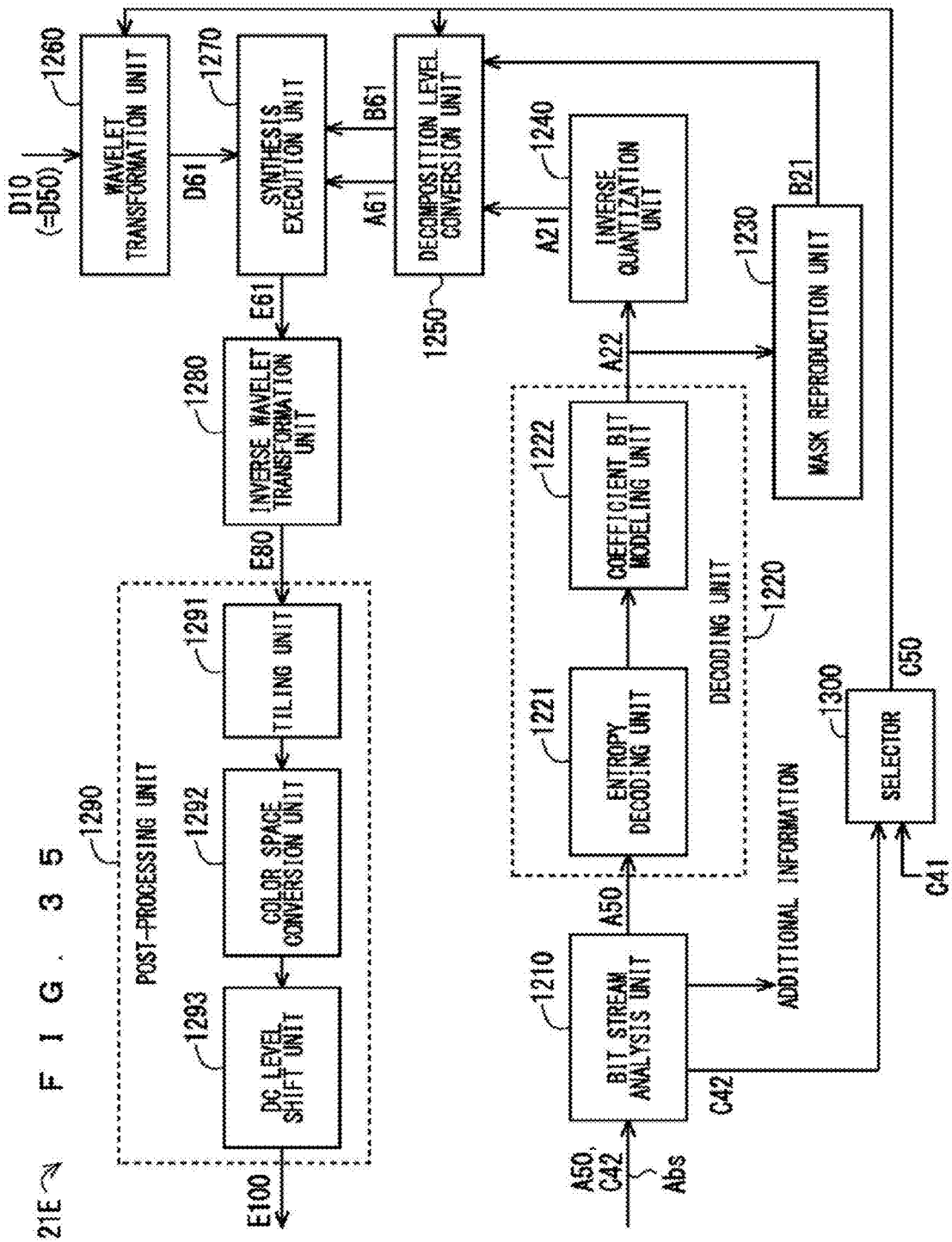
FIG. 35 is a block diagram showing an image synthesizing system in accordance with a fifth preferred embodiment.

FIG. 35 shows an exemplary constitution of a synthesizing system 21E in accordance with the fifth preferred embodiment. Instead of the synthesizing system 21 in accordance with the first preferred embodiment, the synthesizing system 21E can be applied to the image processing system 1, 20, or the like. Herein, it is assumed that the synthesizing system 21E is combined with the supply system 11 of the first preferred embodiment (see FIG. 3).

As can be seen from the comparison of FIG. 35 with FIG. 17, the synthesizing system 21E have a constitution in which a selector 1300 is added to that of the synthesizing system 21 of the first preferred embodiment. The selector 1300 selectively supplies one of a plurality of pieces of synthesis control data to the decomposition level conversion unit 1250 and the wavelet transformation unit 1260. In the exemplary constitution of FIG. 35, two pieces of synthesis control data C41 and C42 are inputted to the selector 1300, and either of the two pieces of synthesis control data are outputted as the synthesis control data C50.

The first synthesis control data C41 are supplied to the selector 1300 when a user of the synthesizing system 21E inputs the data to the operation unit 42 (see FIG. 2) provided on the side of the synthesizing system 21E.

The second synthesis control data C42 are supplied to the selector 1300 from the supply system 11 through the medium 50. More specifically, the second synthesis control data C42 are embedded into the coded bit stream Abs in the supply system 11, and the coded bit stream Abs is supplied to the bit stream analysis unit 1210 through the medium 50. Then, the second synthesis control data C42 are extracted by the bit stream analysis unit 1210 and inputted to the selector 1300. In other words, the second synthesis control data C42 are supplied through a medium different from the medium through which the first synthesis control data C41 are supplied.

The selector 1300 is set to preferentially select and output the first synthesis control data C41. Like in the fourth preferred embodiment, it is thereby possible to adjust the state of synthesis on the side of the synthesizing system 21E. On the other hand, when the first synthesis control data C41 are not inputted, since the second synthesis control data C42 are outputted, it is possible to save any labor on the side of the synthesizing system 21E.

The priority in selection of a plurality of synthesis control data may be fixed or may be changeable. It can be assumed that the change of the priority in selection is performed, for example, by either one or both of the operation unit 42 provided on the side of the synthesizing system 21E and the operation unit 32 provided on the side of the supply system 11.

In the fifth preferred embodiment, it is possible to produce the same effects as those of the first preferred embodiment. Further, the fifth preferred embodiment can be combined with the second preferred embodiment and the like, and it is thereby possible to produce the same effect as that of the second preferred embodiment and the like.

Further, by applying the configuration of FIG. 35, a configuration in which a designation of the first decomposition level is inputted to the supply system 11 and the mask adjustment instruction is inputted to the synthesizing system 21E and an inverse configuration can be achieved.

The Sixth Preferred Embodiment

In the first preferred embodiment, the case has been described where the whole of the first basic image constitutes the first target image to be use for the image synthesis. The same applies to the second to fifth preferred embodiments. Herein, in consideration of the fact that the non-ROI in the first basic image is not basically needed in the image synthesis, there is a possible case where only a portion of the first basic image, which includes the ROI, is cut out and the cut-out image is supplied to the synthesizing system 21 as the first target image.

By cutting out a portion of the first basic image as the first target image, it is possible to reduce the size of the coded data A50 for the first target image and therefore possible to reduce the size of the coded bit stream. For this reason, when the coded bit stream is transferred via wired or wireless communication, the reduction in the size of the coded data A50 causes the reduction in the amount of communication and contributes to the immediacy of transfer. Further, since the second target image becomes smaller as the first target image becomes smaller, it is possible to reduce the computational load in the synthesizing system. This contributes to speed-up of the image synthesis. In consideration of these points, it is possible to increase the immediacy of the image synthesis.

<Cut-Out Range Determination Process>

Before describing an exemplary constitution of a system in accordance with the sixth preferred embodiment, description will be made on a range of the first basic image to be cut out as the first target image.

As described above, by cutting out a portion of the first basic image as the first target image, it is possible to reduce the size of the coded data to be outputted from the supply system. For this reason, basically, an arbitrary range including the ROI in the first basic image can be set as the first target image. Then, in order to largely reduce the data size, it is preferable that the first target image should be as small as possible.

On the other hand, since the first target image and the second target image are synthesized with each other after the wavelet transformation, it is necessary to determine a cut-out range so that the range of the ROI may not be distorted even in the wavelet coefficient data (in other words, even on the wavelet plane).

Figure 36:
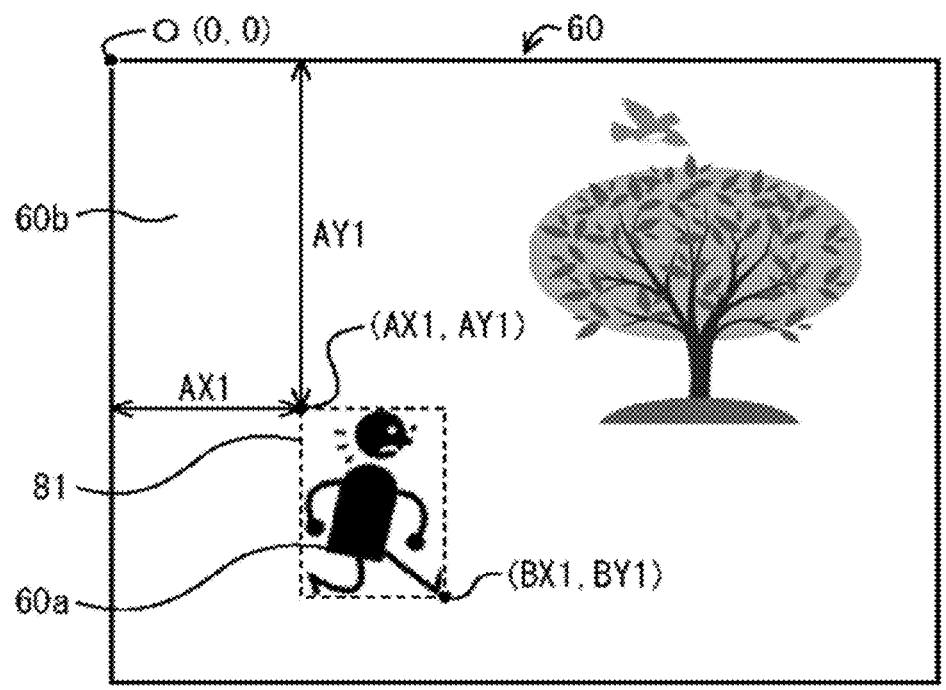
FIGS. 36 to 39 are views each showing a cut-out range in accordance with a sixth preferred embodiment.

FIGS. 36 to 39 are views each showing a cut-out range. Using the first basic image 60 shown in FIG. 8, FIG. 36 shows a rectangular minimum range 81 including a ROI 60a. Since the minimum range 81 is set in a rectangular forms the position and range of the minimum range 81 can be specified by using upper-left end coordinates (AX1, AY1) and lower-right end coordinates (BX1, BY1). In FIG. 36 and the like, the upper-left end of the first basic image 60 is adopted as an origin point O (0, 0) in the coordinate system, and two orthogonal axes are adopted in horizontal and vertical directions of the first basic image 60.

Figure 37:
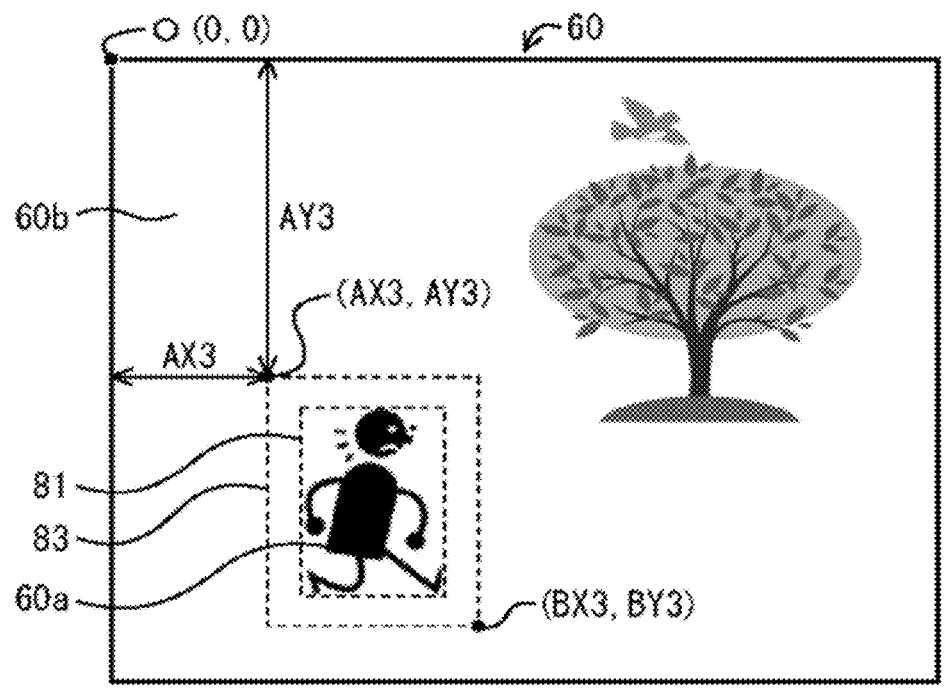

FIG. 37 shows a range 83 to be cut out as the first target image. The cut-out range 83 includes the minimum range 81 and is larger than the minimum range 81. The cut-out range

83 has upper-left end coordinates (AX3, AY3) and lower-right end coordinates (BX3, BY3).

Figure 38:
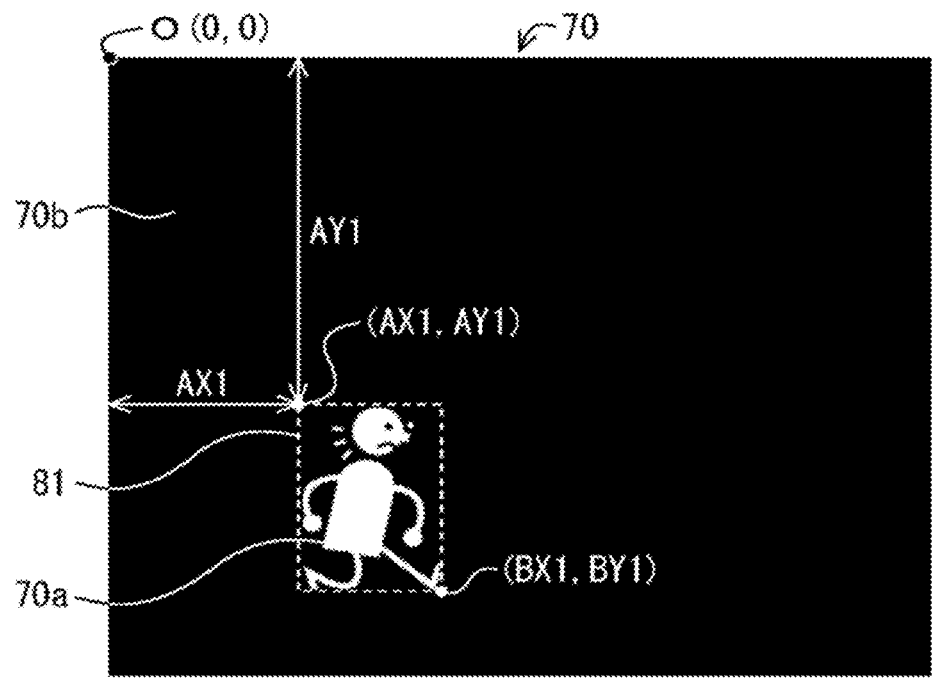
Figure 39:
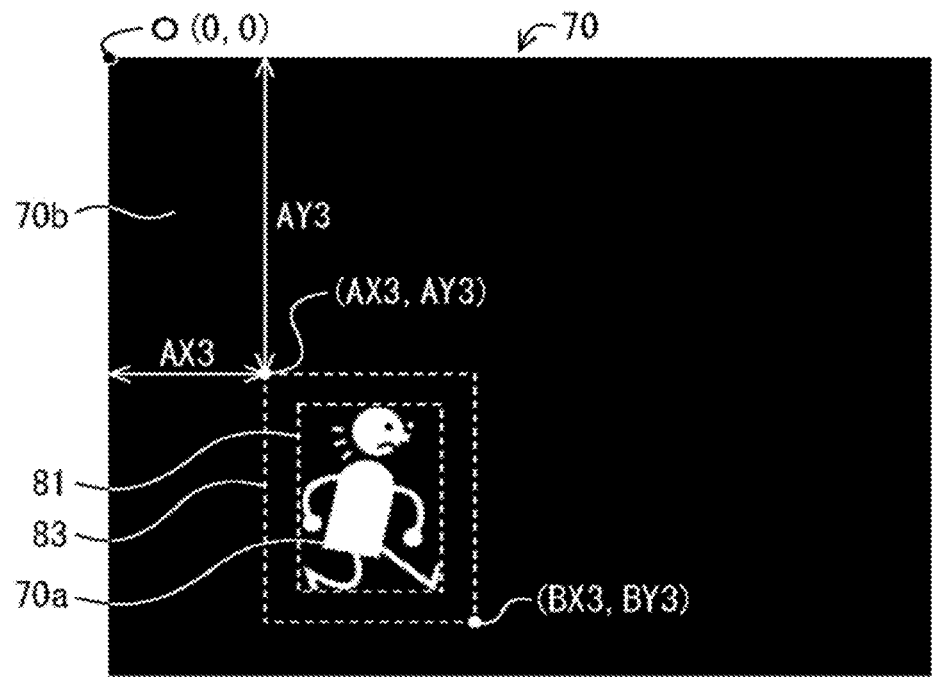

FIGS. 38 and 39 are views showing the minimum range 81 and the cut-out range 83 in the basic mask 70 corresponding to the first basic image, respectively.

FIG. 40 is a flowchart showing a process of determining the cut-out range 83 (cut-out range determination process). In an operation flow S500 of FIG. 40, a minimum range specifying process is performed in Step S501, a tracking process is performed in Step S502, and a required range specifying process is performed in Step S503.

<Minimum Range Specifying Process>

In Step S501 for the minimum range specifying process, in the first basic image 60 which is the original image before cut-out, the rectangular minimum range 81 including the ROI 60a is specified. The specification of the minimum range 81 is performed on the basis of the original mask for the first basic image 60, i.e., the basic mask 70.

For example, each row of the basic mask 70 is sequentially selected from the top and it is determined whether or not the selected row has a pixel belonging to the ROI corresponding portion 70a. The position of the row which is first determined to have a pixel belonging to the ROI corresponding portion 70a corresponds to "AY1". Similarly, by sequentially selecting each row of the basic mask 70 from the bottom, "BY1" can be obtained. Further, by sequentially selecting each column of the basic mask 70 from the left, "AX1" can be obtained, and by sequentially selecting each column of the basic mask 70 from the right, "BX1" can be obtained.

<Tracking Process>

In order not to distort the range of the ROI on the wavelet plane, it is necessary to make it possible to perform the wavelet transformation on the entire minimum range 81. In the wavelet transformation, not only the data of the pixel of interest but also the data of the pixels on both sides thereof are used. For this reason, when the wavelet transformation is performed on the pixels near the outer edge of the minimum range 81, data of pixels outside the minimum range 81 are needed. Therefore, the cut-out range 83 is larger than the minimum range 81.

The method of obtaining the range of required pixels outside the minimum range 81 is shown, for example, in Japanese Patent Application Laid Open Gazette No. 2003-324613. The range of required pixels outside the minimum range 81 depends on the number of taps of a divided filter used for the wavelet transformation.

In a case of using a 5×3 filter in which a low-pass filter on the decomposition side has five taps and a high-pass filter on the decomposition side has three taps, for example, as shown in FIG. 41, in order to obtain the n-th output of the low-pass filter, data of five pixels from the {2n−2}th pixel to the {2n+2}th pixel are needed on the input side. Further, as shown in FIG. 42, in order to obtain the n-th output of the high-pass filter, data of three pixels from the 2n-th pixel to the {2n+2}th pixel are needed on the input side.

Further, in a case of using a Daubechies 9×7 filter in which a low-pass filter on the decomposition side has nine taps and a high-pass filter on the decomposition side has seven taps, as shown in FIG. 43, in order to obtain the n-th output of the low-pass filter, data of nine pixels from the {2n−4}th pixel to the {2n+4}th pixel are needed on the input side. Furthermore, as shown in FIG. 44, in order to obtain the n-th output of the high-pass filter, data of seven pixels from the {2n−2}th pixel to the {2n+4}th pixel are needed on the input side.

Further, the range of required pixels outside the minimum range 81 depends on the decomposition level of the wavelet transformation. This is because a processing using the divided filter is repeated the number of times specified by the decomposition level, for the highest-order band component (i.e., the band component which is decomposed most) on the wavelet plane.

In consideration of these points, in Step S502 for the tracking process, in the highest-order band component on the final wavelet plane, a range corresponding to the minimum range 81 is specified as a tracked minimum range.

Herein, the wavelet transformation is performed by the wavelet transformation unit 1030 in the supply system (see FIG. 3 and the like). Further, when the first decomposition level specified by the synthesis control data C50 is larger than the initial decomposition level on the supply system side, the wavelet transformation is also performed by the decomposition level conversion unit 1250 in the synthesizing system (see FIGS. 17, 27, and the like). In consideration of this point, by assuming that the wavelet plane of decomposition level which is higher one of the initial decomposition level and the first decomposition level as the above final wavelet plane, it is possible to reliably prevent the range of the ROI from being distorted. Further, it is assumed that the decomposition level which is higher one of the initial decomposition level and the first decomposition level is referred to as a highest decomposition level.

Figure 45:
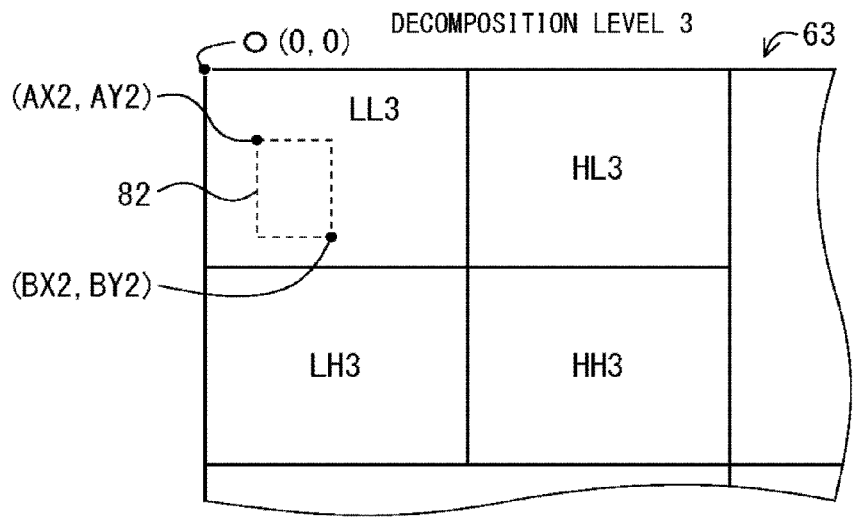
FIG. 45 is a view showing a tracked minimum range in accordance with the sixth preferred embodiment.

FIG. 45 is a view showing the tracked minimum range. FIG. 45 enlargedly shows the highest-order band components LL3, HL3, LH3, and HH3 in the wavelet plane 63 of decomposition level 3. Further, FIG. 45 shows a case of specifying the tracked minimum range 82 corresponding to the minimum range 81 in the lowest-frequency band component LL3 among the highest-order band components LL3, HL3, LH3, and HH3. Furthermore, an origin point O (0, 0) in the wavelet plane corresponds to an origin point O of the original image (i.e., the first basic image 60). In the tracked minimum range 82 on the wavelet plane 63, it is assumed that the upper-left end coordinates are (AX2, AY2) and the lower-right end coordinates are (BX2, BY2).

Figure 46:
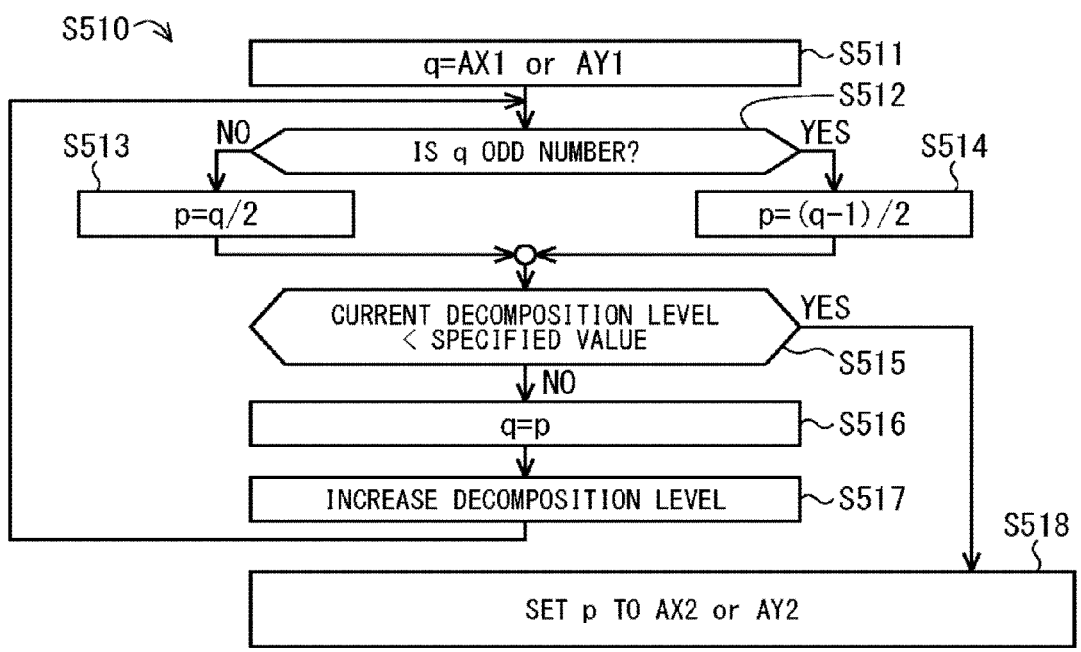
FIG. 46 is a flowchart showing how to obtain upper-left end coordinates of the tracked minimum range in accordance with the sixth preferred embodiment (5×3 filter)
Figure 47:
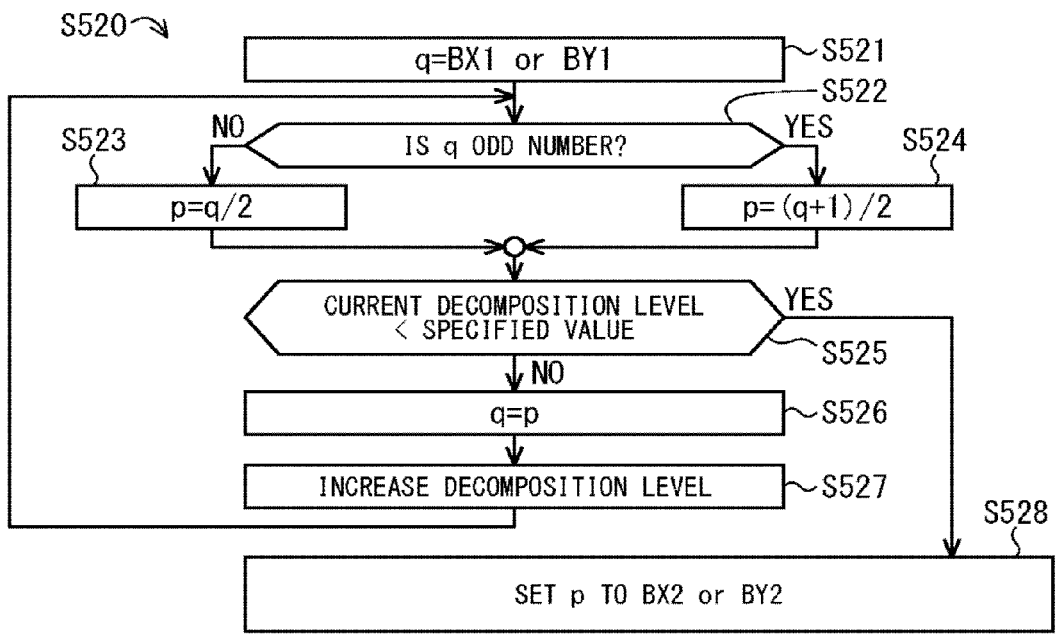
FIG. 47 is a flowchart showing how to obtain lower-right end coordinates of the tracked minimum range in accordance with the sixth preferred embodiment (5×3 filter)

FIGS. 46 and 47 are flowcharts for obtaining the tracked minimum range 82 in the case of using the 5×3 filter for the wavelet transformation. Further, FIG. 46 shows how to obtain the upper-left end coordinates (AX2, AY2) and FIG. 47 shows how to obtain the lower-right end coordinates (BX2, BY2).

In an operation flow S510 of FIG. 46, either coordinate value of the upper-left end coordinates (AX1, AY1) of the minimum range 81 is set to a parameter q in Step S511. Herein, it is assumed that it is first set that q=AX1.

When it is determined in Step S512 that q is an even number, it is set that a parameter p=q/2 in Step S513. On the other hand, when it is determined in Step S512 that q is an odd number, it is set that p=(q−1)/2 in Step S514.

Then, when it is determined in Step S515 that the current decomposition level does not reach the highest decomposition level, the current value of p is set to a new value of q (q=p) in Step S516. After that, the decomposition level is increased in Step S517 and the process goes back to Step S512.

On the other hand, when it is determined in Step S515 that the current decomposition level reaches the highest decomposition level, the value of p at that point in time is set to AX2 of the tracked minimum range 82 in Step S518.

By setting q=AY1 in Step S511, AY2 of the tracked minimum range 82 can be obtained in Step S518.

In an operation flow S520 of FIG. 47, BX2 of the tracked minimum range 82 can be obtained from BX1 of the minimum range 81, and BY2 of the tracked minimum range 82 can be obtained from BY1 of the minimum range 81. The operation flow S520 is basically the same as the operation flow S510 of FIG. 46 except computation in Step S524. Specifically, when it is determined in Step S522 that q is an odd number, t is set that p=(q+1)/2 in Step S524.

In consideration of the operation flows S510 and S520, the tracking process in the case of using the 5×3 filter for the wavelet transformation can be also expressed as follows.

A process (referred to as a first recursive process) in which when AX1 is an even number, AX1/2 is set to new AX1 and when AX1 is an odd number, {AX1−1}/2 is set to the new AX1 is performed the specified number of times which is specified by a value of the highest decomposition level, and the AX1 that is finally obtained is set to AX2.

A process (referred to as a second recursive process) in which when AY1 is an even number, AY1/2 is set to new AY1 and when AY1 is an odd number, {AY1−1}/2 is set to the new AY1 is performed the above-described specified number of times, and the AY1 that is finally obtained is set to AY2.

A process (referred to as a third recursive process) in which when BX1 is an even number, BX1/2 is set to new BX1 and when BX1 is an odd number, {BX1+1}/2 is set to the new BX1 is performed the above-described specified number of times, and the BX1 that is finally obtained is set to BX2.

A process (referred to as a fourth recursive process) in which when BY1 is an even number, BY1/2 is set to new BY1 and when BY1 is an odd number, {BY1+1}/2 is set to the new BY1 is performed the above-described specified number of times, and the BY1 that is finally obtained is set to BY2.

Figure 48:
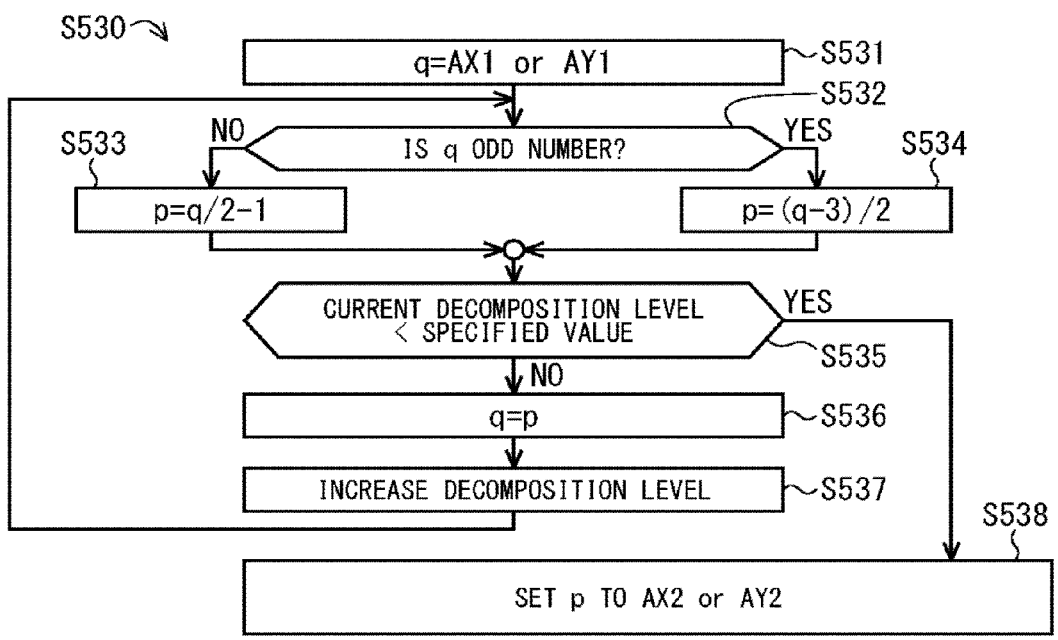
FIG. 48 is a flowchart showing how to obtain upper-left end coordinates of the tracked minimum range in accordance with the sixth preferred embodiment (Daubechies 9×7 filter)
Figure 49:
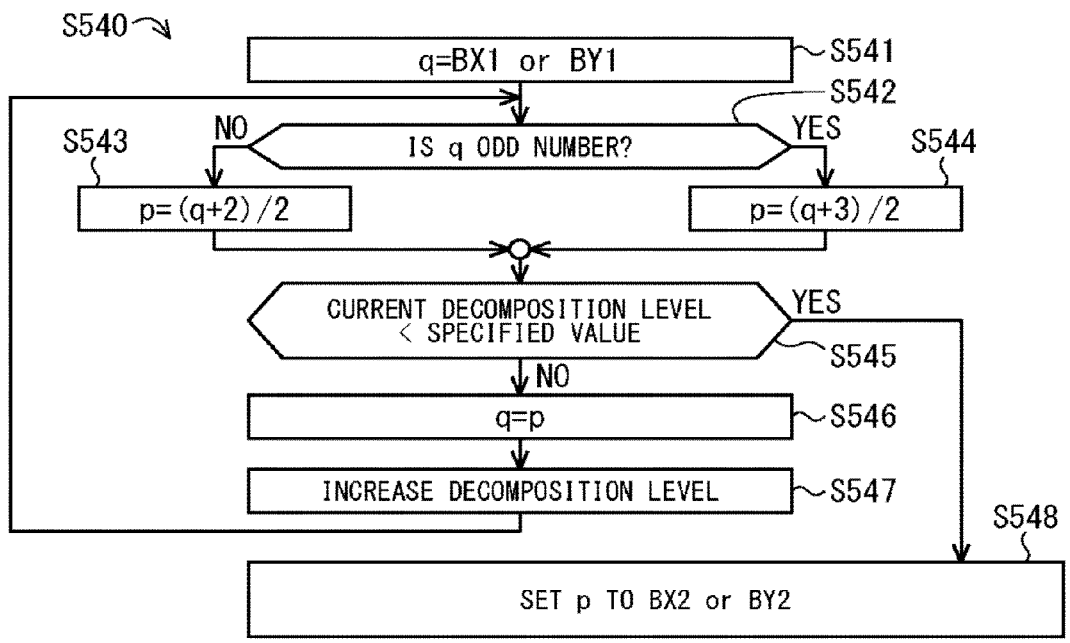
FIG. 49 is a flowchart showing how to obtain lower-right end coordinates of the tracked minimum range in accordance with the sixth preferred embodiment (Daubechies 9×7 filter)

FIGS. 48 and 49 are flowcharts for obtaining the tracked minimum range 82 in the case of using the Daubechies 9×7 filter for the wavelet transformation. Further, FIG. 48 shows how to obtain the upper-left end coordinates (AX2, AY2) and FIG. 49 shows how to obtain the lower-right end coordinates (BX2, BY2).

In an operation flow S530 of FIG. 48, AX2 of the tracked minimum range 82 can be obtained from AX1 of the minimum range 81, and AY2 of the tracked minimum range 82 can be obtained from AY1 of the minimum range 81. The operation flow S530 is basically the same as the operation flow S510 of FIG. 46 except computations in Steps S533 and S534. Specifically, when it is determined in Step S532 that q is an even number, it is set that p=q/2−1 in Step S533. On the other hand, when it is determined in Step S532 that q is an odd number, it is set that p=(q−3)/2 in Step S534.

In an operation flow S540 of FIG. 49, BX2 of the tracked minimum range 82 can be obtained from BX1 of the minimum range 81, and BY2 of the tracked minimum range 82 can be obtained from BY1 of the minimum range 81. The operation flow S540 is basically the same as the operation flow S510 of FIG. 46 except computations in Steps S543 and S544. Specifically, when it is determined in Step S542 that q is an even number, it is set that p=(q+2)/2 in Step S543. On the other hand, when it is determined in Step S542 that q is an odd number, it is set that p=(q+3)/2 in Step S544.

In consideration of the operation flows S530 and S540, the tracking process in the case of using the Daubechies 9×7 filter for the wavelet transformation can be also expressed as follows.

A process (referred to as a ninth recursive process) in which when AX1 is an even number, {AX1/2−1} is set to new AX1 and when AX1 is an odd number, {AX1−3}/2 is set to the new AX1 is performed the specified number of times which is specified by a value of the highest decomposition level, and the AX1 that is finally obtained is set to AX2.

A process (referred to as a tenth recursive process) in which when AY1 is an even number, {AY1/2−1} is set to new AY1 and when AY1 is an odd number, {AY1−3}/2 is set to the new AY1 is performed the above-described specified number of times, and the AY1 that is finally obtained is set to AY2.

A process (referred to as an eleventh recursive process) in which when BX1 is an even number, {BX1+2}/2 is set to new BX1 and when BX1 is an odd number, {BX1+3}/2 is set to the new BX1 is performed the above-described specified number of times, and the BX1 that is finally obtained is set to BX2.

A process (referred to as a twelfth recursive process) in which when BY1 is an even number, {BY1+2}/2 is set to new BY1 and when BY1 is an odd number, {BY1+3}/2 is set to the new BY1 is performed the above-described specified number of times, and the $BY^1$ that is finally obtained is set to BY2.

Further, the computations in Steps S513, S514, S523, S524, S533, S534, S543, and S544 are determined in accordance with the number of taps of the filter. Furthermore, for easy computations, a carry is made to an even-numbered unit.

<Required Range Specifying Process>

With reference back to FIG. 40, in Step S503 for the required range specifying process, specified is a range in the first basic image 60 before the cut-out, in which data required to calculate the wavelet coefficient in the tracked minimum range 82 are present. The specified required range is the cut-out range 83.

Figure 50:
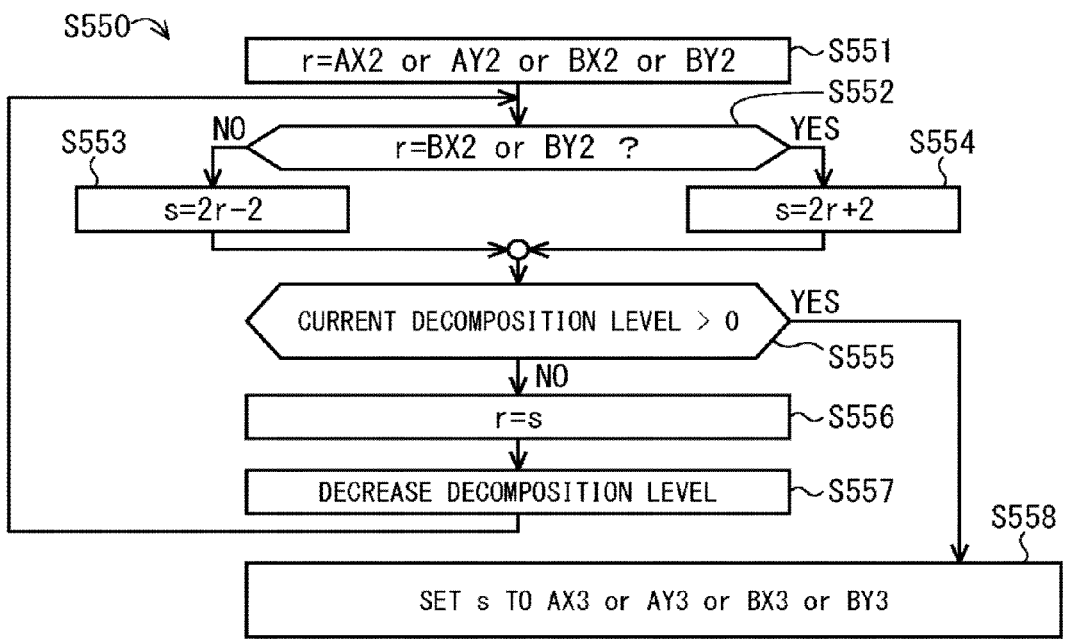
FIG. 50 is a flowchart showing how to obtain a required range (cut-out range) in accordance with the sixth preferred embodiment (5×3 filter)

FIG. 50 is a flowchart for obtaining the cut-out range 83 from the tracked minimum range 82 in the case of using the 5×3 filter for the wavelet transformation.

In an operation flow S550 of FIG. 50, AX2, AY2, BX2, or BY2 of the tracked minimum range 82 is set to a parameter r in Step S551. Herein, it is assumed that it is first set that r=AX2.

When it is determined in Step S552 that r is not BX2 or BY2 (in other words, it is determined that r is a coordinate value of the upper-left end coordinates of the tracked minimum range 82), it is set that a parameter s=2r−2 in Step S553. On the other hand, when it is determined in Step S552 that r is BX2 or BY2 (in other words, it is determined that r is a coordinate value of the lower-right end coordinates of the tracked minimum range 82), it is set that s=2r+2 in Step S554.

Then, when it is determined in Step S555 that the current decomposition level does not reach 0, the current value of s is set to a new value of r (r=s) in Step S556. After that, the decomposition level is decreased in Step S557 and the process goes back to Step S552.

On the other hand, when it is determined in Step S555 that the current decomposition level reaches 0, the value of s at that point in time is set to AX3 of the cut-out range 83 in Step S558.

By setting r=AY2, BX2, or BY2 in Step S551, AY3, BX3, or BY3 of the cut-out range 83 can be obtained in Step S558.

In consideration of the operation flow S550, the required range specifying process in the case of using the 5×3 filter for the wavelet transformation can be also expressed as follows.

A process (referred to as a fifth recursive process) in which {AX2×2−2} is set to new AX2 is performed the specified number of times which is specified by a value of the highest decomposition level, and the AX2 that is finally obtained is set to AX3.

A process (referred to as a sixth recursive process) in which {AY2×2−2} is set to new AY2 is performed the above-described specified number of times, and the AY2 that is finally obtained is set to AY3.

A process (referred to as a seventh recursive process) in which {BX2×2+2} is set to new BX2 is performed the above-described specified number of times, and the BX2 that is finally obtained is set to BX3.

A process (referred to as an eighth recursive process) in which {BY2×2+2} is set to new BY2 is performed the above-described specified number of times, and the BY2 that is finally obtained is set to BY3.

FIG. 51 is a flowchart for obtaining the cut-out range 83 from the tracked minimum range 82 in the case of using the Daubechies 9×7 filter for the wavelet transformation.

An operation flow S560 of FIG. 51 is basically the same as the operation flow S550 of FIG. 50 except computations in Steps S563 and S564. Specifically, when it is determined in Step S562 that r is not BX2 or BY2, it is set that s=2r−4 in Step S563. On the other hand, when it is determined in Step S562 that r is BX2 or BY2, it is set that s=2r+4 in Step S564.

In consideration of the operation flow S560, the required range specifying process in the case of using the Daubechies 9×7 filter for the wavelet transformation can be also expressed as follows.

A process (referred to as a thirteenth recursive process) in which {AX2×2−4} is set to new AX2 is performed the specified number of times which is specified by a value of the highest decomposition level, and the AX2 that is finally obtained is set to AX3.

A process (referred to as a fourteenth recursive process) in which {AY2×2−4} is set to new AY2 is performed the above-described specified number of times, and the AY2 that is finally obtained is set to AY3.

A process (referred to as a fifteenth recursive process) in which {BX2×2+4} is set to new BX2 is performed the above-described specified number of times, and the BX2 that is finally obtained is set to BX3.

A process (referred to as a sixteenth recursive process) in which {BY2×2+4} is set to new BY2 is performed the above-described specified number of times, and the BY2 that is finally obtained is set to BY3.

<Supply System 11F>

Figure 52:
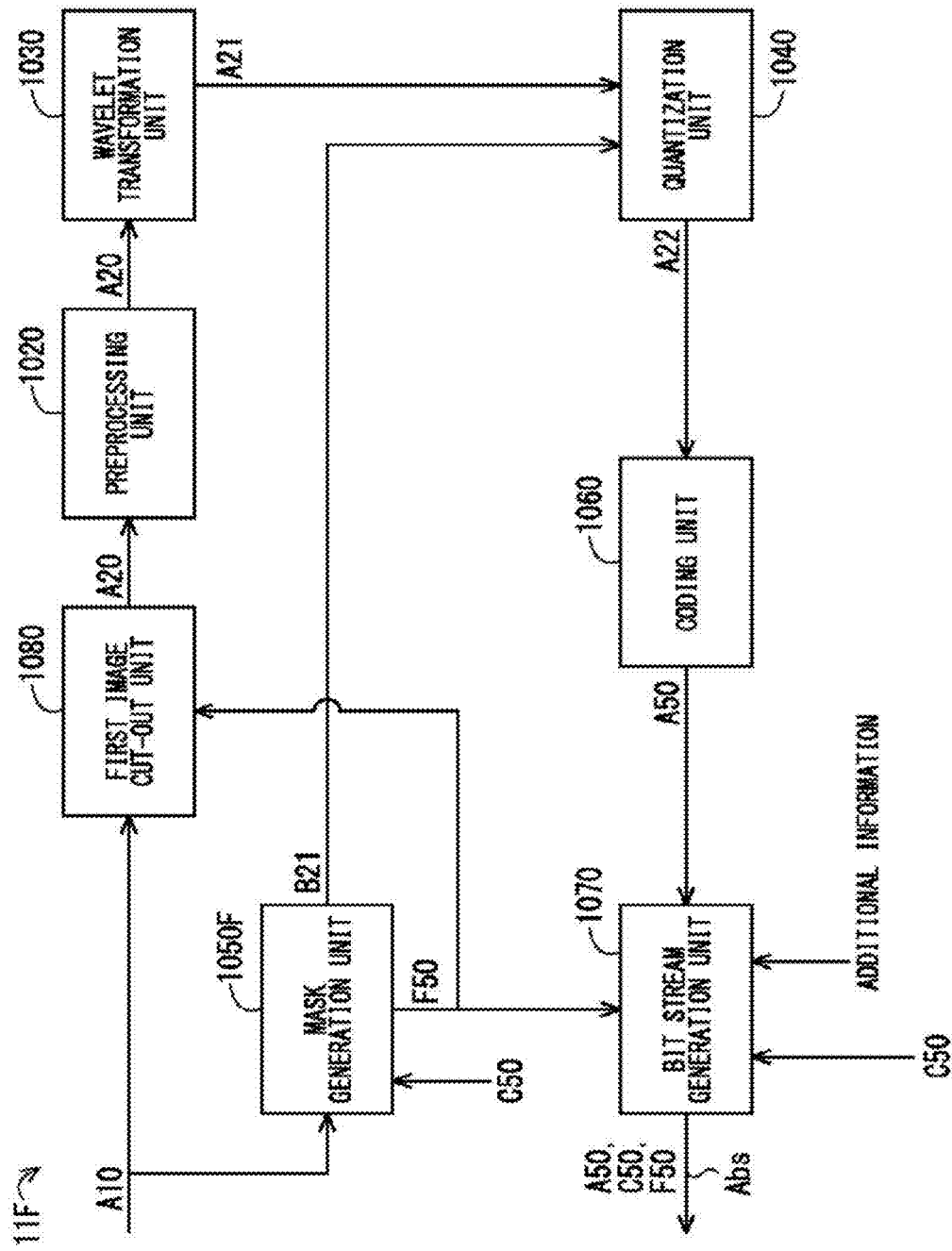
FIG. 52 is a block diagram showing a data supply system in accordance with the sixth preferred embodiment.

FIG. 52 shows an exemplary constitution of a supply system 11F in accordance with the sixth preferred embodiment. Instead of the supply system 11 in accordance with the first preferred embodiment, the supply system 11F can be applied to the image processing system 1, 10, or the like. In the supply system 11F, a mask generation unit 1050F is provided instead of the mask generation unit 1050 and a first image cut-out unit 1080 is added. Other constituent elements in the supply system 11F are identical to those of the supply system 11 in accordance with the first preferred embodiment.

Figure 53:
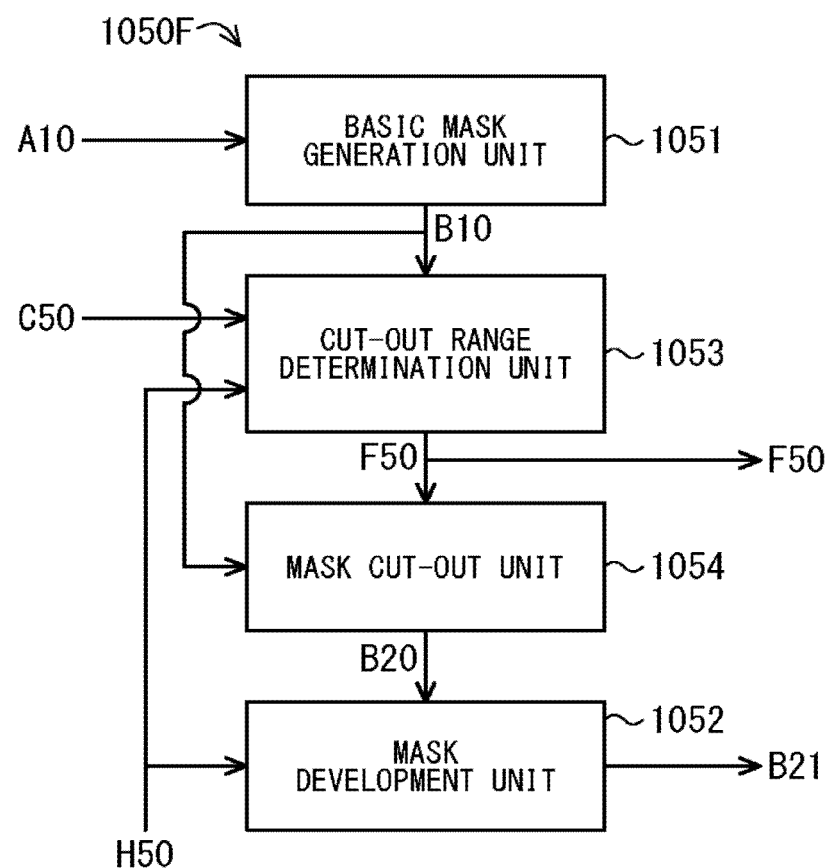
FIG. 53 is a block diagram showing a mask generation unit in accordance with the sixth preferred embodiment.

FIG. 53 shows an exemplary constitution of the mask generation unit 1050F. As shown in FIG. 53, the mask generation unit 1050F includes the basic mask generation unit 1051 and the mask development unit 1052 which are already described and a cut-out range determination unit 1053 and a mask cut-out unit 1054.

The cut-out range determination unit 1053 determines the cut-out range 83. Specifically, the cut-out range determination unit 1053 performs the cut-out range determination process S500 (see FIG. 40) on the basis of the basic mask data B10, the first decomposition level specified by the synthesis control data C50, and the initial decomposition level in the wavelet transformation unit 1030 (given by initial setting data H50). Then, the cut-out range determination unit 1053 generates cut-out range specifying data F50 which are data to be used for specifying the cut-out range 83. More specifically, the cut-out range specifying data F50 are data of the upper-left end coordinates (AX3, AY3) and the lower-right end coordinates (BX3, BY3) of the cut-out range 83.

The mask cut-out unit 1054 cuts out data inside the cut-out range 83 (see FIG. 39) in the basic mask data B10, for the data B21 of the developed mask (in other hand, as the data B20 of the original mask for the developed mask) on the basis of the cut-out range specifying data F50. The cut-out mask is developed by the mask development unit 1052 to the initial decomposition level specified by the initial setting data H50. In other words, the developed mask data B21 are generated from the original mask data B20.

With reference back to FIG. 52, the mask data B21 generated by the mask generation unit 1050F are supplied to the quantization unit 1040, like in the first preferred embodiment. The cut-out range specifying data F50 are supplied to the bit stream generation unit 1070 and embedded together with the synthesis control data C50 into the coded bit stream Abs. Further, the cut-out range specifying data F50 are supplied to the first image cut-out unit 1080.

The first image cut-out unit 1080 cuts out data inside the cut-out range 83 (see FIG. 37) in the first basic image data A10 on the basis of the cut-out range specifying data F50. The cut-out data are supplied to the preprocessing unit 1020 as the first target image data A20.

<Synthesizing System 21F>

Figure 54:
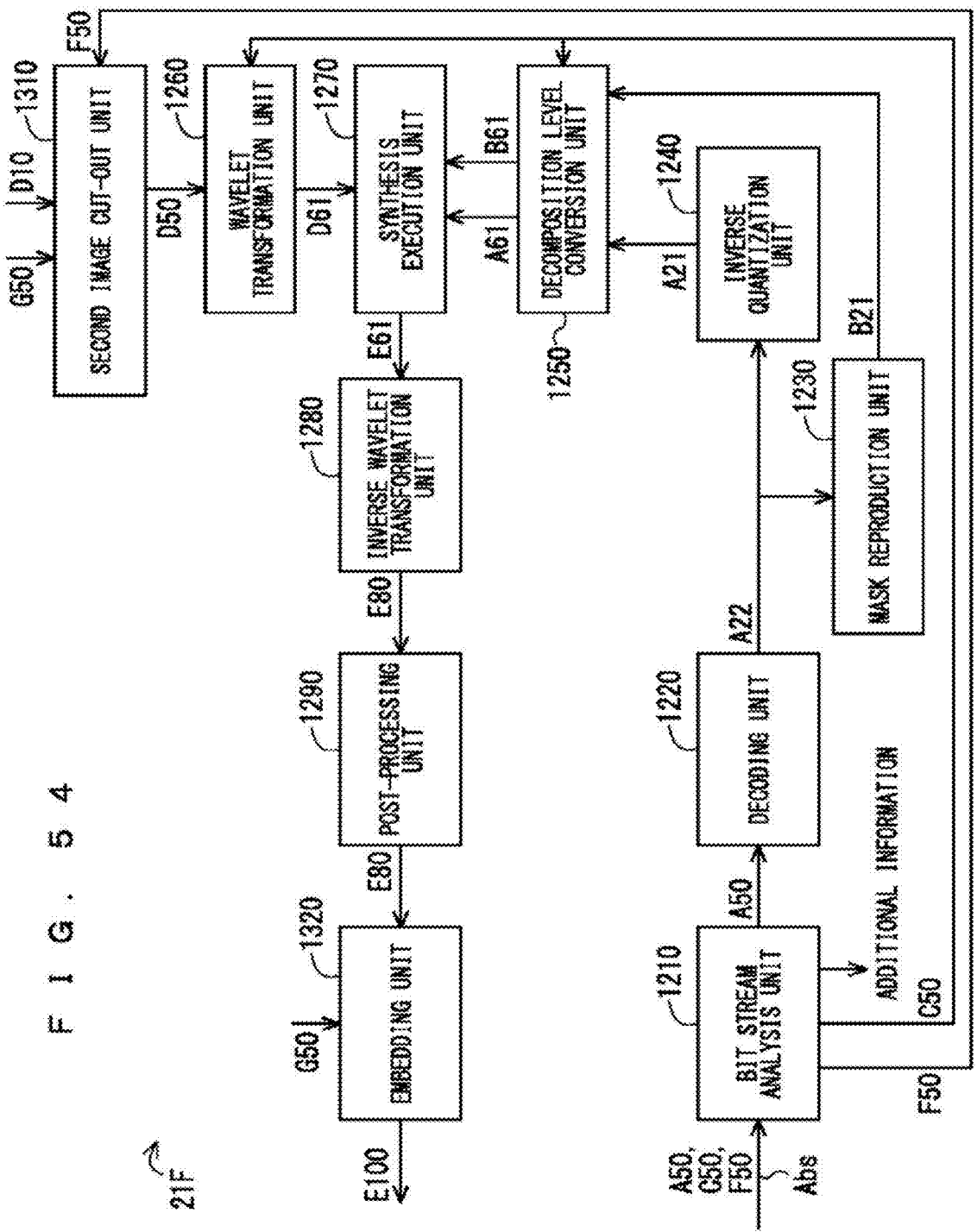
FIG. 54 is a block diagram showing an image synthesizing system in accordance with the sixth preferred embodiment.

FIG. 54 shows an exemplary constitution of a synthesizing system 21F in accordance with the sixth preferred embodiment. Instead of the synthesizing system 21 in accordance with the first preferred embodiment, the synthesizing system 21F can be applied to the image processing system 1, 20, or the like. In the synthesizing system 21F, a second image cut-out unit 1310 and an embedding unit 1320 are added. Other constituent elements in the synthesizing system 21F are identical to those of the synthesizing system 21 in accordance with the first preferred embodiment.

The second image cut-out unit 1310 acquires the second basic image data D10, the cut-out range specifying data F50, and synthesis position specifying data G50. The cut-out range specifying data F50 are extracted from the coded bit stream Abs by the bit stream analysis unit 1210 and supplied to the second image cut-out unit 1310.

The synthesis position specifying data G50 are data to be used to specify a position at which the ROI in the first target image is synthesized in the second basic image. The synthesis position specifying data G50 can be understood, for example, as data for an embedding position for the synthetic image data E80 as described later. More specifically, the embedding position of the synthetic image data E80 can be specified by an upper-left end position of an embedding range of the synthetic image data E80, a center position of the embedding range, or the like. The synthesis position specifying data G50 are supplied to the second image cut-out unit 1310 when a user of the synthesizing system 21F inputs the data to the operation unit 42 (see FIG. 2) provided on the side of the synthesizing system 21F.

The second image cut-out unit 1310 sets a synthesis target range in the second basic image on the basis of the synthesis position specifying data G50. The synthesis target range is a range having the same shape and size as those of the first target image and therefore is congruent with the first target image. Alternatively, it can be also expressed that the synthesis target range is a similar figure range to the first target image with a similarity ratio of 1. It is herein assumed that the synthesis target range is specified by the cut-out range specifying data F50. Instead of the cut-out range specifying data F50, a range having the same shape and size as those of the first target image may be specified from the coded data A50. The second image cut-out unit 1310 cuts out data within the synthesis target range in the second basic image data D10. The cut-out data are supplied to the wavelet transformation unit 1260 as the second target image data D50.

The embedding unit 1320 embeds the synthetic image data E80 which are generated by the inverse wavelet transformation unit 1280 and then processed by the post-processing unit 1290 into the synthesis target range in the second basic image data D10. The second basic image data D10 with the synthetic image data E80 embedded therein are outputted as the synthetic image data E100 which are output data from the synthesizing system 21F.

<Operation>

Figure 55:
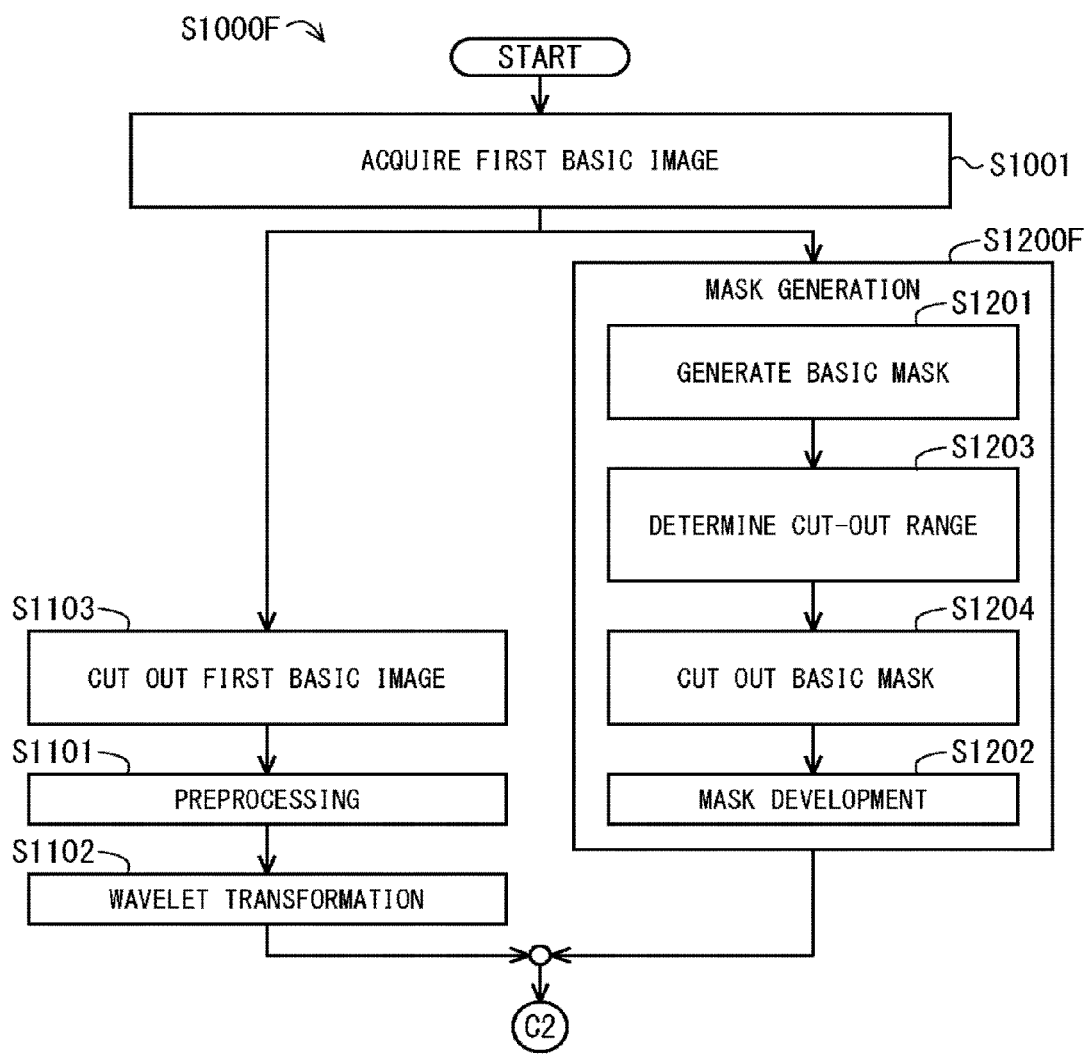

FIGS. 55 and 56 are flowcharts showing an operation of the supply system 11F. The flows of FIGS. 55 and 56 are connected to each other with a connector C2. An operation flow S1000F shown in FIGS. 55 and 56 is basically the same as the operation flow S1000 (see FIG. 16) in accordance with the first preferred embodiment but has the following different points. In the operation flow S1000F, mask generation step S1200F is provided instead of the mask generation step S1200. Further, first basic image cut-out step S1103 is added. Furthermore, data embedding step S1005F is provided instead of the data embedding step S1005.

According to the mask generation step S1200F, in the basic mask generation step S1201, the basic mask generation unit 1051 generates the basic mask data B10. Next, in cut-out range determination step S1203, the cut-out range determination unit 1053 determines the cut-out range 83. Then, in mask cut-out step S1204, the mask cut-out unit 1054 generates the original mask data B20 for the developed mask from the basic mask data B10. Next, in the mask development step S1202, the mask development unit 1052 performs the mask development process on the original mask data B20, to thereby generate the developed mask data B21.

In the first basic image cut-out step S1103, the first image cut-out unit 1080 cuts out the first target image data A20 from the first basic image data A10 on the basis of the cut-out range specifying data F50 generated in Step S1203. For this reason, Step S1103 is performed after Step S1203. After Step S1103, the preprocessing step S1101 is performed.

In the data embedding step S1005F, the bit stream generation unit 1070 embeds the synthesis control data C50 and the cut-out range specifying data F50 into the coded bit stream Abs.

Figure 58:
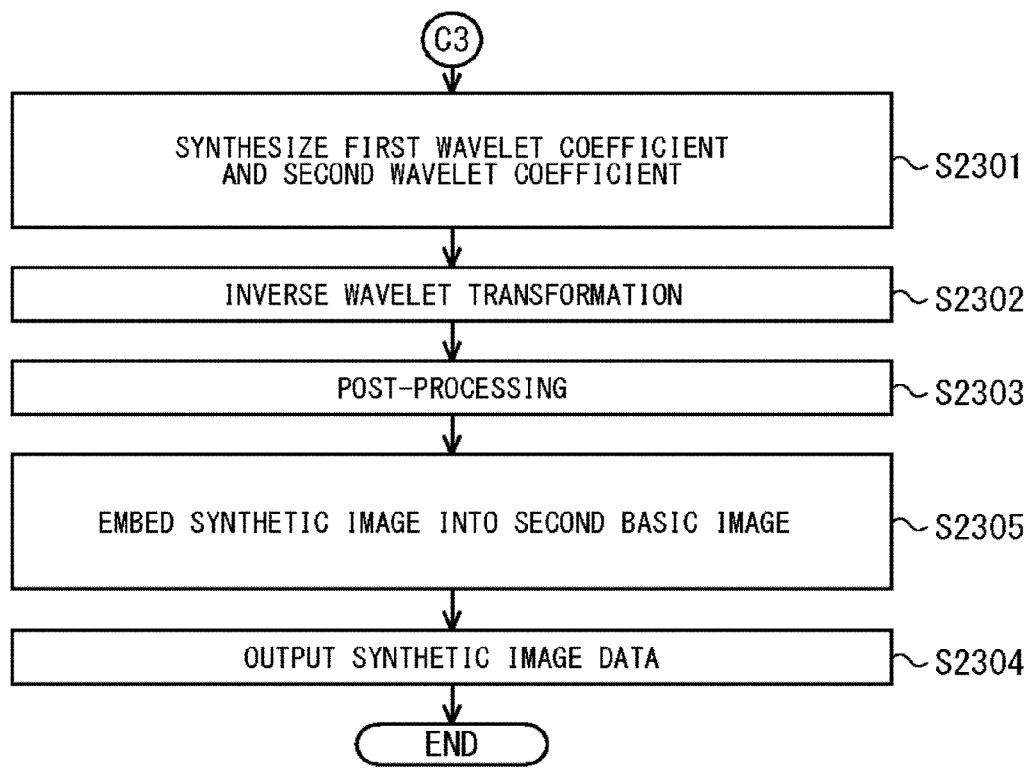

FIGS. 57 and 58 are flowcharts showing an operation of the synthesizing system 21F. The flows of FIGS. 57 and 58 are connected to each other with a connector C3. An operation flow S2000F shown in FIGS. 57 and 58 is basically the same as the operation flow S2000 (see FIGS. 25 and 26) in accordance with the first preferred embodiment but has the following different points. In the operation flow S2000F, data extraction step S2102F is provided instead of the data extraction step S2102 (see FIG. 25). Further, second basic image cut-out step S2203 and image embedding step S2305 are added.

In the data extraction step S2102F, the bit stream analysis unit 1210 extracts the coded data A50, the synthesis control data C50, and the cut-out range specifying data F50 from the coded bit stream Abs.

In the second basic image cut-out step S2203, the second image cut-out unit 1310 cuts out the second target image data D50 from the second basic image data D10 on the basis of the cut-out range specifying data F50 extracted in Step S2102F. For this reason, Step S2203 is performed after Step S2102F. After Step S2203, the wavelet transformation step S2202 is performed.

The image embedding step S2305 is performed after the post-processing step S2303. In Step S2305, the embedding unit 1320 embeds the synthetic image data E80 after being subjected to the post-processing into the synthesis target range in the second basic image data D10. After Step S2305, the output step S2304 is performed.

<Effects>

In the sixth preferred embodiment, it is possible to produce the same effects as those of the first preferred embodiment.

In the sixth preferred embodiment, particularly, the supply system 11F cuts out the first target image from the first basic image and outputs the cut-out image. For this reason, it is possible to reduce the size of the coded data A50 and therefore possible to reduce the size of the coded bit stream Abs. Therefore, when the coded bit stream Abs is transferred via wired or wireless communication, the amount of communication can be reduced and this contributes to the immediacy of transfer. Further, since the respective sizes of the first target image and the second target image are reduced, it is possible to reduce the computational load in the synthesizing system 21F. This contributes to speed-up of the image synthesis. In consideration of these points, it is possible to increase the immediacy of the image synthesis.

Further, the sixth preferred embodiment can be combined with the second preferred embodiment and the like, and it is thereby possible to produce the same effect as that of the second preferred embodiment and the like.

<Consideration on Tracking Process>

Herein, in consideration that the wavelet transformation adopts the method of recursively decomposing the lowest-frequency band component included in the wavelet plane of each decomposition level, it is assumed in the above description that the highest-order band component to be processed in the tracking process is the lowest-frequency band component LL3 in the wavelet plane of the highest decomposition level. On the other hand, when the wavelet transformation adopts the method of recursively decomposing the highest-frequency band component in the wavelet plane, for example, the highest-frequency band component in the wavelet plane of the highest decomposition level is a target to be processed in the tracking process.

Further, in the above description, only the lowest-frequency band component LL3 among the four highest-order band components LL3, HL3, LH3, and HH3 is a target to be processed in the tracking process. In other words, only the output from the low-pass filter is a target to be processed in the tracking process. The reason why no high-pass filter is needed in the tracking process will be described below.

<As to Step S514 in FIG. 46 (5×3 Filter)>

In Step S512 of FIG. 46, when it is determined that the parameter q, i.e., the left-end coordinate AX1 of the minimum range 81 or the upper-end coordinate AY1 thereof is an odd number, assuming with reference to FIG. 14 that the output on the left side (which corresponds to the upper side) of the low-frequency component is p, $$q=2n+1 \quad (\text{Eq. 1})$$

$$p=n \quad (\text{Eq. 2})$$

By solving the above equations, p=(q−1)/2 . . . (Eq. 3). This is the above equation which is set in Step S514.

Herein, with reference to FIG. 14, the high-frequency component (i.e., the high-pass filter side) is also considered. Assuming that the output on the left side (which corresponds to the upper side) of the high-frequency component is p, $$q=2n+1 \quad (\text{Eq. 4})$$

$$p=n-1 \quad (\text{Eq. 5})$$

By solving the above equations, p=(q−3)/2 . . . (Eq. 6).
<As to Step S513 in FIG. 46 (5×3 Filter)>

In Step S512 of FIG. 46, when it is determined that the parameter q, i.e., the left-end coordinate AX1 of the minimum range 81 or the upper-end coordinate AY1 thereof is an even number, assuming with reference to FIG. 14 that the output on the left side (which corresponds to the upper side) of the low-frequency component is p, $$q=2n \quad (\text{Eq. 7})$$

$$p=n \quad (\text{Eq. 8})$$

By solving the above equations, p=q/2 . . . (Eq. 9). This is the above equation which is set in Step S513.

Herein, with reference to FIG. 14, the high-frequency component (i.e., the high-pass filter side) is also considered. Assuming that the output on the left side (which corresponds to the upper side) of the high-frequency component is p, $$q=2n \quad (\text{Eq. 10})$$

$$p=n-1 \quad (\text{Eq. 11})$$

By solving the above equations, p=q/2−1 . . . (Eq. 12).

Herein, considering the Mallat type in a case where the high-frequency component is not recursively inputted, the output on the high-frequency side does not become the input. Therefore, as to the high-frequency component, only the final decomposition level has to be considered. When the low-frequency component is recursively inputted, only the input side has to be considered.

<As to Step S553 in FIG. 50 (5×3 Filter)>

It is assumed that the low-frequency component is inputted to the low-pass filter having five taps shown in FIG. 41. Further, in FIG. 41, it is assumed that n=p. In Step S551 of FIG. 50, when the left-end coordinate AX2 of the tracked minimum range 82 or the upper-end coordinate AY2 thereof is inputted (see Step S552), $$r=p \quad (\text{Eq. 13})$$

$$s=2p-2 \quad (\text{Eq. 14})$$

By solving the above equations, s=2r−2 . . . (Eq. 15). This is the above equation which is set in Step S553.

It is assumed that the high-frequency component is inputted to the high-pass filter having three taps shown in FIG. 42. Further, in FIG. 42, it is assumed that n=p. In Step S551 of FIG. 50, when the left-end coordinate AX2 of the tracked minimum range 82 or the upper-end coordinate AY2 thereof is inputted (see Step S552), $$r=p \quad (\text{Eq. 16})$$

$$s=2p \quad (\text{Eq. 17})$$

By solving the above equations, s=2r . . . (Eq. 18).

Herein, as described above, in Step S512 of FIG. 46, when it is determined that the parameter q, i.e., the left-end coordinate AX1 of the minimum range 81 or the upper-end coordinate AY1 thereof is an odd number, as to the low-frequency component, from Eqs. 13 and 3, obtained is r=(q−1)/2 . . . (Eq. 19). Further, from Eqs. 19 and 15, obtained is s=q−3 . . . (Eq. 20). On the other hand, as to the high-frequency component, from Eqs. 16 and 6, obtained is r=(q−3)/2 . . . (Eq. 21). Further, from Eqs. 21 and 18, obtained is s=q−3 . . . (Eq. 22). As can be seen from Eqs. 20 and 22, as to both the low-frequency component and the high-frequency component, the same result is obtained.

Furthermore, as described above, in Step S512 of FIG. 46, when it is determined that the parameter q, i.e., the left-end coordinate AX1 of the minimum range 81 or the upper-end coordinate AY1 thereof is an even number, as to the low-frequency component, from Eqs. 13 and 9, obtained is r=q/2 . . . (Eq. 23). Further, from Eqs. 23 and 15, obtained is s=q−2 . . . (Eq. 24). On the other hand, as to the high-frequency component, from Eqs. 16 and 12, obtained is r=q/2−1 . . . (Eq. 25). Further, from Eqs. 25 and 18, obtained is s=q−2 . . . (Eq. 26). As can be seen from Eqs. 24 and 26, as to both the low-frequency component and the high-frequency component, the same result is obtained.

Thus, considering the Mallat type in a case where the high-frequency component is not recursively inputted, even when any one of the low-frequency component and the high-frequency component is tracked, the same result is obtained. For this reason, in the operation flows S510, S520, and S550 of FIGS. 46, 47, and 50, respectively, in the case of using the 5×3 filter for the wavelet transformation, attention is paid only to the low-frequency component.

<As to Step S534 in FIG. 48 (9×7 Filter)>

In Step S532 of FIG. 48, when it is determined that the parameter q, i.e., the left-end coordinate AX1 of the minimum range 81 or the upper-end coordinate AY1 thereof is an odd number, assuming with reference to FIG. 15 that the output on the left side (which corresponds to the upper side) of the low-frequency component is p, $$q=2n+1 \quad (\text{Eq. 27})$$

$$p=n-1 \quad (\text{Eq. 28})$$

By solving the above equations, p=(q−3)/2 . . . (Eq. 29). This is the above equation which is set in Step S534.

Herein, with reference to FIG. 15, the high-frequency component (i.e., the high-pass filter side) is also considered. Assuming that the output on the left side (which corresponds to the upper side) of the high-frequency component is p, $$q=2n+1 \quad (\text{Eq. 30})$$

$$p=n-2 \quad (\text{Eq. 31})$$

By solving the above equations, p=(q−5)/2 . . . (Eq. 32).
<As to Step S533 in FIG. 48 (9×7 Filter)>

In Step S532 of FIG. 48, when it is determined that the parameter q, i.e., the left-end coordinate AX1 of the minimum range 81 or the upper-end coordinate AY1 thereof is an even number, assuming with reference to FIG. 15 that the output on the left side (which corresponds to the upper side) of the low-frequency component is p, $$q=2n \quad \text{(Eq. 33)}$$

$$p=n-1 \quad \text{(Eq. 34)}$$

By solving the above equations, $p=q/2-1$ ... (Eq. 35). This is the above equation which is set in Step S533.

Herein, with reference to FIG. 15, the high-frequency component (i.e., the high-pass filter side) is also considered. Assuming that the output on the left side (which corresponds to the upper side) of the high-frequency component is p, $$q=2n \quad \text{(Eq. 36)}$$

$$p=n-2 \quad \text{(Eq. 37)}$$

By solving the above equations, $p=q/2-2$ ... (Eq. 38).

Herein, considering the Mallat type in a case where the high-frequency component is not recursively inputted, the output on the high-frequency side does not become the input. Therefore, as to the high-frequency component, only the final decomposition level has to be considered. When the low-frequency component is recursively inputted, only the input side has to be considered.

<As to Step S563 in FIG. 51 (9×7 Filter)>

It is assumed that the low-frequency component is inputted to the low-pass filter having nine taps shown in FIG. 43. Further, in FIG. 43, it is assumed that n=p. In Step S561 of FIG. 51, when the left-end coordinate AX2 of the tracked minimum range 82 or the upper-end coordinate AY2 thereof is inputted (see Step S562), $$r=p \quad \text{(Eq. 39)}$$

$$s=2p-4 \quad \text{(Eq. 40)}$$

By solving the above equations, $s=2r-4$ ... (Eq. 41). This is the above equation which is set in Step S563.

It is assumed that the high-frequency component is inputted to the high-pass filter having seven taps shown in FIG. 44. Further, in FIG. 44, it is assumed that n=p. In Step S561 of FIG. 51, when the left-end coordinate AX2 of the tracked minimum range 82 or the upper-end coordinate AY2 thereof is inputted (see Step S562), $$r=p \quad \text{(Eq. 42)}$$

$$s=2p-2 \quad \text{(Eq. 43)}$$

By solving the above equations, $s=2r-2$ ... (Eq. 44).

Herein, as described above, in Step S532 of FIG. 48, when it is determined that the parameter q, i.e., the left-end coordinate AX1 of the minimum range 81 or the upper-end coordinate AY1 thereof is an odd number, as to the low-frequency component, from Eqs. 39 and 29, obtained is $r=(q-3)/2$ ... (Eq. 45). Further, from Eqs. 45 and 41, obtained is $s=q-7$ ... (Eq. 46). On the other hand, as to the high-frequency component, from Eqs. 42 and 32 obtained is $r=(q-5)/2$ ... (Eq. 47). Further, from Eqs. 47 and 44, obtained is $s=q-7$ ... (Eq. 48). As can be seen from Eqs. 46 and 48, as to both the low-frequency component and the high-frequency component, the same result is obtained.

Furthermore, as described above, in Step S532 of FIG. 48, when it is determined that the parameter q, i.e., the left-end coordinate AX1 of the minimum range 81 or the upper-end coordinate AY1 thereof is an even number, as to the low-frequency component, from Eqs. 39 and 35 obtained is $r=q/2$ ... (Eq. 49). Further, from Eqs. 49 and 41, obtained is $s=q-6$ ... (Eq. 50). On the other hand, as to the high-frequency component, from Eqs. 42 and 38, obtained is $r=q/2-2$ ... (Eq. 51). Further, from Eqs. 51 and 44, obtained is $s=q-6$ ... (Eq. 52). As can be seen from Eqs. 50 and 52, as to both the low-frequency component and the high-frequency component, the same result is obtained.

Thus, considering the Mallat type in a case where the high-frequency component is not recursively inputted, even when any one of the low-frequency component and the high-frequency component is tracked, the same result is obtained. For this reason, in the operation flows S530, S540, and S560 of FIGS. 48, 49, and 51, respectively, in the case of using the 9×7 filter for the wavelet transformation, attention is paid only to the low-frequency component.

<Variation of The Sixth Preferred Embodiment>

In the sixth preferred embodiment, it is assumed that the second basic image is larger than the first target image and than the second target image. The second basic image itself, however, may have the same size as that of the first target image and that of the second target image. In this case, the second image cut-out unit 1310 may be omitted. By providing the second image cut-out unit 1310, however, it is possible to respond to various sizes of the second basic image and increase the convenience.

The Seventh Preferred Embodiment

As described above, the lowest-frequency band component LL1 at the decomposition level 1 can provide an image obtained by reducing the original image with a reduction ratio of 1/2 (in other words, an image having a size that is 1/4 the original image). In the method of recursively decomposing the lowest-frequency band component LL, the band component LL2 at the decomposition level 2 can provide an image obtained by reducing the image provided by the band component LL1 before the decomposition, with a reduction ratio of 1/2, and therefore can provide an image obtained by reducing the original image with a reduction ratio of 1/4 ($=2^2$).

Figure 59:
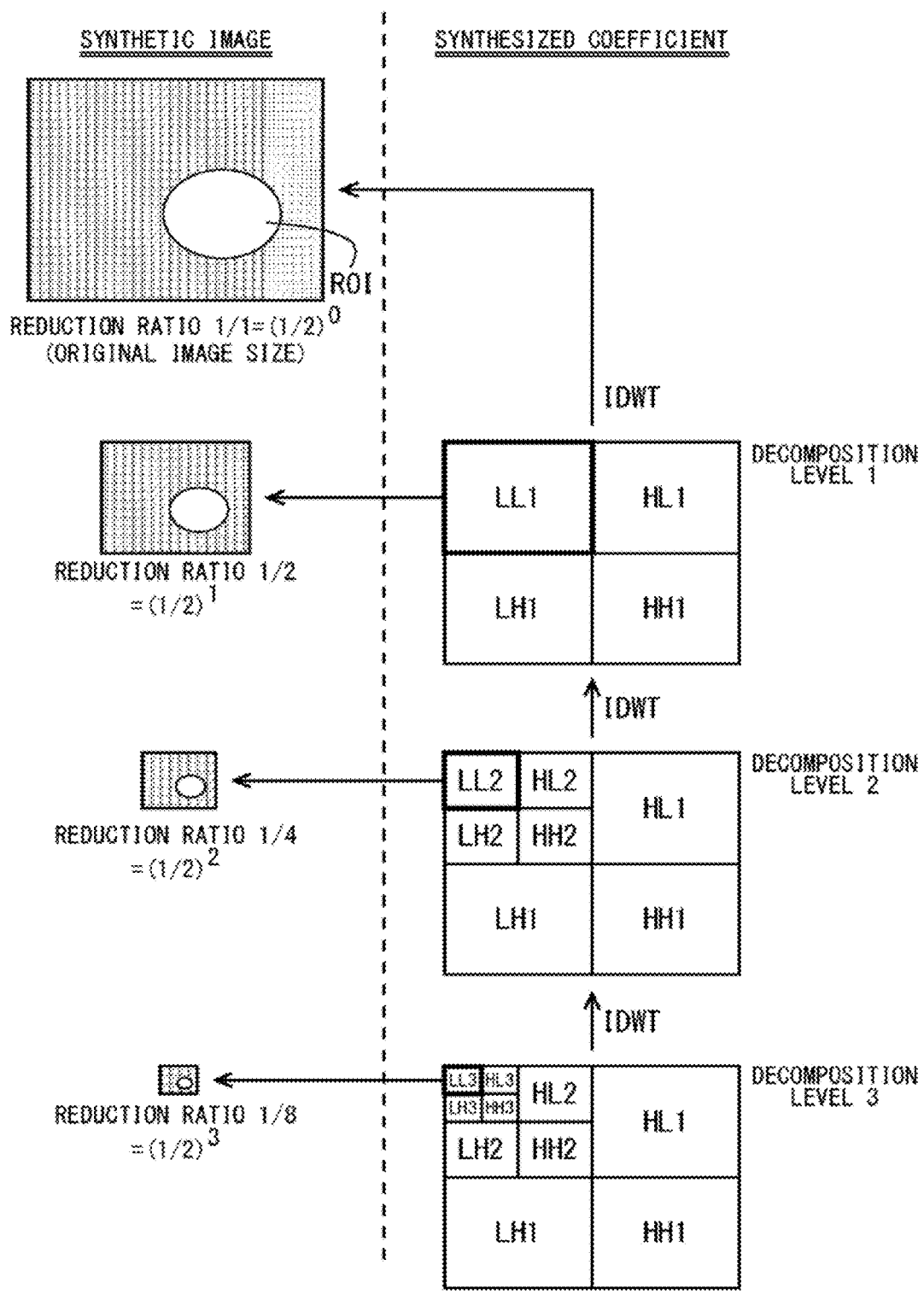
FIG. 59 is a conceptual diagram showing image synthesis in accordance with a seventh preferred embodiment.

In generalized notation, the lowest-frequency band component LLm at the decomposition level m can provide an image obtained by reducing the original image with a reduction ratio of $1/2^m$ (see FIG. 59). Further, when the original image without being subjected to the wavelet transformation is made correspond to the decomposition level 0, as described above, m is an integer not smaller than 0.

Conversely, the image size in a case where the original image is reduced with the reduction ratio of $1/2^m$ is equal to the image size provided by the lowest-frequency band component LLm in a case where the original image is decomposed to the decomposition level m. For this reason, it can be expressed that the size of an image obtained by reduction with the ratio of $1/2^m$ is an image size which corresponds to the decomposition level m. Further, the expression on the image size can be used in a case where the reduced image is compared with any other image having the same image size as that of the original image.

In consideration of the above point, as shown in the conceptual diagram of FIG. 59, it is possible to control the image size of a synthetic image by the number of executions of the inverse wavelet transformation. FIG. 60 is a block diagram showing an inverse wavelet transformation unit 1280G in accordance with the seventh preferred embodiment. Instead of the inverse wavelet transformation unit 1280 in the synthesizing system 21 or the like (see FIG. 17 or the like), the inverse wavelet transformation unit 1280G can be applied to the first to fifth preferred embodiments.

The inverse wavelet transformation unit 1280G performs, in the inverse wavelet transformation process step (see Step S2302 of FIG. 26), the inverse wavelet transformation on the synthesized coefficient data E61 until the decomposition level becomes a predetermined end level, and sets the lowest-frequency band component LL in the data after being subjected to the inverse wavelet transformation to the synthetic image data E80. The end level of the inverse wavelet transformation, in other words, the image size of the synthetic image is instructed by image size control data C60 to the inverse wavelet transformation unit 1280G. Herein, it is assumed that the image size control data C60 are inputted to the synthesizing system by a user of the synthesizing system. The image size control data C60, however, may be supplied from the supply system, like the synthesis control data C50 (see FIGS. 3 and 29).

The image size control data C60 give, for example, a numerical value which directly indicates the end level of the inverse wavelet transformation. Alternatively, the image size control data C60 may be data from which the end level of the inverse wavelet transformation can be derived. As exemplary data from which the end level of the inverse wavelet transformation can be derived, used is a numerical value indicating the number of executions of the inverse wavelet transformation, a numerical value indicating the reduction ratio to the original image size, or the like.

The end level of the inverse wavelet transformation may be set in a range not smaller than the decomposition level 0 and not larger than the decomposition level of the synthesized coefficient data E61 (i.e., the decomposition level specified by the synthesis control data C50). When the end level of the inverse wavelet transformation is set to the decomposition level 0, a synthetic image having the original image size can be obtained, like in the first to fifth preferred embodiments. In other words, the first to fifth preferred embodiments are each an exemplary case where the end level of the inverse wavelet transformation is fixed to 0, and the present seventh preferred embodiment is an exemplary case where the end level of the inverse wavelet transformation is variable. On the other hand, when the end level of the inverse wavelet transformation is set to the same level as the decomposition level of the synthesized coefficient data E61, the inverse wavelet transformation is not performed and the lowest-frequency band component LL in the synthesized coefficient data E61 is extracted as the synthetic image data E80.

In the seventh preferred embodiment, it is possible to control the image size of a synthetic image and obtain a synthetic image having not only the same size as that of the original image but also a size smaller than that of the original image.

The Eighth Preferred Embodiment

The eighth preferred embodiment shows an exemplary case where the image size of the synthetic image is controlled by a method different from that in the seventh preferred embodiment. FIG. 61 is a conceptual diagram showing image synthesis in accordance with the eighth preferred embodiment. In FIG. 61, the first basic image itself is used as the first target image, and first wavelet coefficient data are generated from the first target image. Herein, an exemplary case will be shown where the decomposition level of the first wavelet coefficient data is 3.

On the other hand, the whole of the second basic image is reduced and the reduced image is used as the second target image. In the exemplary case of FIG. 61, the second basic image has the same size and shape as those of the first basic image (in other words, the second basic image is congruent with the first basic image), and the whole of the second basic mage is reduced with a reduction ratio of 1/2. Specifically, the reduction ratio of the second target image to the second basic image and the first basic image is 1/2. In other words, the image size of the second target image is 1/4 with respect to the second basic image or the first basic image.

Then, second wavelet coefficient data are generated from the second target image. Herein, the decomposition level of the second wavelet coefficient data is 2 which is one-level lower than the decomposition level (=3) of the first wavelet coefficient data.

Next, the first wavelet coefficient data and the second wavelet coefficient data are synthesized with each other, like in the first preferred embodiment. Since the image size of the first target image and that of the second target image are different from each other, however, the synthesis is performed in conformity with the range of the second target image having a smaller image size, in other words, the range of the second wavelet coefficient data. Specifically, part of the first wavelet coefficient data (part corresponding to the second wavelet coefficient data) and the whole of the second wavelet coefficient data are used for the coefficient synthesis process. In the exemplary case of FIG. 61, as the above part of the first wavelet coefficient data, used are the band components LL3, HL3, LH3, and HH3 which are decomposed most (i.e., the highest-order band components) and the band components HL2, LH2, and HH2 which are one-level lower than the highest-order band components out of the first wavelet coefficient data.

By performing such synthesis, generated are synthesized coefficient data having the same decomposition level (herein, decomposition level 2) as that of the second wavelet coefficient data. Then, the inverse wavelet transformation is performed on the synthesized coefficient data until the decomposition level becomes 0, to thereby generate synthetic image data. This synthetic image data provides a synthetic image having the same size and shape as those of the second target image, in other words, a synthetic image reduced with the reduction ratio of 1/2 to the second basic image or the first basic image.

Figure 62:
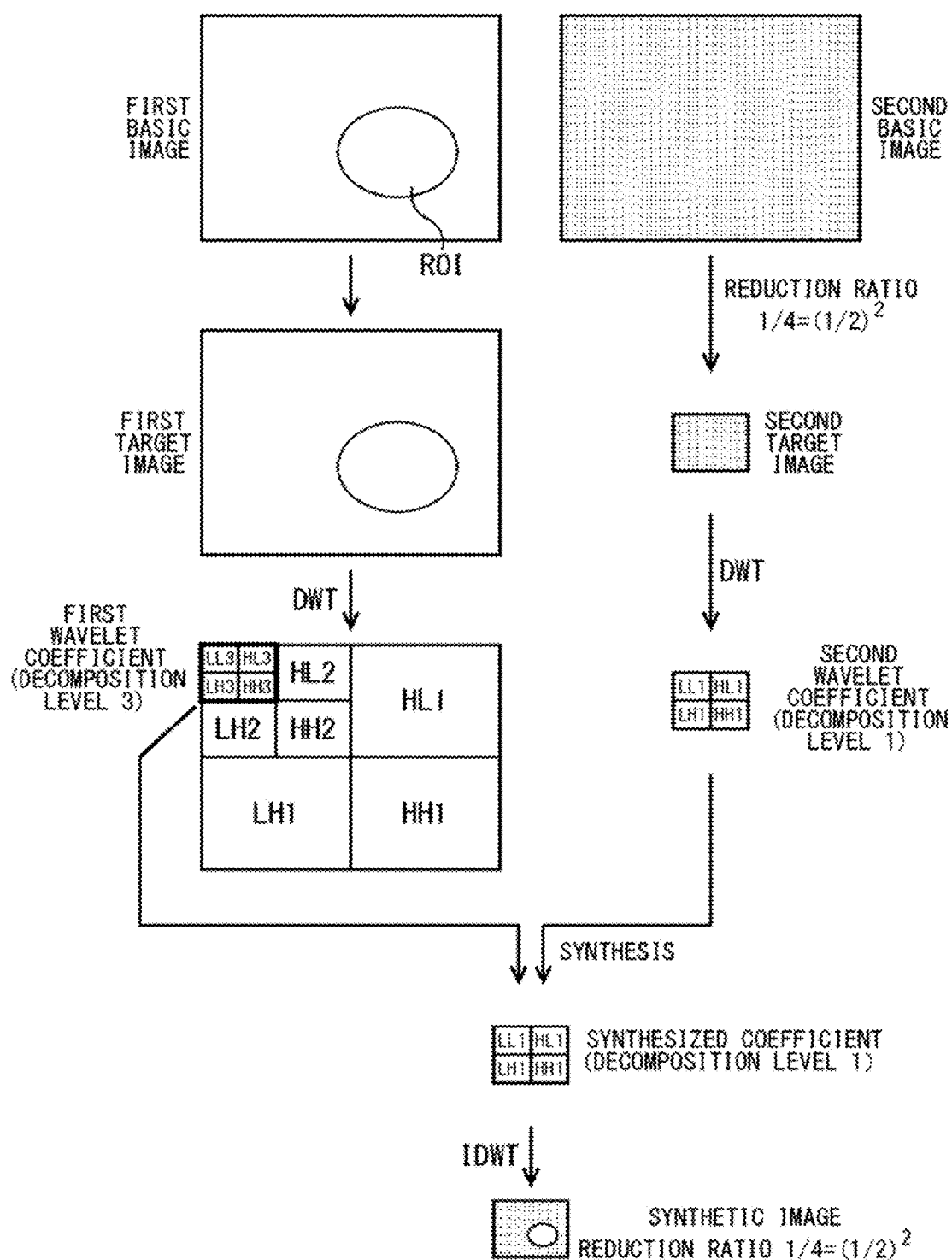

FIG. 62 shows an exemplary case where the reduction ratio of the second target image to the second basic image is 1/4 ($1/2^2$). Also in FIG. 62, the first basic image itself is used as the first target image, and first wavelet coefficient data of decomposition level 3 are generated from the first target image. On the other hand, second wavelet coefficient data of decomposition level 1 are generated from the second target image. In this case, the decomposition level (=1) of the second wavelet coefficient data is two-level lower than the decomposition level (=3) of the first wavelet coefficient data.

Next, the first wavelet coefficient data (the highest-order band components LL3, LL3, LH3, and HH3 out of the first wavelet coefficient data in the exemplary case of FIG. 62) and the second wavelet coefficient data are synthesized with each other.

By performing such synthesis, generated are synthesized coefficient data having the same decomposition level (herein, decomposition level 1) as that of the second wavelet coefficient data. Then, the inverse wavelet transformation is performed on the synthesized coefficient data until the decomposition level becomes 0, to thereby generate synthetic image data. This synthetic image data provides a synthetic image having the same image size as that of the second target image, in other words, a synthetic image reduced with the reduction ratio of 1/4 (=$1/2^2$) to the second basic image or the first basic image.

Figure 63:
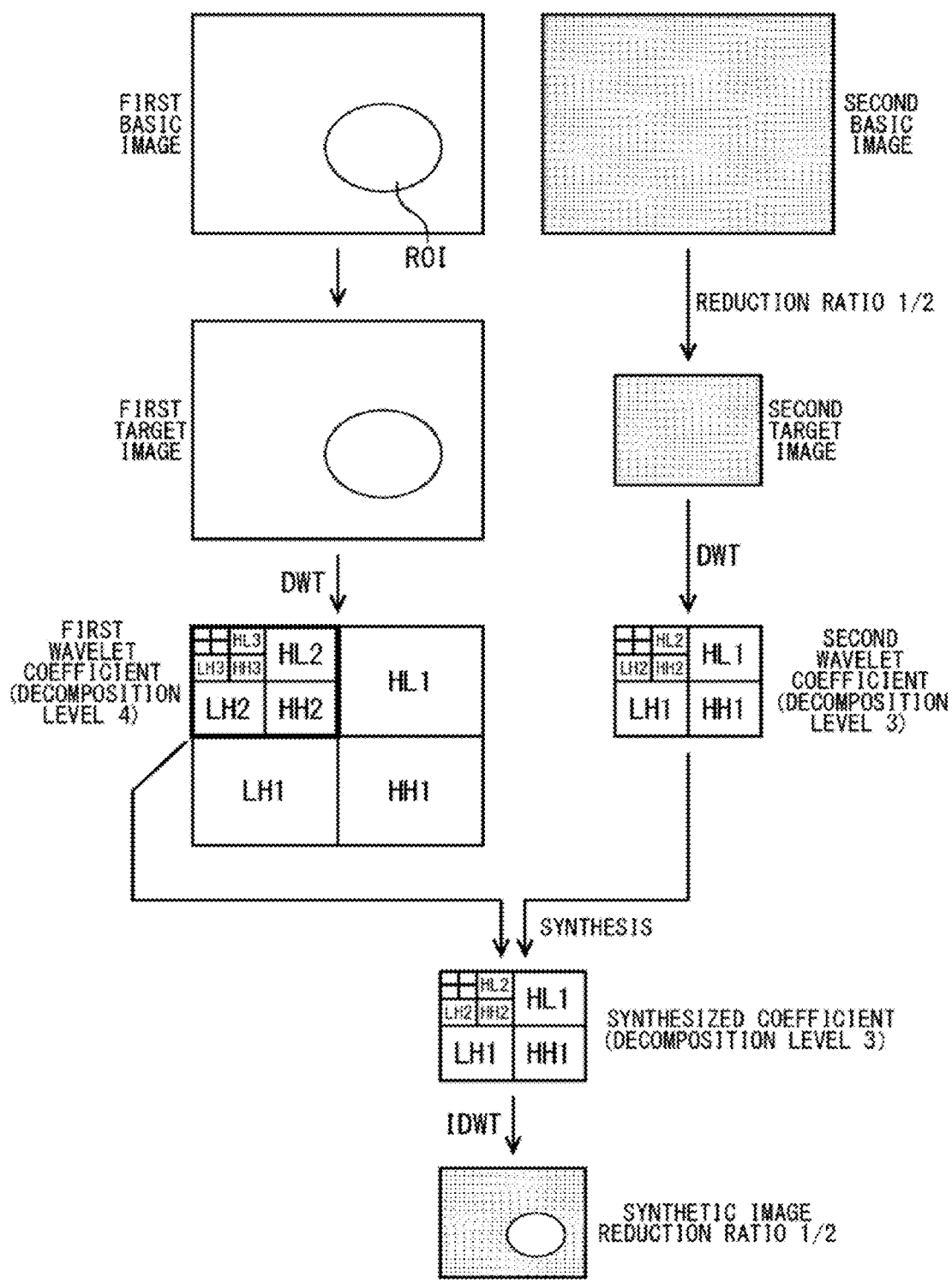

FIG. 63 shows an exemplary case where the decomposition level of the first wavelet coefficient data is 4 and the reduction ratio of the second target image to the second basic image is 1/2. In this case, the decomposition level of the second wavelet coefficient data is 3 and one-level lower than the decomposition level (=4) of the first wavelet coefficient data. In the exemplary case of FIG. 63, data in a range from the highest-order band components LL4, HL4, LH4, and HH4 to the band components HL2, LH2, and HH2 which are two-level lower than the highest-order band components out of the first wavelet coefficient data are used for the synthesis. Then, a synthetic image is provided to have the same image size as that of the second target image, in other words, to be reduced with the reduction ratio of 1/2 to the second basic image or the first basic image.

As can be seen from FIGS. 61 to 63, by controlling the image size of the second target age, it is possible to control the image size of the synthetic image. The following findings can be obtained from the exemplary cases of FIGS. 61 to 63.

The second target image is a similar figure to the first target image and the similarity ratio of the second target image to the first target image is smaller than 1. Further, the similarity ratio smaller than 1 may be termed as a reduction ratio. The decomposition level of the second wavelet coefficient data depends on the decomposition level of the first wavelet coefficient data and the above similarity ratio. Specifically, in a case where the decomposition level of the first wavelet coefficient data (a first decomposition level) is assumed to be P1, the decomposition level of the second wavelet coefficient data (a second decomposition level) is assumed to be P2, and the similarity ratio of the second target image to the first target image is $1/2^{P3}$, it holds that P2=P1−P3. Herein, P1, P2, and P3 are natural numbers.

Further, as described above, the coefficient synthesis process is performed in conformity with the range of the second wavelet coefficient data. For this reason, as to the first wavelet coefficient data, used are band component data in a range from the highest-order band components to band components which are lower than the highest-order band components by the number of predetermined levels, and the number of predetermined levels is given by a numerical value indicating the decomposition level of the second wavelet coefficient data.

Since the coefficient synthesis process is performed in conformity with the range of the second wavelet coefficient data, the decomposition level of the synthesized coefficient data is the same as that of the second wavelet coefficient data. By performing the inverse wavelet transformation on the synthesized coefficient data until the decomposition level becomes 0, the synthetic image having the same image size as that of the second target image can be obtained.

Figure 64:
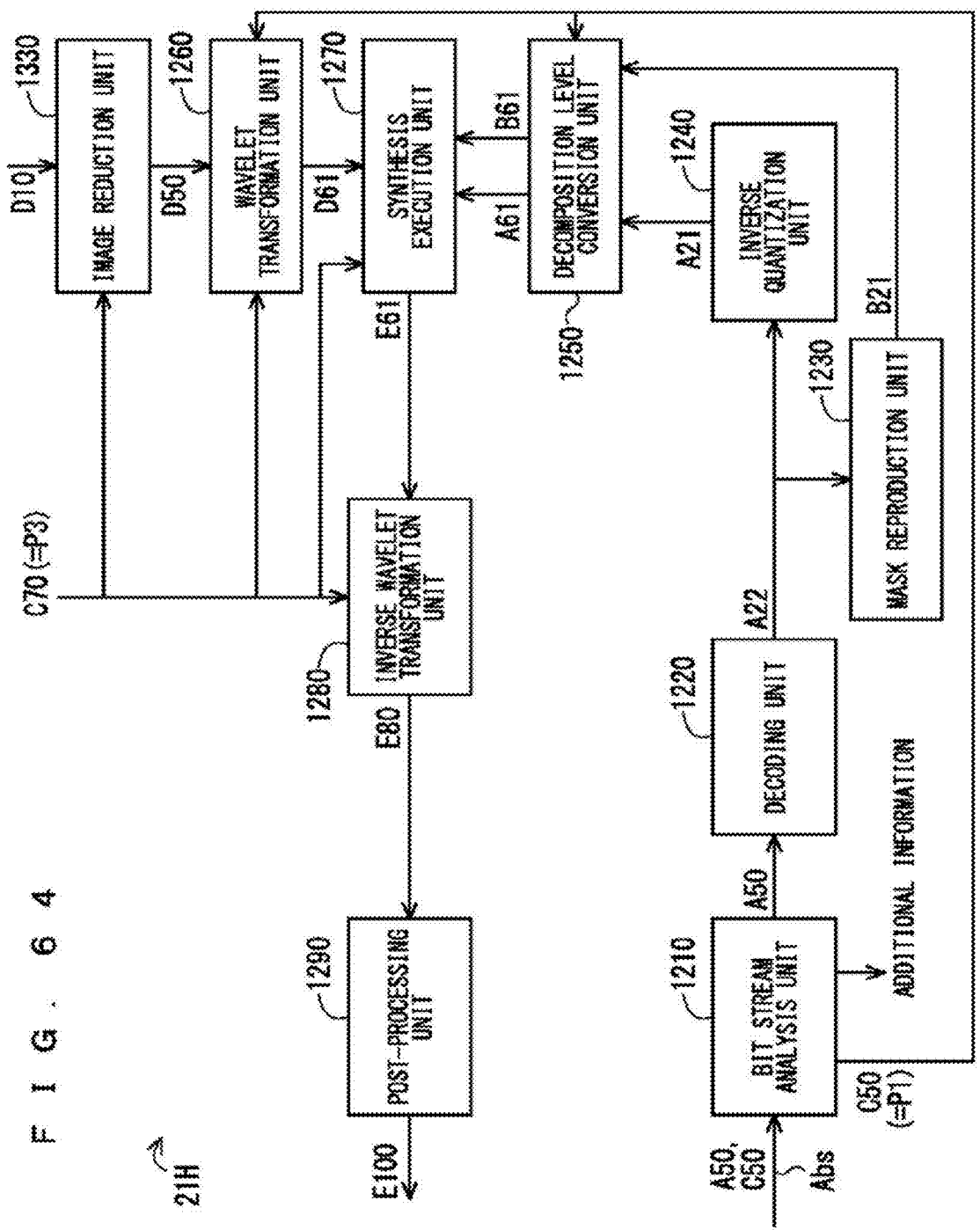
FIG. 64 is a block diagram showing an image synthesizing system in accordance with the eighth preferred embodiment.

FIG. 64 shows an exemplary constitution of a synthesizing system 21H as an exemplary case where the above findings are applied to the first preferred embodiment. The synthesizing system 21H has a constitution in which an image reduction unit 1330 is added to the synthesizing system 21 of the first preferred embodiment (see FIG. 17). The image reduction unit 1330 acquires the second basic image data D10 and reduces the second basic image, to thereby generate the second target image which is a similar figure to the first target image. The generated second target image data D50 are supplied to the wavelet transformation unit 1260.

When the second basic image is reduced to $1/2^{P3}$, for example, the image reduction unit 1330 performs the wavelet transformation on the second basic image data D10 by the method of recursively decomposing the lowest-frequency band component LL until the decomposition level becomes P3. Then, the image reduction unit 1330 extracts the lowest-frequency band component LL at the decomposition level P3 as the second target image data D50.

Alternatively, the image reduction unit 1330 may be configured to generate the second target image by a general image reduction process using an average filter. In such a case, the reduction with the reduction ratio of 1/2 may be performed P3 times, or the reduction with the reduction ratio of $1/2^{P3}$ may be performed at one time.

The image size of the second target image, in other words, the image size of the synthetic image is instructed by image size control data C70 to the image reduction unit 1330. Herein, it is assumed that the image size control data C70 are inputted to the synthesizing system 21H by a user of the synthesizing system 21H. The image size control data C70, however, may be supplied from the supply system, like the synthesis control data C50 (see FIGS. 3 and 29).

It is assumed herein, for easy explanation, that the image size control data C70 give a value of P3 in a case where the similarity ratio of the second target image to the first target image is expressed as $1/2^{P3}$ as described above. Alternatively, the image size control data C70 may be data from which the value of P3 can be derived. As exemplary data from which the value of P3 can be derived, used is a value of the above similarity ratio ($1/2^{P3}$) or the like.

The image size control data C70 are also supplied to the wavelet transformation unit 1260. The wavelet transformation unit 1260 can acquire the first decomposition level which is specified for the first wavelet coefficient data A61, i.e., a value of the above P1, from the already-described synthesis control data C50. The wavelet transformation unit 1260 thereby calculates the decomposition level P2 (=P1−P3) of the second wavelet coefficient data D61 on the basis of P1 and P3 which are obtained from the synthesis control data C50 and the image size control data C70. Then, the wavelet transformation unit 1260 performs the wavelet transformation on the second target image data D50 until the decomposition level becomes a decomposition level (the second decomposition level) indicated by the obtained P2.

The image size control data C70 are also supplied to the synthesis execution unit 1270 in the exemplary constitution of FIG. 64 and used to specify the range in the first wavelet coefficient data A61 to be used for the coefficient synthesis process. The range in the first wavelet coefficient data A61 depends on a numerical value indicating the decomposition level P2 of the second wavelet coefficient data as described above. In exemplary constitution of FIG. 64, it is assumed that the synthesis execution unit 1270 calculates the value of P2. The synthesis execution unit 1270, however, may acquire the calculated value of P2 from the wavelet transformation unit 1260. In such a case, the supply of the image size control data C70 to the synthesis execution unit 1270 may be omitted.

The image size control data C70 are also supplied to the inverse wavelet transformation unit 1280 and used to set the number of executions of the inverse wavelet transformation, in other words, to find the decomposition level of the synthesized coefficient data E61.

Figure 65:
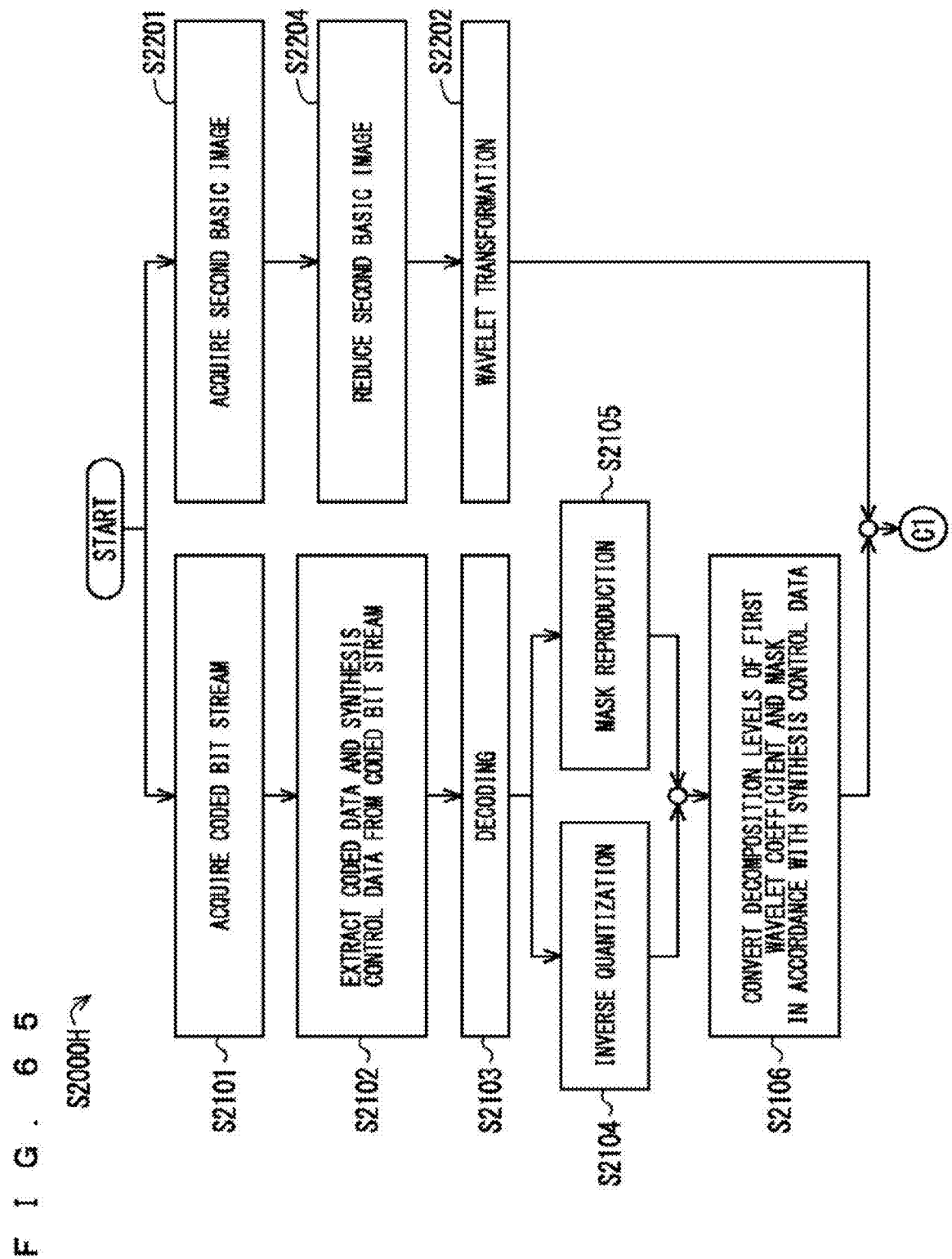
FIG. 65 is a flowchart showing an operation of the image synthesizing system in accordance with the eighth preferred embodiment.

FIG. 65 is a flowchart showing an operation of the synthesizing system 21H. In an operation flow S2000H of FIG. 65, Step S2204 is added to the operation flow S2000 (see FIG. 25) of the first preferred embodiment. In Step S2204, the image reduction unit 1330 reduces the second basic image, to thereby generate the second target image.

In the eighth preferred embodiment, it is possible to control the image size of a synthetic image and obtain a synthetic image having a size smaller than that of the original image. Further, the eighth preferred embodiment can be combined with the second preferred embodiment and the like, and it is thereby possible to produce the same effect as that of the second preferred embodiment and the like.

In the above description, it is assumed that the whole of the second basic image is reduced, to thereby generate the second target image. Only if the second target image is a similar figure to the first target image, however, the second target image can be generated by reducing part of the second basic image. Similarly, the second basic image before the reduction may not be a similar figure to the first target image. When the second basic image is not a similar figure to the first target image and the whole of the second basic image is reduced, respective reduction ratios in horizontal and vertical directions of the second basic image have only to be different from each other.

Further, in the above description, it is assumed that the similarity ratio of the second target image to the first target image is smaller than 1. In other words, it is assumed that when the similarity ratio is expressed as $1/2^{P3}$, P3 is a natural number. Even when the similarity ratio is 1 (P3 is 0 in this case), in other words, when the second target image is congruent with the first target image, the synthesizing system 21H can be used.

When the second basic image is congruent with the first basic image and the first target image and the value of P3, which is given by the image size control data C70, is 0, for example, the image reduction unit 1330 may supply the second basic image to the wavelet transformation unit 1260 without reducing the image. In this case, like in the first to fifth preferred embodiments, a synthetic image having the original image size can be obtained. In other words, the first to fifth preferred embodiments each show an example specialized in the case where the similarity ratio of the second target image to the first target image is 1. On the other hand, the eighth preferred embodiment can be applied to the case where the similarity ratio is not larger than 1.

The Ninth Preferred Embodiment

Figure 66:
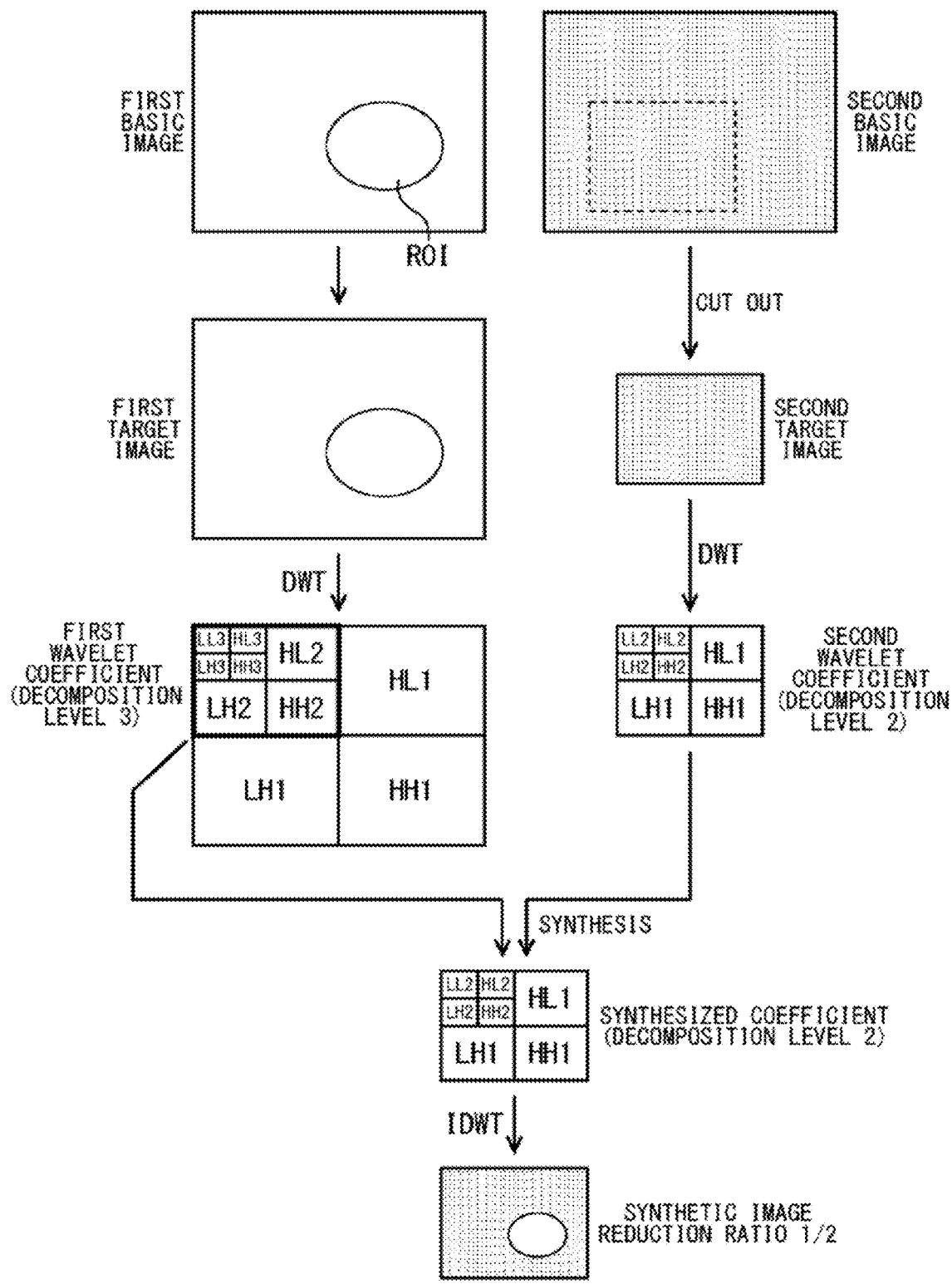
FIG. 66 is a conceptual diagram showing image synthesis in accordance with a ninth preferred embodiment.

In the eighth preferred embodiment, by reducing at least part of the second basic image, the second target image which is a similar figure to the first target image is generated (see FIGS. 61 to 63). On the other hand, in the ninth preferred embodiment, as shown in FIG. 66, a case will be described, where part of the second basic image is cut out as the second target image which is a similar figure to the first target image. In other words, only if the second target image is a similar figure to the first target image, it is possible to generate the second target image by the cut-out.

Figure 67:
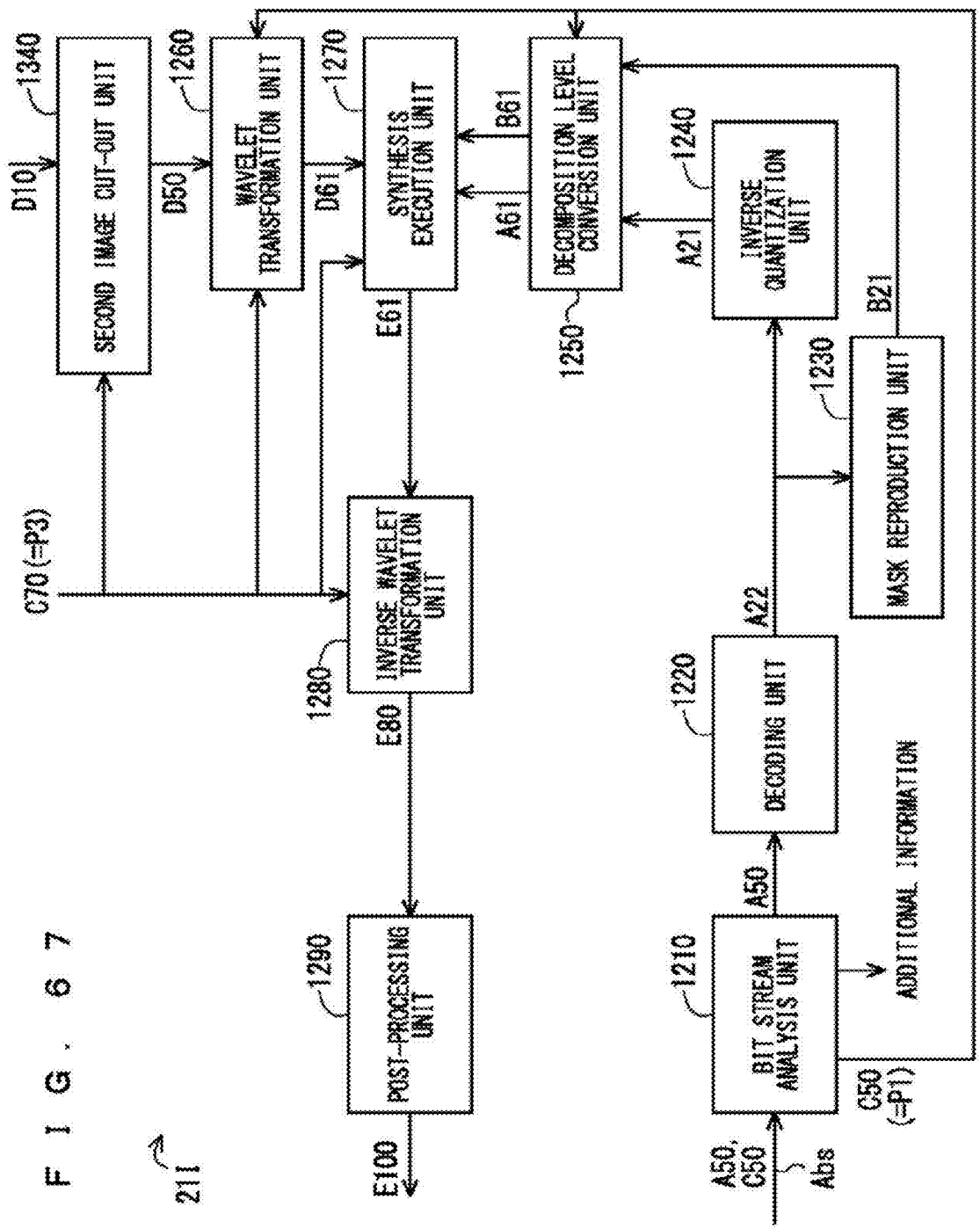
FIG. 67 is a block diagram showing an image synthesizing system in accordance with the ninth preferred embodiment.

FIG. 67 shows an exemplary constitution of a synthesizing system 21I in accordance with the ninth preferred embodiment. The synthesizing system 21I has a constitution in which a second image cut-out unit 1340 is provided instead of the image reduction unit 1330 in the synthesizing system 21H (see FIG. 64) of the eighth preferred embodiment. Other constituent elements in the synthesizing system 21I are identical to those of the synthesizing system 21H in accordance with the eighth preferred embodiment.

The second image cut-out unit 1340 acquires the second basic image data D10, sets a similar figure range in the second basic image, which is a similar figure to the first target image, with the above similarity ratio (i.e., the similarity ratio of the second target image to the first target image), and cuts out data within the similar figure range in the second basic image data D10, as the second target image data D50. The generated second target image data D50 are supplied to the wavelet transformation unit 1260.

The image size of the second target image, in other words, the image size of the synthetic image is instructed by the image size control data C70 to the second image cut-out unit 1340. Further, in the ninth preferred embodiment, it is assumed that the image size control data C70 also include data indicating the position of the above similar figure range to be cut out as the second target image.

Figure 68:
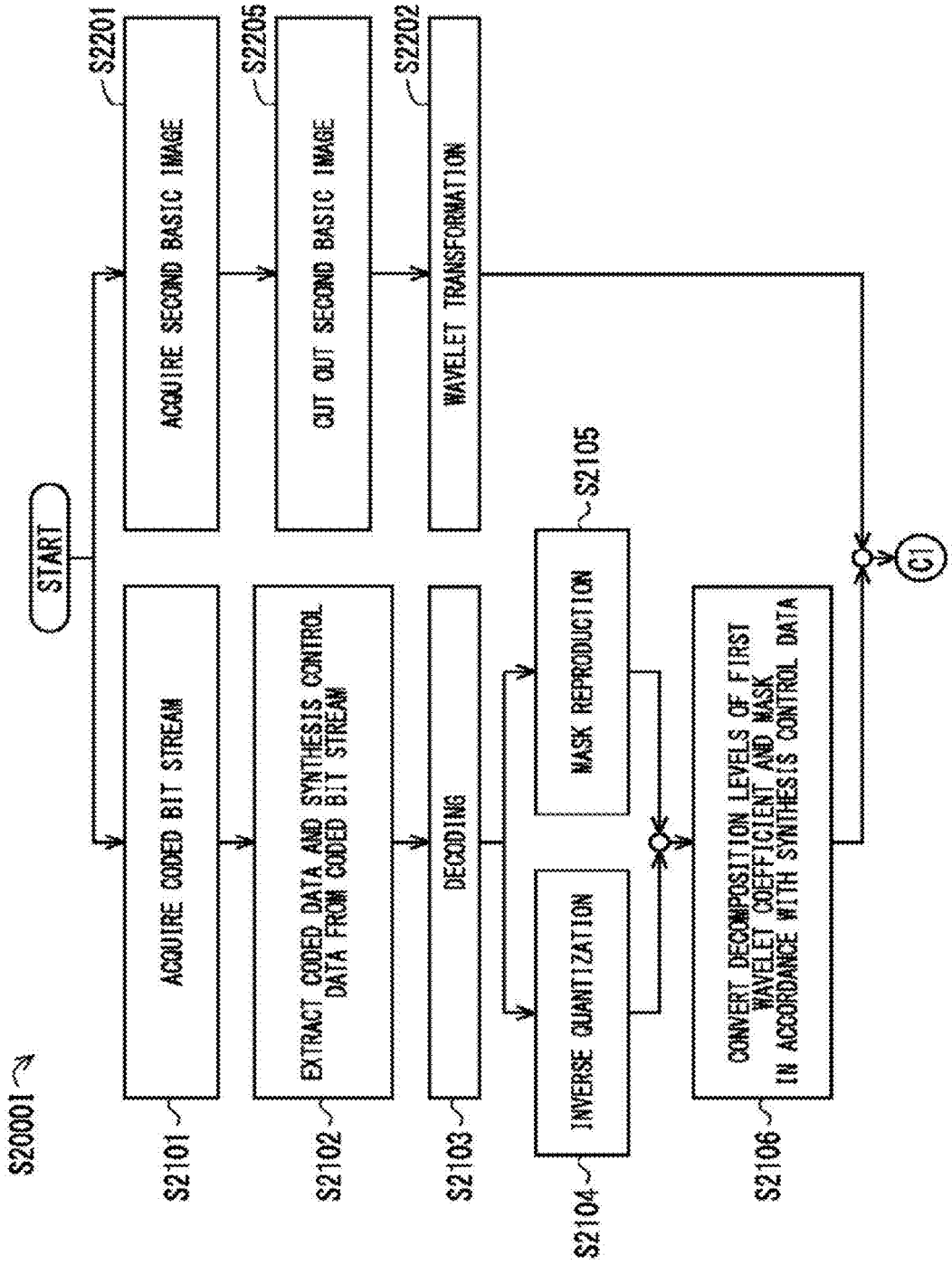
FIG. 68 is a flowchart showing an operation of the image synthesizing system in accordance with the ninth preferred embodiment.

FIG. 68 is a flowchart showing an operation of the synthesizing system 21I. In an operation flow S2000I of FIG. 68, as can be seen from the comparison with the operation flow S2000H (see FIG. 65) of the eighth preferred embodiment, an image cut-out step S2205 is provided instead of the image reduction step S2204. In Step S2205, the second image cut-out unit 1340 cuts out the second target image data D50 from the second basic image data D10 as described above. Other steps in the operation flow S2000I are the same as those of the operation flow S2000H shown in FIG. 65.

In the ninth preferred embodiment, it is possible to control the image size of a synthetic image and obtain a synthetic image having a size smaller than that of the original image. Further, the ninth preferred embodiment can be combined with the second preferred embodiment and the like, and it is thereby possible to produce the same effect as that of the second preferred embodiment and the like.

Further, like in the eighth preferred embodiment, the synthesizing system 21I can be used not only when the similarity ratio is smaller than 1 but also when the similarity ratio is not larger than 1. When the second basic image is congruent with the first basic image and the first target image and the value of P3 given by the image size control data C70 is 0, for example, the second image cut-out unit 1340 may supply the second basic image to the wavelet transformation unit 1260 without performing the cut-out. In this case, like in the first to fifth preferred embodiments, a synthetic image having the original image size can be obtained.

The Tenth Preferred Embodiment

Figure 69:
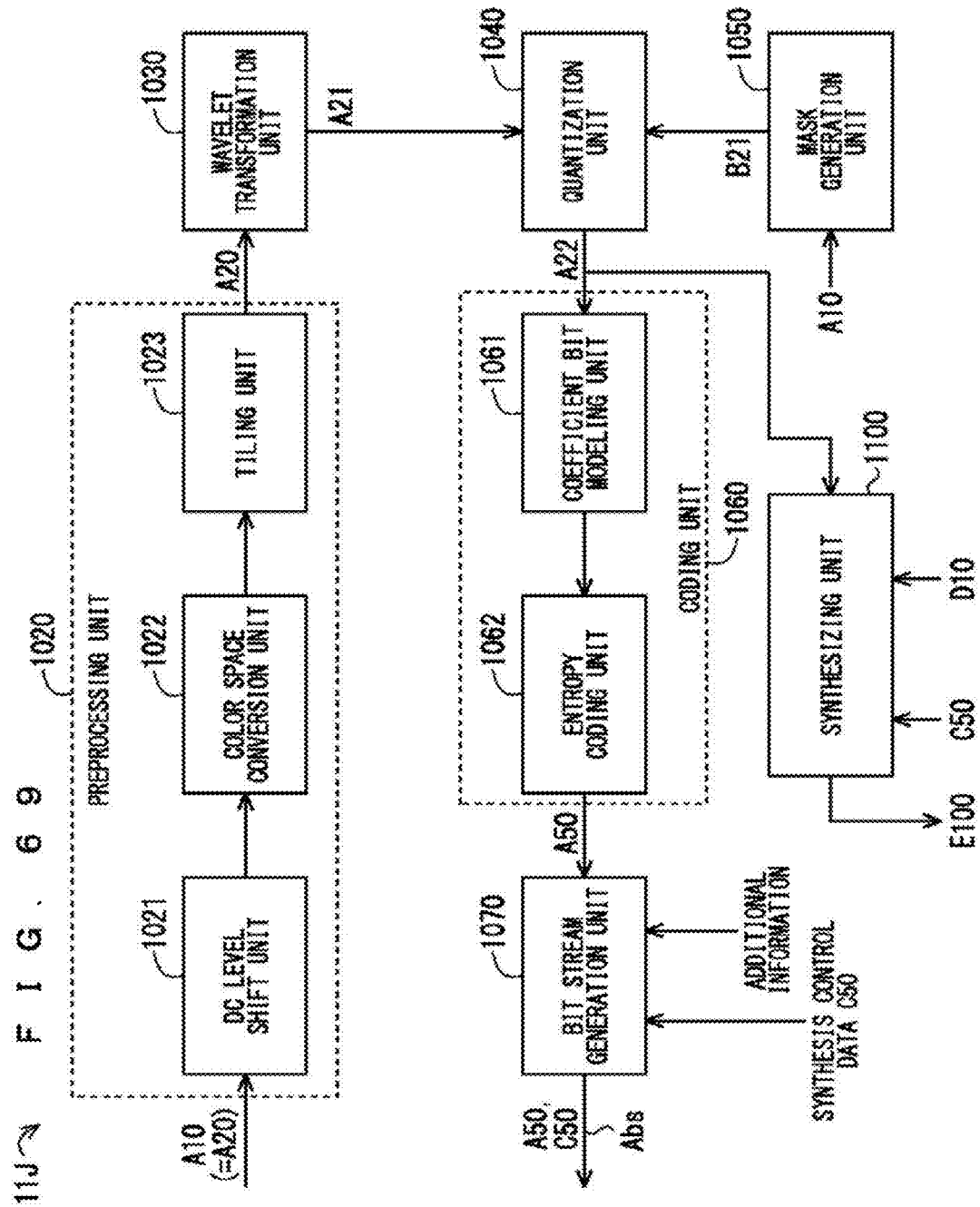
FIG. 69 is a block diagram showing a supply system in accordance with a tenth preferred embodiment.

FIG. 69 shows an exemplary constitution of a supply system 11J in accordance with the tenth preferred embodiment. Instead of the supply system 11 in accordance with the first preferred embodiment, the supply system 11J can be applied to the image processing system 1, 10, or the like. In the supply system 11J, a synthesizing unit 1100 is added in the supply system 11 of the first preferred embodiment.

The synthesizing unit 1100 has a constitution in which the bit stream analysis unit 1210 and the decoding unit 1220 are omitted from the synthesizing system 21 (see FIG. 17), and operates in the same manner as the synthesizing system 21, to thereby generate the synthetic image data E100. Specifically, the synthesizing unit 1100 performs the mask reproduction process and the inverse quantization process on the basis of the quantized wavelet coefficient data A22 generated by the quantization unit 1040 and further performs the decomposition level conversion process on the basis of the result of the mask reproduction process and the inverse quantization process. Further, the synthesizing unit 1100 performs the wavelet transformation process on the second target image data. Furthermore, the second basic image data D10 serving as a source of the second target image data can be acquired from, for example, the synthesizing system 21. Then, on the basis of the result of the decomposition level conversion process and the wavelet transformation process, the synthesizing unit 1100 performs the synthesis execution process and the inverse wavelet transformation process. The post-processing is performed on the data after being subjected to the inverse wavelet transformation process, as necessary. The synthetic image data E100 are thereby generated.

By causing the display 31 (see FIG. 2) on the side of the supply system 11J to perform a display operation on the basis of the synthetic image data E100 generated by the synthesizing unit 1100, the synthetic image between the ROI in the first target image and the second target image can be displayed. For this reason, for example, before supplying the coded bit stream Abs (in other words, before supplying the coded data A50) to the synthesizing system 21, the synthetic image can be checked on the side of the supply system 11J. Particularly, it is possible to check the state of synthesis in accordance with the synthesis control data C50.

Herein, by adding the synthesizing unit 1100, the supply-side apparatus 30 (see FIG. 2) can be applied by itself as an image processing apparatus having an image synthesizing function. A hardware configuration of such an image processing apparatus 30J is shown in FIG. 70.

In FIG. 70, the image processing apparatus 30J includes an image processing system 90, the display 31, and the operation unit 32. Following the supply-side apparatus 30, the image processing apparatus 30J may include one or both of the I/F 33 and the image input unit 34. The image processing system 90 includes an image synthesizing system 91, and the image synthesizing system 91 includes the synthesizing unit 1100, a data preparation unit 1110, and a semiconductor memory (referred to also as a memory) 1120. The synthesizing unit 1100, the data preparation unit 1110, and the memory 1120 are connected to one another via a bus (an exemplary wired communication medium). The image processing system 90 may be formed as a single semiconductor integrated circuit, in other words, a single chip. The image processing system 90 may be constituted only of the image synthesizing system 91 or may further include any other processing system.

The data preparation unit 1110 has a constitution in which the coding unit 1060 and the bit stream generation unit 1070 are omitted from the supply system 11 (see FIG. 3), and acquires the first basic image data A10. With this constitution, the data preparation unit 1110 operates in the same manner as the supply system 11, to thereby generate the quantized wavelet coefficient data A22 for the first target image.

The memory 1120 stores therein the first basic image data A10 and the second basic image data D10 which are supplied to the image synthesizing system 91. The data preparation unit 1110 thereby reads the first basic image data A10 out from the memory 1120 and generates the quantized wavelet coefficient data A22 on the basis of the first basic image data A10. Further, the synthesizing unit 1100 reads the second basic image data D10 out from the memory 1120 and uses the data for the image synthesis.

The synthesis control data C50 are supplied to the synthesizing unit 1100 by user input to the operation unit 32. Further, display 31 displays the synthetic image on the basis of the synthetic image data E100 generated by the synthesizing unit 1100.

Furthermore, the constitution of the synthesizing system of the second preferred embodiment or the like can be applied to the synthesizing unit 1100.

Herein, the system constituted of the memory 1120 and the data preparation unit 1110 can be regarded as a data supply system for supplying the quantized wavelet coefficient data A22. In this case, when the synthesizing unit 1100 is further regarded as an image synthesizing system, the configuration of FIG. 70 can be regarded that the data supply system and the image synthesizing system are connected to each other via a bus (an exemplary wired communication medium as described above).

Further, in consideration of the exemplary constitution of FIG. 70, for example, the combination of the data supply system 11 and the synthesizing system 21 can be formed of a single semiconductor integrated circuit. In such a case, the data supply system 11 and the synthesizing system 21 are connected to each other via a bus. In the single semiconductor integrated circuit, though the data supply system 11 and the synthesizing system 21 perform communication not via the external I/F 33 or 43 unlike in FIG. 2, but via the above bus which corresponds to the medium 50. Further, when data are transferred in the single semiconductor integrated circuit (particularly, when data are transferred in a series of processings for the image synthesis function), it is possible to omit coding and decoding of the transferred data. Specifically, it is possible to eliminate the necessity of using the coding unit 1060, the bit stream generation unit 1070, the bit stream analysis unit 1210, and the decoding unit 1220. Alternatively, it is possible to omit the coding unit 1060, the bit stream generation unit 1070, the bit stream analysis unit 1210, and the decoding unit 1220. Similarly, any other combination of the data supply system 11B or the like and the synthesizing system 21B or the like can be formed of a single semiconductor integrated circuit.

<Notes>

While the invention has been shown and described in detail, the foregoing description is in all aspects illustrative and not restrictive. It is therefore understood that not-illustrated numerous modifications and variations can be devised without departing from the scope of the invention.

What is claimed is:

1. An image processing system comprising:
   image synthesizing circuitry configured to synthesize an ROI (Region Of Interest) in a first target image and a second target image,
   wherein said second target image is a similar figure to said first target image and the similarity ratio of said second target image to said first target image is not larger than 1,
   said image synthesizing circuitry is further configured to acquire
      a coded bit stream for first target image data which are data of said first target image,
      second basic image data which are data of a second basic image that is a source of said second target image, and
      synthesis control data to be used to control the state of synthesis,
   a process of generating said coded bit stream includes:
      a wavelet transformation process for generating first wavelet coefficient data by performing wavelet transformation on said first target image data until a decomposition level becomes a predetermined initial decomposition level;
      a mask generation process for generating mask data which are data of a mask to be used to determine an ROI coefficient related to said ROI and a non-ROI coefficient related to a non-ROI in said first wavelet coefficient data;
      a quantization process for determining said ROI coefficient and said non-ROI coefficient in said first wavelet coefficient data on the basis of said mask data and performing quantization on said first wavelet coefficient data so that said non-ROI coefficient may become 0, to thereby generate quantized wavelet coefficient data;

a coding process for generating coded data by coding said quantized wavelet coefficient data; and a bit stream generation process for generating said coded bit stream from said coded data, and said image synthesizing circuitry is further configured to extract said coded data from said coded bit stream;

generate said quantized wavelet coefficient data by decoding said coded data;

reproduce said mask data of said initial decomposition level on the basis of a result of determining said ROI coefficient and said non-ROI coefficient in said quantized wavelet coefficient data by determining whether or not respective values of pieces of data constituting said quantized wavelet coefficient data are each 0;

generate said first wavelet coefficient data of said initial decomposition level by performing inverse quantization on said quantized wavelet coefficient data;

perform a decomposition level conversion process for converting said first wavelet coefficient data and said mask data from said initial decomposition level to a first decomposition level which is specified by said synthesis control data; and generate second wavelet coefficient data by performing said wavelet transformation on second target image data which are data of said second target image until the decomposition level becomes a second decomposition level which depends on said first decomposition level and said similarity ratio, and wherein when it is assumed that said first decomposition level of said first wavelet coefficient data is P1, said second decomposition level of said second wavelet coefficient data is P2, and said similarity ratio is $1/2^{P3}$, P2=P1−P3, and said image synthesizing circuitry is further configured to generate synthesized coefficient data having the same image size and decomposition level as those of said second wavelet coefficient data by performing a coefficient synthesis process for determining said ROI coefficient and said non-ROI coefficient in said first wavelet coefficient data of said first decomposition level on the basis of said mask data of said first decomposition level and synthesizing said ROI coefficient in said first wavelet coefficient data of said first decomposition level and a coefficient in said second wavelet coefficient data; and generate synthetic image data by performing inverse wavelet transformation on said synthesized coefficient data until the decomposition level becomes a predetermined end level.

2. The image processing system according to claim 1, wherein said image synthesizing circuitry is configured to convert said mask data from said initial decomposition level to a decomposition level of 0, and from the decomposition level of 0 to said first decomposition level.

3. The image processing system according to claim 1, wherein said image synthesizing circuitry is configured to acquire said synthesis control data through the same medium as that used to supply said coded bit stream.

4. The image processing system according to claim 3, wherein said synthesis control data are supplied to said image synthesizing circuitry, being embedded in a region in said coded bit stream, which has no effect on said coded data, and said image synthesizing circuitry is configured to extract said coded data and said synthesis control data from said coded bit stream.

5. The image processing system according to claim 1, wherein said image synthesizing circuitry is configured to acquire said synthesis control data through a medium different from that used to supply said coded bit stream.

6. The image processing system according to claim 5, wherein said image synthesizing circuitry is configured to acquire said coded bit stream through a wireless or wired communication medium or an external memory medium; and acquire said synthesis control data from a user through an operating medium provided on the side of said image synthesizing circuitry.

7. The image processing system according to claim 1, wherein said image synthesizing circuitry is configured to selectively use one of a plurality of pieces of synthesis control data.

8. The image processing system according to claim 7, wherein said plurality of pieces of synthesis control data include first synthesis control data supplied by user input to an operating medium provided on the side of said image synthesizing circuitry; and second synthesis control data supplied through a medium different said operating medium, and said image synthesizing circuitry is configured to preferentially select said first synthesis control data.

9. The image processing system according to claim 1, wherein said image synthesizing circuitry is configured to set a similar figure range in said second basic image, which is a similar figure to said first target image with said similarity ratio; and cut out data within said similar figure range in said second basic image data as said second target image data.

10. The image processing system according to claim 9, wherein said image synthesizing circuitry is configured to embed said synthetic image data obtained by performing said inverse wavelet transformation until the decomposition level becomes 0, into said similar figure range in said second basic image data.

11. The image processing system according to claim 1, wherein said image synthesizing circuitry is configured to generate said second target image by reducing at least part of said second basic image.

12. The image processing system according to claim 1, further comprising:

data supply circuitry configured to perform said process of generating said coded bit stream; and supply said coded bit stream to said image synthesizing circuitry.

13. The image processing system according to claim 1, wherein
said coefficient synthesis process is
a first coefficient synthesis process for substituting said non-ROI coefficient in said first wavelet coefficient data with a corresponding wavelet coefficient in said second wavelet coefficient data; or
a second coefficient synthesis process for embedding said ROI coefficient in said first wavelet coefficient data into a corresponding position in said second wavelet coefficient data.

14. The image processing system according to claim 1, wherein
said mask generation process includes:
a basic mask generation process for generating basic mask data which are data of a basic mask to be used to determine said ROI and said non-ROI in a range of a first basic image that is a source of said first target image, on the basis of first basic image data which are data of said first basic image; and
a mask development process for generating said mask which is a developed mask for said first wavelet coefficient data by developing said basic mask for each band component included in said first wavelet coefficient data.

15. The image processing system according to claim 1, wherein
said decomposition level conversion process includes:
a decomposition level increase process for performing said wavelet transformation on said first wavelet coefficient data until the decomposition level becomes said first decomposition level and performing a mask development process for developing said mask data for each band component included in said first wavelet coefficient data of said first decomposition level.

16. The image processing system according to claim 14, wherein
in said mask development process, performed is a level increase basic process for converting a first mask for a first wavelet plane into a second mask for a second wavelet plane having a decomposition level which is one-level higher than that of said first wavelet plane, on the basis of a mask development condition, and
when said level increase basic process is performed a plurality of times in order to bring the decomposition level of said second wavelet plane into said first decomposition level, said level increase basic process is performed recursively in accordance with a method of said wavelet transformation,
and wherein said mask development condition in the case of using a 5×3 filter in said wavelet transformation, where n is an integer, includes:
a first development condition that when the 2n-th data on said first wavelet plane are associated with said ROI by said first mask, said second mask is formed so that the n-th data of a low-frequency component and the {n−1}th data and the n-th data of a high-frequency component on said second wavelet plane may be associated with said ROI; and
a second development condition that when the {2n+1}th data on said first wavelet plane are associated with said ROI by said first mask, said second mask is formed so that the n-th data and the {n+1}th data of said low-frequency component and the {n−1}th data to the {n+1}th data of said high-frequency component on said second wavelet plane may be associated with said ROI.

17. The image processing system according to claim 15, wherein
in said mask development process, performed is a level increase basic process for converting a first mask for a first wavelet plane into a second mask for a second wavelet plane having a decomposition level which is one-level higher than that of said first wavelet plane, on the basis of a mask development condition, and
when said level increase basic process is performed a plurality of times in order to bring the decomposition level of said second wavelet plane into said first decomposition level, said level increase basic process is performed recursively in accordance with a method of said wavelet transformation,
and wherein said mask development condition in the case of using a 5×3 filter in said wavelet transformation, where n is an integer, includes:
a first development condition that when the 2n-th data on said first wavelet plane are associated with said ROI by said first mask, said second mask is formed so that the n-th data of a low-frequency component and the {n−1}th data and the n-th data of a high-frequency component on said second wavelet plane may be associated with said ROI; and
a second development condition that when the {2n+1}th data on said first wavelet plane are associated with said ROI by said first mask, said second mask is formed so that the n-th data and the {n+1}th data of said low-frequency component and the {n−1}th data to the {n+1}th data of said high-frequency component on said second wavelet plane may be associated with said ROI.

18. The image processing system according to claim 14, wherein
in said mask development process, performed is a level increase basic process for converting a first mask for a first wavelet plane into a second mask for a second wavelet plane having a decomposition level which is one-level higher than that of said first wavelet plane, on the basis of a mask development condition, and
when said level increase basic process is performed a plurality of times in order to bring the decomposition level of said second wavelet plane into said first decomposition level, said level increase basic process is performed recursively in accordance with a method of said wavelet transformation,
and wherein said mask development condition in the case of using a Daubechies 9×7 filter in said wavelet transformation, where n is an integer, includes:
a third development condition that when the 2n-th data on said first wavelet plane are associated with said ROI by said first mask, said second mask is formed so that the {n−1}th data to the {n+1}th data of a low-frequency component and the {n−2}th data to the {n+1}th data of a high-frequency component on said second wavelet plane may be associated with said ROI; and
a fourth development condition that when the {2n+1}th data on said first wavelet plane are associated with said ROI by said first mask, said second mask is formed so that the {n−1}th data to the {n+2}th data of said low-frequency component and the {n−2}th data to the {n+2}th data of said high-frequency component on said second wavelet plane may be associated with said ROI.

19. The image processing system according to claim 15, wherein in said mask development process, performed is a level increase basic process for converting a first mask for a first wavelet plane into a second mask for a second wavelet plane having a decomposition level which is one-level higher than that of said first wavelet plane, on the basis of a mask development condition, and when said level increase basic process is performed a plurality of times in order to bring the decomposition level of said second wavelet plane into said first decomposition level, said level increase basic process is performed recursively in accordance with a method of said wavelet transformation, and wherein said mask development condition in the case of using a Daubechics 9×7 filter in said wavelet transformation, where n is an integer, includes:

a third development condition that when the 2n-th data on said first wavelet plane are associated with said ROI by said first mask, said second mask is formed so that the {n−1}th data to the {n+1}th data of a low-frequency component and the {n−2}th data to the {n+1}th data of a high-frequency component on said second wavelet plane may be associated with said ROI; and a fourth development condition that when the {2n+1}th data on said first wavelet plane are associated with said ROI by said first mask, said second mask is formed so that the {n−1}th data to the {n+2}th data of said low-frequency component and the {n−2}th data to the {n+2}th data of said high-frequency component on said second wavelet plane may be associated with said ROI.

20. The image processing system according to claim 1, wherein said decomposition level conversion process includes:

a decomposition level decrease process for performing said inverse wavelet transformation on said first wavelet coefficient data until the decomposition level becomes said first decomposition level and performing a mask restoration process for restoring said mask data for each band component included in said first wavelet coefficient data of said first decomposition level.

21. The image processing system according to claim 20, wherein in said mask restoration process, performed is a level decrease basic process for converting a first mask for a first wavelet plane into a second mask for a second wavelet plane having a decomposition level which is one-level lower than that of said first wavelet plane, on the basis of a mask restoration condition, and when said level decrease basic process is performed a plurality of times in order to bring the decomposition level of said second wavelet plane into said first decomposition level, said level decrease basic process is performed recursively in accordance with a method of said wavelet transformation, and wherein when data at a specified position of said first wavelet plane are associated with said ROI by said first mask, said mask restoration condition defines that said second mask is formed so that data at a position corresponding to said specified position in said second wavelet plane may be associated with said ROI, and said specified position is indicated by a mask adjustment instruction.

22. The image processing system according to claim 21, wherein said mask restoration condition, where n is an integer, includes:

a first mask restoration condition for forming said second mask so that the 2n-th data on said second wavelet plane may be associated with said ROI; and a second mask restoration condition for forming said second mask so that the {2n+1}th data on said second wavelet plane may be associated with said ROI, and when a 5×3 filter is used in said inverse wavelet transformation, under said mask adjustment instruction, said first mask restoration condition imposes that the n-th data of a low-frequency component on said first wavelet plane are associated with said ROI by said first mask and all the {n−1}th data and the n-th data of a high-frequency component on said first wavelet plane are associated with said ROI by said first mask, and said second mask restoration condition imposes that all the n-th data and the {n+1}th data of said low-frequency component on said first wavelet plane are associated with said ROI by said first mask and all the {n−1}th data to the {n+1}th data of said high-frequency component on said first wavelet plane are associated with said ROI by said first mask.

23. The image processing system according to claim 21, wherein said mask restoration condition, where n is an integer, includes:

a first mask restoration condition for forming said second mask so that the 2n-th data on said second wavelet plane may be associated with said ROI; and a second mask restoration condition for forming said second mask so that the {2n+1}th data on said second wavelet plane may be associated with said ROI, and when a Daubechies 9×7 filter is used in said inverse wavelet transformation, under said mask adjustment instruction, said first mask restoration condition imposes that all the {n−1}th data to the {n+1}th data of a low-frequency component on said first wavelet plane are associated with said ROI by said first mask and all the {n−2}th data to the {n+1}th data of a high-frequency component on said first wavelet plane are associated with said ROI by said first mask, and said second mask restoration condition imposes that all the {n−1}th data to the {n+2}th data of said low-frequency component on said first wavelet plane are associated with said ROI by said first mask and all the {n−2}th data to the {n+2}th data of said high-frequency component on said first wavelet plane are associated with said ROI by said first mask.

24. The image processing system according to claim 1, wherein said coded bit stream conforms to JPEG (Joint Photographic Experts Group) 2000.

25. An image processing system comprising:

data supply circuitry configured to output data to be used for an image synthesis process for synthesizing an ROI (Region Of Interest) in a first target image and a second target image, wherein said second target image is a similar figure to said first target age and the similarity ratio of said second target image to said first target image is not larger than 1, data supply circuitry is further configured to generate first wavelet coefficient data by performing wavelet transformation on first target image data which are data of said first target image until a decomposition level becomes a predetermined initial decomposition level;

perform a mask generation process for generating mask data which are data of a mask to be used to determine an ROI coefficient related to said ROI and a non-ROI coefficient related to a non-ROI in said first wavelet coefficient data;

generate quantized wavelet coefficient data by determining said ROI coefficient and said non-ROI coefficient in said first wavelet coefficient data on the basis of said mask data and performing quantization on said first wavelet coefficient data so that said non-ROI coefficient may become 0;

generate coded data by coding said quantized wavelet coefficient data; and generate a coded bit stream from said coded data, said image synthesis process includes:

a bit stream analysis process for extracting said coded data from said coded bit stream;

a decoding process for generating said quantized wavelet coefficient data by decoding said coded data;

a mask reproduction process for reproducing said mask data of said initial decomposition level on the basis of a result of determining said ROI coefficient and said non-ROI coefficient in said quantized wavelet coefficient data by determining whether or not respective values of pieces of data constituting said quantized wavelet coefficient data are each 0;

an inverse quantization process for generating said first wavelet coefficient data of said initial decomposition level by performing inverse quantization on said quantized wavelet coefficient data;

a decomposition level conversion process for converting said first wavelet coefficient data and said mask data from said initial decomposition level to a first decomposition level; and a wavelet transformation process for generating second wavelet coefficient data by performing said wavelet transformation on second target image data which are data of said second target image until the decomposition level becomes a second decomposition level which depends on said first decomposition level and said similarity ratio, and wherein when it is assumed that said first decomposition level of said first wavelet coefficient data is P1, said second decomposition level of said second wavelet coefficient data is P2, and said similarity ratio is $1/2^{P3}$, P2=P1−P3, said image synthesis process further includes:

a synthesis execution process for generating synthesized coefficient data having the same image size and decomposition level as those of said second wavelet coefficient data by performing a coefficient synthesis process for determining said ROI coefficient and said non-ROI coefficient in said first wavelet coefficient data of said first decomposition level on the basis of said mask data of said first decomposition level and synthesizing said ROI coefficient in said first wavelet coefficient data of said first decomposition level and a coefficient in said second wavelet coefficient data; and an inverse wavelet transformation process for generating synthetic image data by performing inverse wavelet transformation on said synthesized coefficient data until the decomposition level becomes a predetermined end level, and said data supply circuitry is further configured to output said coded bit stream and synthesis control data to be used to specify said first decomposition level in said decomposition level conversion process of said image synthesis process.

26. The image processing system according to claim 25, wherein said data supply circuitry is configured to embed said synthesis control data into a region in said coded bit stream, which has no effect on said coded data; and output said coded bit stream with said synthesis control data embedded therein.

27. The image processing system according to claim 25, wherein said data supply circuitry is configured to output said synthesis control data separately from said coded bit stream.

28. The image processing system according to claim 25, wherein said data supply circuitry is configured to generate basic mask data which are data of a basic mask to be used to determine said ROI and said non-ROI in a range of a first basic image including said ROI, on the basis of first basic image data which are data of said first basic image;

perform a cut-out range determination process for determining a cut-out range which is a range of said first target image in said first basic image, on the basis of said basic mask data, said initial decomposition level, and said first decomposition level, to thereby generate cut-out range specifying data to be used to specify said cut-out range;

cut out data within said cut-out range in said basic mask data on the basis of said cut-out range specifying data; and generate said mask which is a developed mask for said first wavelet coefficient data by developing the data cut out from said basic mask data, for each band component included in said first wavelet coefficient data, and said data supply circuitry is further configured to cut out data within said cut-out range in said first basic image data as said first target image data on the basis of said cut-out range specifying data.

29. The image processing system according to claim 28, wherein said cut-out range determination process includes:

a minimum range specifying process for specifying a rectangular minimum range including said ROI, on the basis of said basic mask;

a tracking process for specifying a range corresponding to said minimum range as a tracked minimum range in a highest-order band component which is decomposed most in a wavelet plane of a highest decomposition level which is a higher decomposition level among said initial decomposition level and said first decomposition level; and a required range specifying process for specifying which range of said first basic image before the cut-out, in which data required to calculate a wavelet coefficient within said tracked minimum range exist, and said range specified in said required range specifying process is set to said cut-out range.

30. The image processing system according to claim 29, wherein said wavelet transformation is a method of recursively decomposing a lowest-frequency band component included in a wavelet plane of each decomposition level, and said highest-order band component is a lowest-frequency band component in a wavelet plane of said highest decomposition level.

31. The image processing system according to claim 29, wherein assuming that upper-left end coordinates of said minimum range are (AX1, AY1), lower-right end coordinates of said minimum range are (BX1, BY1), upper-left end coordinates of said tracked minimum range are (AX2, AY2), lower-right end coordinates of said tracked minimum range are (BX2, BY2), upper-left end coordinates of said cut-out range are (AX3, AY3), and lower-right end coordinates of said cut-out range are (BX3, BY3), a 5×3 filter is used in said wavelet transformation, in said minimum range specifying process, said AX1, said AY1, said BX1, and said BY1 are obtained, in said tracking process, a first recursive process in which when said AX1 is an even number, AX1/2 is set to new AX1, and when said AX1 is an odd number, {AX1−1}/2 is set to new AX1 is performed a specified number of times which is specified by a value of said highest decomposition level, and the AX1 that is finally obtained is set to said AX2, a second recursive process in which when said AY1 is an even number, AY1/2 is set to new AY1, and when said AY1 is an odd number, {AY1−1}/2 is set to new AY1 is performed said specified number of times, and the AY1 that is finally obtained is set to said AY2, a third recursive process in which when said BX1 is an even number, BX1/2 is set to new BX1, and when said BX1 is an odd number, {BX1+1}/2 is set to new BX1 is performed said specified number of times, and the BX1 that is finally obtained is set to said BX2, and a fourth recursive process in which when said BY1 is an even number, BY1/2 is set to new BY1, and when said BY1 is an odd number, {BY1+1}/2 is set to new BY1 is performed said specified number of times, and the BY1 that is finally obtained is set to said BY2, and in said required range specifying process, a fifth recursive process in which {AX2×2−2} is set to new AX2 is performed said specified number of times, and the AX2 that is finally obtained is set to said AX3, a sixth recursive process in which {AY2×2−2} is set to new AY2 is performed said specified number of times, and the AY2 that is finally obtained is set to said AY3, a seventh recursive process in which {BX2×2+2} is set to new BX2 is performed said specified number of times, and the BX2 that is finally obtained is set to said BX3, and an eighth recursive process in which {BY2×2=2} is set to new BY2 is performed said specified number of times, and the BY2 that is finally obtained is set to said BY3.

32. The image processing system according to claim 29, wherein assuming that upper-left end coordinates of said minimum range are (AX1, AY1), lower-right end coordinates of said minimum range are (BX1, BY1), upper-left end coordinates of said tracked minimum range are (AX2, AY2), lower-right end coordinates of said tracked minimum range are (BX2, BY2), upper-left end coordinates of said cut-out range are (AX3, AY3), and lower-right end coordinates of said cut-out range are (BX3, BY3), a Daubechies 9×7 filter is used in said wavelet transformation, in said minimum range specifying process, said AX1, said AY1, said BX1, and said BY1 are obtained, in said tracking process, a ninth recursive process in which when said AX1 is an even number, {AX1/2−1} is set to new AX1, and when said AX1 is an odd number, {AX1−3}/2 is set to new AX1 is performed a specified number of times which is specified by a value of said highest decomposition level, and the AX1 that is finally obtained is set to said AX2, a tenth recursive process in which when said AY1 is an even number, {AY1/2−1} is set to new AY1, and when said AY1 is an odd number, {AY1−3}/2 is set to new AY1 is performed said specified number of times, and the AY1 that is finally obtained is set to said AY2, an eleventh recursive process in which when said BX1 is an even number, {BX1+2}/2 is set to new BX1, and when said BX1 is an odd number, {BX1+3}/2 is set to new BX1 is performed said specified number of times, and the BX1 that is finally obtained is set to said BX2, and a twelfth recursive process in which when said BY1 is an even number, {BY1+2}/2 is set to new BY1, and when said BY1 is an odd number, {BX1+3}/2 is set to new BY1 is performed said specified number of times, and the BY1 that is finally obtained is set to said BY2, and in said required range specifying process, a thirteenth recursive process in which {AX2×2−4} is set to new AX2 is performed said specified number of times, and the AX2 that is finally obtained is set to said AX3, a fourteenth recursive process in which {AY2×2−4} is set to new AY2 is performed said specified number of times, and the AY2 that is finally obtained is set to said AY3, a fifteenth recursive process in which {BX2×2+4} is set to new BX2 is performed said specified number of times, and the BX2 that is finally obtained is set to said BX3, and a sixteenth recursive process in which {BY2×2+4} is set to new BY2 is performed said specified number of times, and the BY2 that is finally obtained is set to said BY3.

33. The image processing system according to claim 25, wherein said data supply circuitry is configured to perform said mask reproduction process and said inverse quantization process on the basis of said quantized wavelet coefficient data;

perform said decomposition level conversion process on the basis of a result of performing said mask reproduction process and said inverse quantization process;

perform said wavelet transformation process on said second target image data; and perform said synthesis execution process and said inverse wavelet transformation process on the basis of a result of performing said decomposition level conversion process and wavelet transformation process.

34. The image processing system according to claim 33, wherein said data supply circuitry is configured to set a similar figure range which is a similar figure to said first target image with said similarity ratio in a second basic image that is a source of said second target image; and cut out data within said similar figure range in second basic image data which are data of said second basic image, as said second target image data.

35. The image processing system according to claim 34, wherein said data supply circuitry is configured to embed said synthetic image data obtained by performing said inverse wavelet transformation until the decomposition level becomes 0, into said similar figure range in said second basic image data.

36. The image processing system according to claim 33, wherein said data supply circuitry is configured to generate said second target image by reducing at least part of second basic image that is a source of said second target image.

37. The image processing system according to claim 25, wherein said coefficient synthesis process is a first coefficient synthesis process for substituting said non-ROI coefficient in said first wavelet coefficient data with a corresponding wavelet coefficient in said second wavelet coefficient data; or a second coefficient synthesis process for embedding said ROI coefficient in said first wavelet coefficient data into a corresponding position in said second wavelet coefficient data.

38. The image processing system according to claim 25, wherein said mask generation process includes:

a basic mask generation process for generating basic mask data which are data of a basic mask to be used to determine said ROI and said non-ROI in a range of a first basic image that is a source of said first target image, on the basis of first basic image data which are data of said first basic image; and a mask development process for generating said mask which is a developed mask for said first wavelet coefficient data by developing said basic mask for each band component included in said first wavelet coefficient data.

39. The image processing system according to claim 25, wherein said decomposition level conversion process includes:

a decomposition level increase process for performing said wavelet transformation on said first wavelet coefficient data until the decomposition level becomes said first decomposition level and performing a mask development process for developing said mask data for each band component included in said first wavelet coefficient data of said first decomposition level.

40. The image processing system according to claim 28, wherein in said mask development process, performed is a level increase basic process for converting a first mask for a first wavelet plane into a second mask for a second wavelet plane having a decomposition level which is one-level higher than that of said first wavelet plane, on the basis of a mask development condition, and when said level increase basic process is performed a plurality of times in order to bring the decomposition level of said second wavelet plane into said first decomposition level, said level increase basic process is performed recursively in accordance with a method of said wavelet transformation, and wherein said mask development condition in the case of using a 5×3 filter in said wavelet transformation, where n is an integer, includes:

a first development condition that when the 2n-th data on said first wavelet plane are associated with said ROI by said first mask, said second mask is formed so that the n-th data of a low-frequency component and the {n−1}th data and the n-th data of a high-frequency component on said second wavelet plane may be associated with said ROI; and a second development condition that when the {2n+1}th data on said first wavelet plane are associated with said ROI by said first mask, said second mask is formed so that the n-th data and the {n+1}th data of said low-frequency component and the {n−1}th data to the {n+1}th data of said high-frequency component on said second wavelet plane may be associated with said ROI.

41. The image processing system according to claim 38, wherein in said mask development process, performed is a level increase basic process for converting a first mask for a first wavelet plane into a second mask for a second wavelet plane having a decomposition level which is one-level higher than that of said first wavelet plane, on the basis of a mask development condition, and when said level increase basic process is performed a plurality of s in order to bring the decomposition level of said second wavelet plane into said first decomposition level, said level increase basic process is performed recursively in accordance with a method of said wavelet transformation, and wherein said mask development condition in the case of using a 5×3 filter in said wavelet transformation, where n is an integer, includes:

a first development condition that when the 2n-th data on said first wavelet plane are associated with said ROI by said first mask, said second mask is formed so that the n-th data of a low-frequency component and the {n−1}th data and the n-th data of a high-frequency component on said second wavelet plane may be associated with said ROI; and a second development condition that when the {2n+1}th data on said first wavelet plane are associated with said ROI by said first mask, said second mask is formed so that the n-th data and the {n+1}th data of said low-frequency component and the {n−1}th data to the {n+1}th data of said high-frequency component on said second wavelet plane may be associated with said ROI.

42. The image processing system according to claim 39, wherein
   in said mask development process, performed is a level increase basic process for converting a first mask for a first wavelet plane into a second mask for a second wavelet plane having a decomposition level which is one-level higher than that of said first wavelet plane, on the basis of a mask development condition, and
   when said level increase basic process is performed a plurality of times in order to bring the decomposition level of said second wavelet plane into said first decomposition level, said level increase basic process is performed recursively in accordance with a method of said wavelet transformation,
   and wherein said mask development condition in the case of using a 5×3 filter in said wavelet transformation, where n is an integer, includes:
      a first development condition that when the 2n-th data on said first wavelet plane are associated with said ROI by said first mask, said second mask is formed so that the n-th data of a low-frequency component and the {n−1}th data and the n-th data of a high-frequency component on said second wavelet plane may be associated with said ROI; and
      a second development condition that when the {2n+1}th data on said first wavelet plane are associated with said ROI by said first mask, said second mask is formed so that the n-th data and the {n+1}th data of said low-frequency component and the {n−1}th data to the {n+1}th data of said high-frequency component on said second wavelet plane may be associated with said ROI.

43. The image processing system according to claim 28, wherein
   in said mask development process, performed is a level increase basic process for converting a first mask for a first wavelet plane into a second mask for a second wavelet plane having a decomposition level which is one-level higher than that of said first wavelet plane, on the basis of a mask development condition, and
   when said level increase basic process is performed a plurality of times in order to bring the decomposition level of said second wavelet plane into said first decomposition level, said level increase basic process is performed recursively in accordance with a method of said wavelet transformation,
   and wherein said mask development condition in the case of using a Daubechies 9×7 filter in said wavelet transformation, where n is an integer, includes:
      a third development condition that when the 2n-th data on said first wavelet plane are associated with said ROI by said first mask, said second mask is formed so that the {n−1}th data to the {n+1}th data of a low-frequency component and the {n−2}th data to the {n+1}th data of a high-frequency component on said second wavelet plane may be associated with said ROI; and
      a fourth development condition that when the {2n+1}th data on said first wavelet plane are associated with said ROI by said first mask, said second mask is formed so that the {n−1}th data to the {n+2}th data of said low-frequency component and the {n−2}th data to the {n+2}th data of said high-frequency component on said second wavelet plane may be associated with said ROI.

44. The image processing system according to claim 38, wherein
   in said mask development process, performed is a level increase basic process for converting a first mask for a first wavelet plane into a second mask for a second wavelet plane having a decomposition level which is one-level higher than that of said first wavelet plane, on the basis of a mask development condition, and
   when said level increase basic process is performed a plurality of times in order to bring the decomposition level of said second wavelet plane into said first decomposition level, said level increase basic process is performed recursively in accordance with a method of said wavelet transformation,
   and wherein said mask development condition in the case of using a Daubechies 9×7 filter in said wavelet transformation, where n is an integer, includes:
      a third development condition that when the 2n-th data on said first wavelet plane are associated with said ROI by said first mask, said second mask is formed so that the {n−1}th data to the {n+1}th data of a low-frequency component and the {n−2}th data to the {n+1}th data of a high-frequency component on said second wavelet plane may be associated with said ROI; and
      a fourth development condition that when the {2n+1}th data on said first wavelet plane are associated with said ROI by said first mask, said second mask is formed so that the {n−1}th data to the {n+2}th data of said low-frequency component and the {n−2}th data to the {n+2}th data of said high-frequency component on said second wavelet plane may be associated with said ROI.

45. The image processing system according to claim 39, wherein
   in said mask development process, performed is a level increase basic process for converting a first mask for a first wavelet plane into a second mask for a second wavelet plane having a decomposition level which is one-level higher than that of said first wavelet plane, on the basis of a mask development condition, and
   when said level increase basic process is performed a plurality of times in order to bring the decomposition level of said second wavelet plane into said first decomposition level, said level increase basic process is performed recursively in accordance with a method of said wavelet transformation,
   and wherein said mask development condition in the case of using a Daubechies 9×7 filter in said wavelet transformation, where n is an integer, includes:
      a third development condition that when the 2n-th data on said first wavelet plane are associated with said ROI by said first mask, said second mask is formed so that the {n−1}th data to the {n+1}th data of a low-frequency component and the {n−2}th data to the {n+1}th data of a high-frequency component on said second wavelet plane may be associated with said ROI; and
      a fourth development condition that when the {2n+1}th data on said first wavelet plane are associated with said ROI by said first mask, said second mask is formed so that the {n−1}th data to the {n+2}th data of said low-frequency component and the {n−2}th data to the {n+2}th data of said high-frequency component on said second wavelet plane may be associated with said ROI.

46. The image processing system according to claim 25, wherein said decomposition level conversion process includes:

a decomposition level decrease process for performing said inverse wavelet transformation on said first wavelet coefficient data until the decomposition level becomes said first decomposition level and performing a mask restoration process for restoring said mask data for each band component included in said first wavelet coefficient data of said first decomposition level.

47. The image processing system according to claim 46, wherein in said mask restoration process, performed is a level decrease basic process for converting a first mask for a first wavelet plane into a second mask for a second wavelet plane having a decomposition level which is one-level lower than that of said first wavelet plane, on the basis of a mask restoration condition, and when said level decrease basic process is performed a plurality of times in order to bring the decomposition level of said second wavelet plane into said first decomposition level, said level decrease basic process is performed recursively in accordance with a method of said wavelet transformation, and wherein when data at a specified position of said first wavelet plane are associated with said ROI by said first mask, said mask restoration condition defines that said second mask is formed so that data at a position corresponding to said specified position in said second wavelet plane may be associated with said ROI, and said specified position is indicated by a mask adjustment instruction.

48. The image processing system according to claim 47, wherein said mask restoration condition, where n is an integer, includes:

a first mask restoration condition for forming said second mask so that the 2n-th data on said second wavelet plane may be associated with said ROI; and a second mask restoration condition for forming said second mask so that the $\{2n+1\}$th data on said second wavelet plane may be associated with said ROI, and when a 5×3 filter is used in said inverse wavelet transformation, under said mask adjustment instruction, said first mask restoration condition imposes that the n-th data of a low-frequency component on said first wavelet plane are associated with said ROI by said first mask and all the $\{n-1\}$th data and the n-th data of a high-frequency component on said first wavelet plane are associated with said ROI by said first mask, and said second mask restoration condition imposes that all the n-th data and the $\{n+1\}$th data of said low-frequency component on said first wavelet plane are associated with said ROI by said first mask and all the $\{n-1\}$th data to the $\{n+1\}$th data of said high-frequency component on said first wavelet plane are associated with said ROI by said first mask.

49. The image processing system according to claim 47, wherein said mask restoration condition, where n is an integer, includes:

a first mask restoration condition for forming said second mask so that the 2n-th data on said second wavelet plane may be associated with said ROI; and a second mask restoration condition for forming said second mask so that the $\{2n+1\}$th data on said second wavelet plane may be associated with said ROI, and when a Daubechies 9×7 filter is used in said inverse wavelet transformation, under said mask adjustment instruction, said first mask restoration condition imposes that all the $\{n-1\}$th data to the $\{n+1\}$th data of a low-frequency component on said first wavelet plane are associated with said ROI by said first mask and all the $\{n-2\}$th data to the $\{n+1\}$th data of a high-frequency component on said first wavelet plane are associated with said ROI by said first mask, and said second mask restoration condition imposes that all the $\{n-1\}$th data to the $\{n+2\}$th data of said low-frequency component on said first wavelet plane are associated with said ROI by said first mask and all the $\{n-2\}$th data to the $\{n+2\}$th data of said high-frequency component on said first wavelet plane are associated with said ROI by said first mask.

50. The image processing system according to claim 25, wherein said coded bit stream conforms to JPEG (Joint Photographic Experts Group) 2000.

51. An image processing system comprising:

a memory; and data preparation circuitry and synthesizing circuitry which are connected to said memory via a bus, wherein said memory is configured to store therein first basic image data which are data of a first basic image that is a source of a first target image having an ROI (Region Of Interest), and second basic image data which are data of a second basic image that is a source of a second target image to be synthesized with said ROI in said first target image, said second target image is a similar figure to said first target image and the similarity ratio of said second target image to said first target image is not larger than 1, said data preparation circuitry is configured to acquire said first basic image data from said memory;

generate first wavelet coefficient data by performing wavelet transformation on first target image data which are data of said first target image until a decomposition level becomes a predetermined initial decomposition level;

perform a mask generation process for generating mask data which are data of a mask to be used to determine an ROI coefficient related to said ROI and a non-ROI coefficient related to a non-ROI in said first wavelet coefficient data; and determine said ROI coefficient and said non-ROI coefficient in said first wavelet coefficient data on the basis of said mask data and perform quantization on said first wavelet coefficient data so that said non-ROI coefficient may become 0, to thereby generate quantized wavelet coefficient data, and said synthesizing circuitry is configured to acquire said quantized wavelet coefficient data from said data preparation circuitry;

acquire said second basic image data from said memory;

acquire synthesis control data to be used to control the state of synthesis;

reproduce said mask data of said initial decomposition level on the basis of a result of determining said ROI coefficient and said non-ROI coefficient in said quantized wavelet coefficient data by determining whether or not respective values of pieces of data constituting said quantized wavelet coefficient data are each 0;

generate said first wavelet coefficient data of said initial decomposition level by performing inverse quantization on said quantized wavelet coefficient data;

perform a decomposition level conversion process for converting said first wavelet coefficient data and said mask data from said initial decomposition level to a first decomposition level which is specified by said synthesis control data; and generate second wavelet coefficient data by performing said wavelet transformation on second target image data which are data of said second target image until the decomposition level becomes a second decomposition level which depends on said first decomposition level and said similarity ratio, and wherein when it is assumed that said first decomposition level of said first wavelet coefficient data is P1, said second decomposition level of said second wavelet coefficient data is P2, and said similarity ratio is $1/2^{P3}$, P2=P1−P3, and said synthesizing circuitry is further configured to generate synthesized coefficient data having the same image size and decomposition level as those of said second wavelet coefficient data by performing a coefficient synthesis process for determining said ROI coefficient and said non-ROI coefficient in said first wavelet coefficient data of said first decomposition level on the basis of said mask data of said first decomposition level and synthesizing said ROI coefficient in said first wavelet coefficient data of said first decomposition level and a coefficient in said second wavelet coefficient data; and generate synthetic image data by performing inverse wavelet transformation on said synthesized coefficient data until the decomposition level becomes a predetermined end level.

52. An image processing method comprising:

acquiring first basic image data which are data of a first basic image that is a source of a first target image having an ROI (Region Of Interest), and acquiring second basic image data which are data of a second basic image that is a source of a second target image to be synthesized with said ROI in said first target image, wherein said second target image is a similar figure to said first target image and the similarity ratio of said second target image to said first target image is not larger than 1, and said image processing method further comprising:

acquiring synthesis control data to be used to control the state of synthesis;

generating first wavelet coefficient data by performing wavelet transformation on first target image data which are data of said first target age until a decomposition level becomes a predetermined initial decomposition level;

performing a mask generation process for generating mask data which are data of a mask to be used to determine an ROI coefficient related to said ROI and a non-ROI coefficient related to a non-ROI in said first wavelet coefficient data;

determining said ROI coefficient and said non-ROI coefficient in said first wavelet coefficient data on the basis of said mask data and performing quantization on said first wavelet coefficient data so that said non-ROI coefficient may become 0, to thereby generate quantized wavelet coefficient data;

reproducing said mask data of said initial decomposition level on the basis of a result of determining said ROI coefficient and said non-ROI coefficient in said quantized wavelet coefficient data by determining whether or not respective values of pieces of data constituting said quantized wavelet coefficient data are each 0;

generating said first wavelet coefficient data of said initial decomposition level by performing inverse wavelet transformation on said quantized wavelet coefficient data;

performing a decomposition level conversion process for converting said first wavelet coefficient data and said mask data from said initial decomposition level to a first decomposition level which is specified by said synthesis control data; and generating second wavelet coefficient data by performing said wavelet transformation on second target image data which are data of said second target image until the decomposition level becomes a second decomposition level which depends on said first decomposition level and said similarity ratio, and wherein when it is assumed that said first decomposition level of said first wavelet coefficient data is P1, said second decomposition level of said second wavelet coefficient data is P2, and said similarity ratio is $1/2^{P3}$, P2=P1−P3, and said image processing method further comprising:

generating synthesized coefficient data having the same image size and decomposition level as those of said second wavelet coefficient data by performing a coefficient synthesis process for determining said ROI coefficient and said non-ROI coefficient in said first wavelet coefficient data of said first decomposition level on the basis of said mask data of said first decomposition level and synthesizing said ROI coefficient in said first wavelet coefficient data of said first decomposition level and a coefficient in said second wavelet coefficient data; and generating synthetic image data by performing inverse wavelet transformation on said synthesized coefficient data until the decomposition level becomes a predetermined end level.

* * * * *